US009843636B2

(12) United States Patent
Abe

(10) Patent No.: US 9,843,636 B2
(45) Date of Patent: Dec. 12, 2017

(54) COMPUTER-READABLE MEDIUM STORING DATA EDITING PROGRAM

(71) Applicant: SOCIONEXT INC., Yokohama-shi, Kanagawa (JP)

(72) Inventor: Naoki Abe, Yokohama (JP)

(73) Assignee: SOCIONEXT INC., Yokohama (JP)

( * ) Notice: Subject to any disclaimer, the term of this patent is extended or adjusted under 35 U.S.C. 154(b) by 441 days.

(21) Appl. No.: 14/267,379

(22) Filed: May 1, 2014

(65) Prior Publication Data

US 2014/0351387 A1    Nov. 27, 2014

(30) Foreign Application Priority Data

May 22, 2013  (JP) ................................ 2013-107980

(51) Int. Cl.
*G06F 15/16*    (2006.01)
*H04L 29/08*    (2006.01)
(Continued)

(52) U.S. Cl.
CPC .... *H04L 67/1097* (2013.01); *G06F 17/30115* (2013.01); *G11B 27/00* (2013.01)

(58) Field of Classification Search
CPC ......... G06F 17/30587; G06F 17/30589; G06F 17/30592; G06F 17/30595; G06F 11/1458
See application file for complete search history.

(56) References Cited

U.S. PATENT DOCUMENTS 6,278,678 B1    8/2001  Iida
7,089,271 B1    8/2006  Kihara et al.
(Continued)

FOREIGN PATENT DOCUMENTS

JP    2000-298611    10/2000
JP    2001-75856    3/2001
(Continued)

OTHER PUBLICATIONS

Japanese Office Action dated Dec. 6, 2016 in corresponding Japanese Patent Application No. 2013-107980.
(Continued)

*Primary Examiner* — Chirag R Patel
*Assistant Examiner* — Rachel J Hackenberg
(74) *Attorney, Agent, or Firm* — Staas & Halsey LLP

(57) ABSTRACT

A non-transitory computer-readable medium storing a data editing program causing a computer to execute data editing processing, the data editing processing includes transferring insert data between a transfer start position and a transfer end position to a transfer insertion position; the transferring the insert data including: transferring transfer-start-back-data at and after the transfer start position in a transfer start cluster to a first new cluster; transferring transfer-end-forward-data at and before the transfer end position in a transfer end cluster to a second new cluster; transferring transfer-insertion-forward-data at and before the transfer insertion position or transfer-insertion-back-data at and after the transfer insertion position to the first or the second new cluster; and editing the management data, such that a cluster next to the transfer start cluster is linked after the first new cluster, and a cluster preceding the transfer end cluster is linked before the second new cluster.

14 Claims, 43 Drawing Sheets

(51) Int. Cl.
*G11B 27/00* (2006.01)
*G06F 17/30* (2006.01)

(56) References Cited

U.S. PATENT DOCUMENTS

| | | | |
|---|---|---|---|
| 7,499,930 B2 | 3/2009 | Naka et al. | |
| 8,225,057 B1* | 7/2012 | Zheng | G06F 11/1458 |
| | | | 711/114 |
| 2004/0034621 A1* | 2/2004 | Tanaka | G06F 9/54 |
| 2010/0115185 A1* | 5/2010 | Ono | G06F 12/0246 |
| | | | 711/103 |
| 2015/0254319 A1* | 9/2015 | Modukuri | G06F 3/0665 |
| | | | 707/639 |

FOREIGN PATENT DOCUMENTS

| | | |
|---|---|---|
| JP | 2003-52006 | 2/2003 |
| JP | 2005-215894 | 8/2005 |
| JP | 2009-271635 | 11/2009 |

OTHER PUBLICATIONS

Chinese Office Action dated Dec. 26, 2016 in corresponding Chinese Patent Application No. 201410218558.7.

* cited by examiner

FIG. 5

| ELEMENT NAME | CLASSI-FICATION | CONTENTS |
|---|---|---|
| EDITING PROCESSING TYPE | INPUT | "INSERTION" OR "REMOVAL" |
| EDITING START POSITION | INPUT | OBJECT POSITION OF EDITING PROCESSING |
| EDITING DATA SIZE | INPUT | SIZE OF DATA OF EDITING OBJECT |
| EDITING DATA OFFSET | OUTPUT | HEAD POSITION OF DATA OF EDITING OBJECT IN FILE AFTER EDITING PROCESSING |
| FILE SIZE AFTER EDITING | OUTPUT | SIZE OF FILE AFTER EDITING PROCESSING |

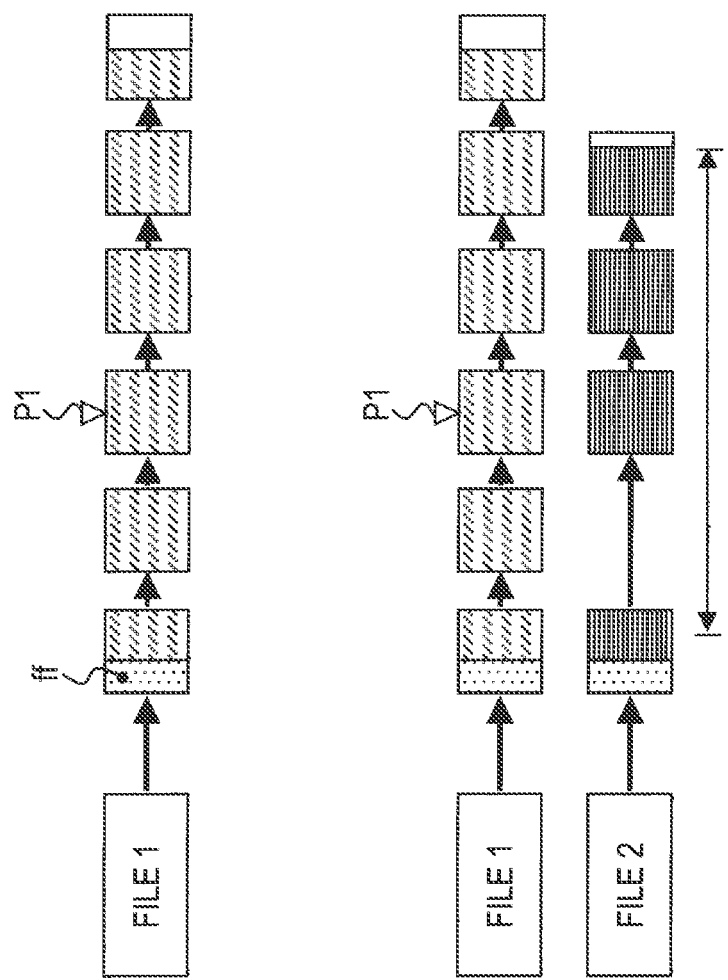

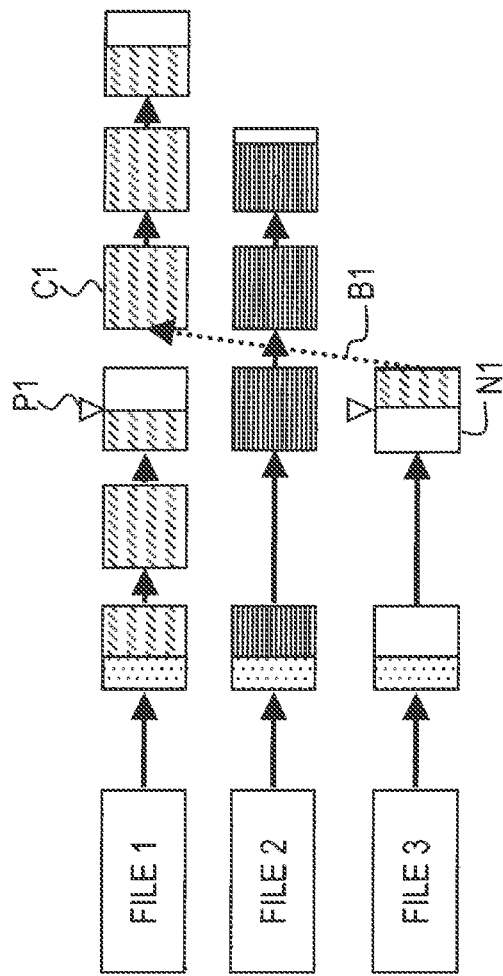
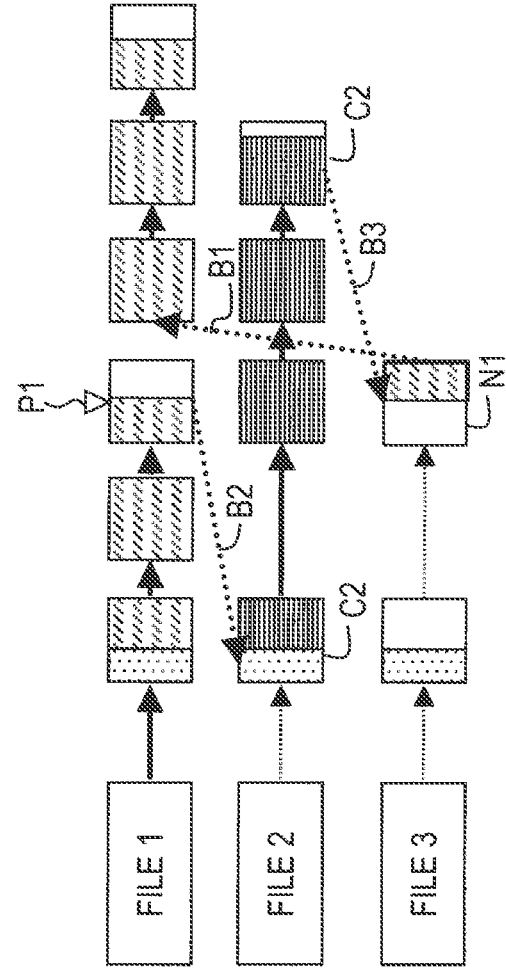
FIG. 9A
FIG. 9B

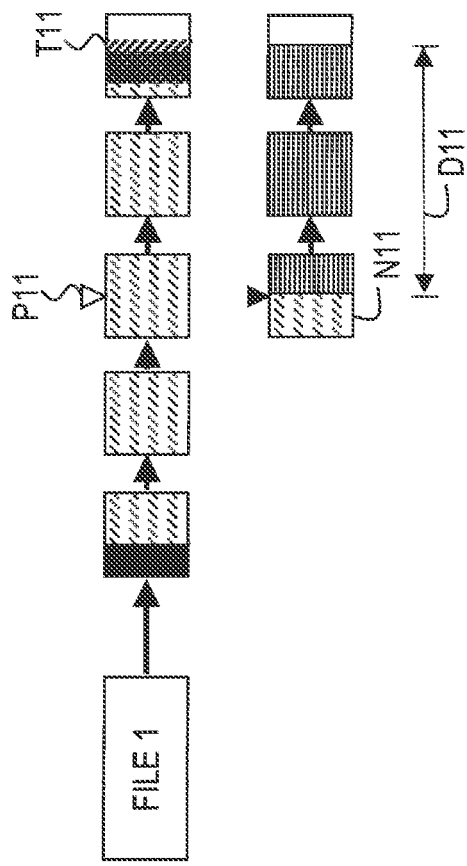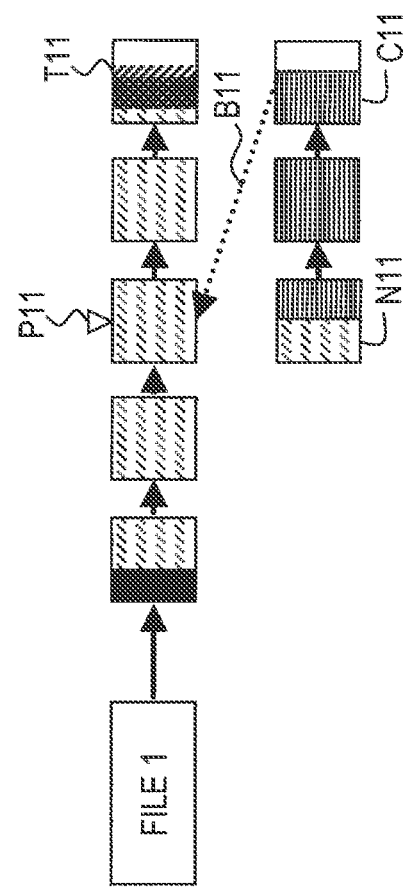

FIG. 15

| | FILE STATE | | | | | RECOVERY GUIDELINES | SAFETY |
|---|---|---|---|---|---|---|---|
| | FILE DATA | FILE SIZE | INDEX | DATA EDITING TABLE | NON-REFERRED DATA | | |
| BEFORE S21 | — | — | — | — | — | | |
| AFTER S21 | BEFORE INSERTION | NORMAL | NORMAL | UNREADABLE | ABSENT | STATE BEFORE DATA INSERTION IS NOT REQUIRED TO BE RESTORED | ○ |
| AFTER S22 | BEFORE INSERTION | NORMAL | NORMAL | UNREADABLE | PRESENT | | ○ |
| AFTER S23 | BEFORE INSERTION | NORMAL | NORMAL | READABLE | PRESENT | FILE IS IN STATE BEFORE DATA INSERTION, CLEAR NON-REFERRED DATA | ○ |
| AFTER S24 | BEFORE INSERTION | MISMATCHED | NORMAL | READABLE | PRESENT | | ○ |
| AFTER S25 | AFTER INSERTION | NORMAL | MISMATCHED | READABLE | PRESENT | | ○ |
| AFTER S26 | AFTER INSERTION | NORMAL | NORMAL | READABLE | ABSENT | RESTORATION TO STATE AFTER DATA INSERTION ON BASIS OF DATA EDITING TABLE | ○ |
| AFTER S27 | AFTER INSERTION | NORMAL | NORMAL | READABLE | ABSENT | | ○ |
| AFTER S28 | — | — | — | — | — | STATE AFTER DATA INSERTION | ○ |

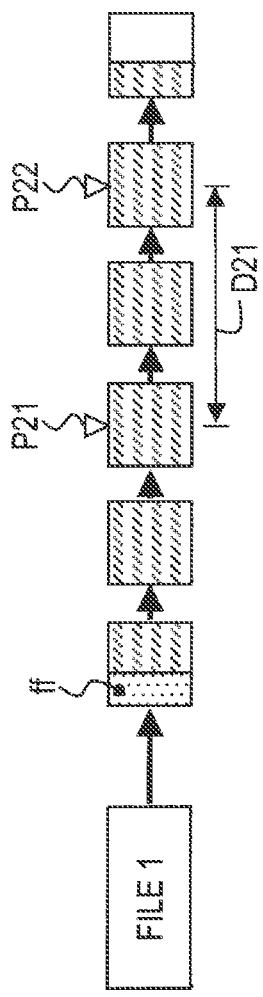
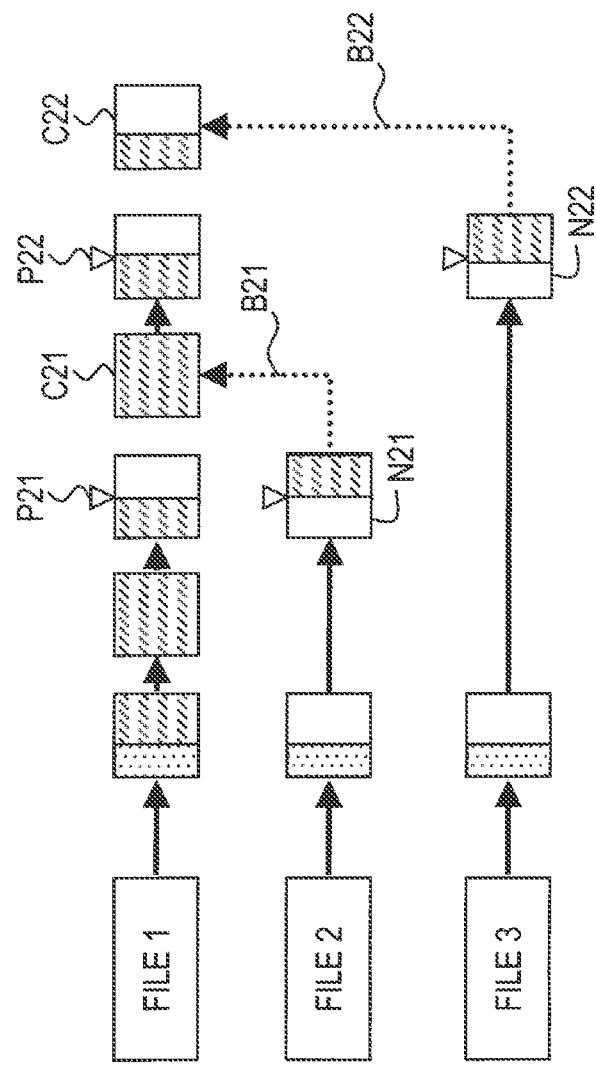
FIG. 16A
FIG. 16B

FIG. 22

| | FILE STATE | | | | | RECOVERY GUIDELINES | SAFETY |
|---|---|---|---|---|---|---|---|
| | FILE DATA | FILE SIZE | INDEX | DATA EDITING TABLE | NON-REFERRED DATA | | |
| BEFORE S41 | - | - | - | - | - | | ○ |
| AFTER S41 | BEFORE REMOVAL | NORMAL | NORMAL | UNREADABLE | ABSENT | STATE BEFORE REMOVAL IS NOT REQUIRED TO BE RESTORED | ○ |
| AFTER S42 | AFTER REMOVAL | MISMATCHED | MISMATCHED | READABLE | PRESENT | | ○ |
| AFTER S43 | AFTER REMOVAL | MISMATCHED | MISMATCHED | READABLE | ABSENT | RESTORATION TO STATE AFTER REMOVAL ON BASIS OF DATA EDITING TABLE | ○ |
| AFTER S44 | AFTER REMOVAL | MISMATCHED | NORMAL | READABLE | ABSENT | | ○ |
| AFTER S45 | - | - | - | - | - | STATE AFTER REMOVAL | ○ |

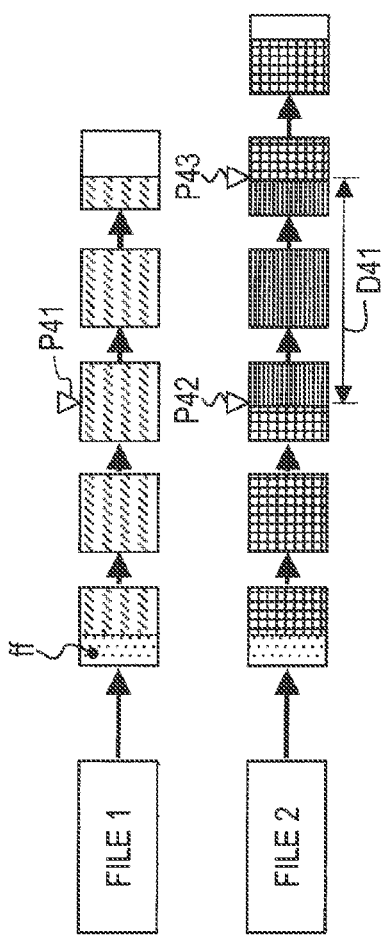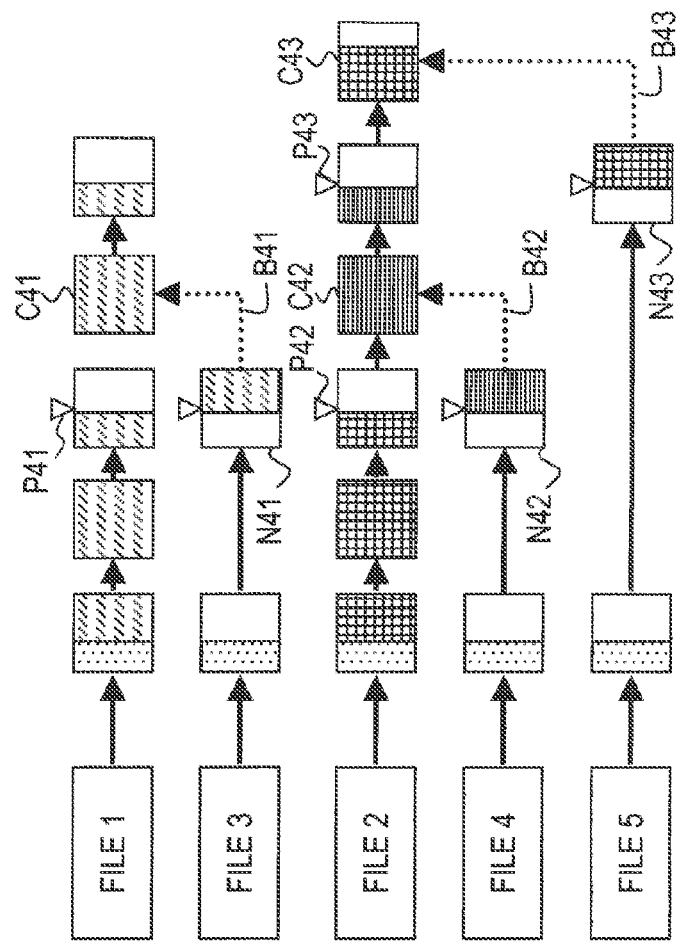
FIG. 23A
FIG. 23B

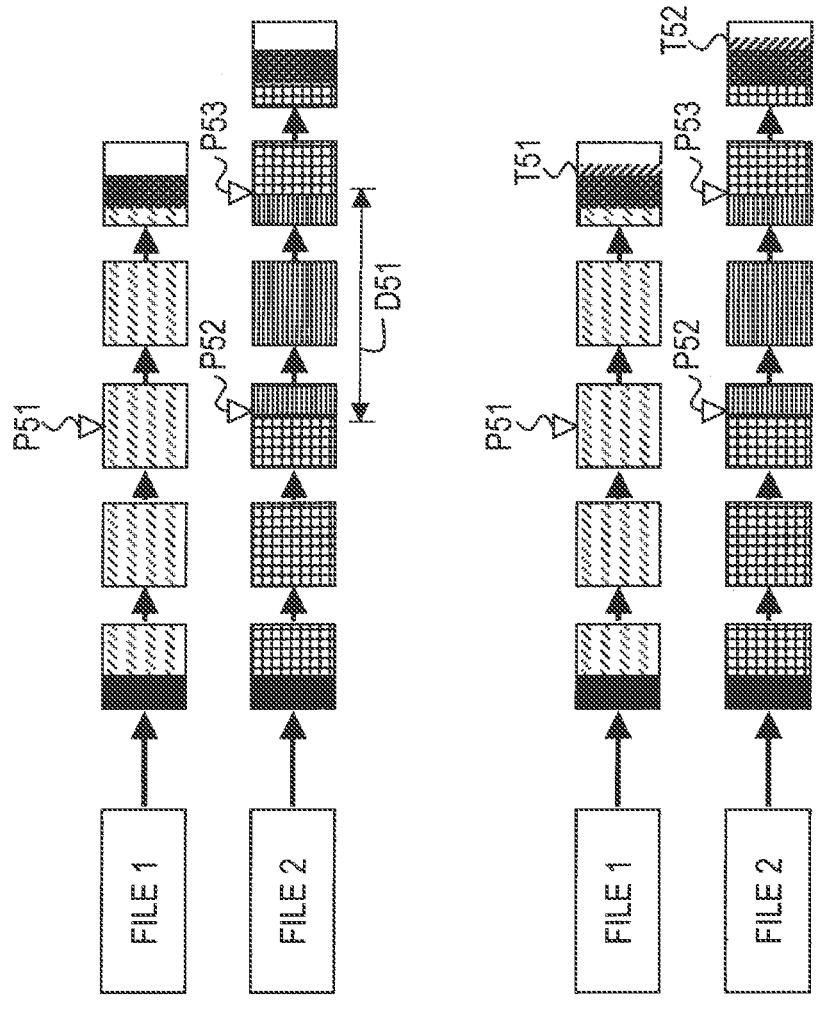

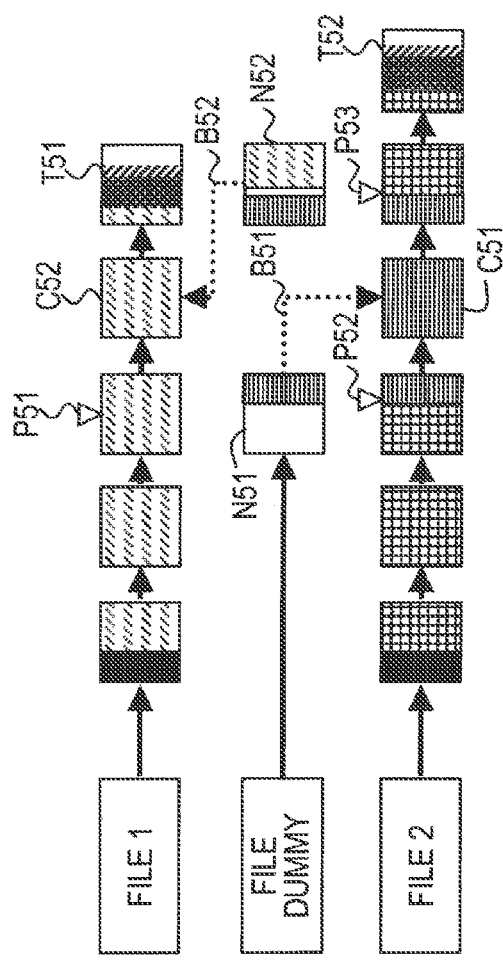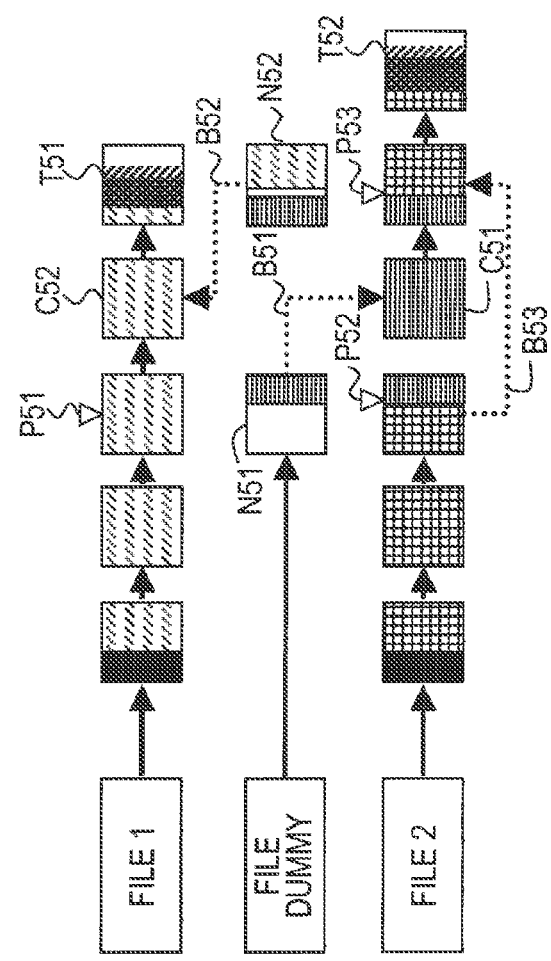

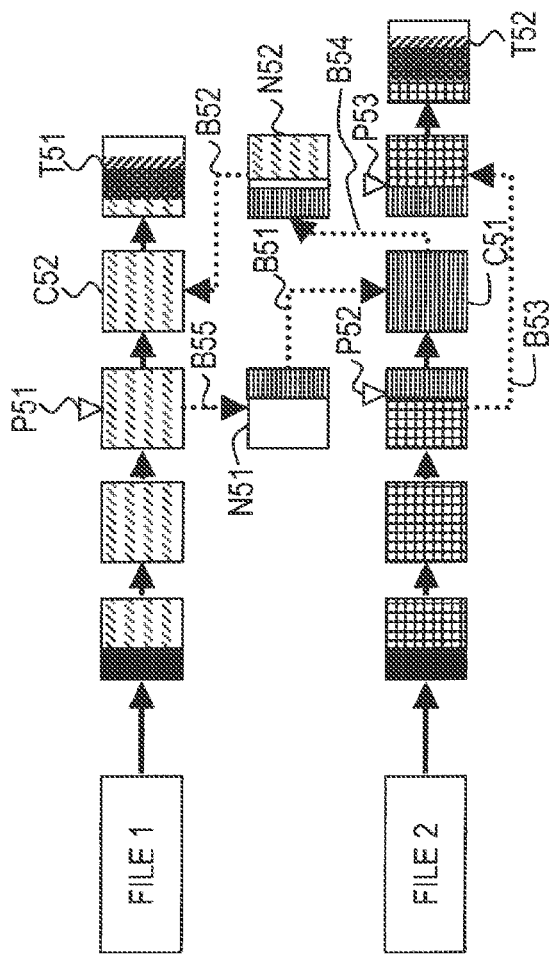
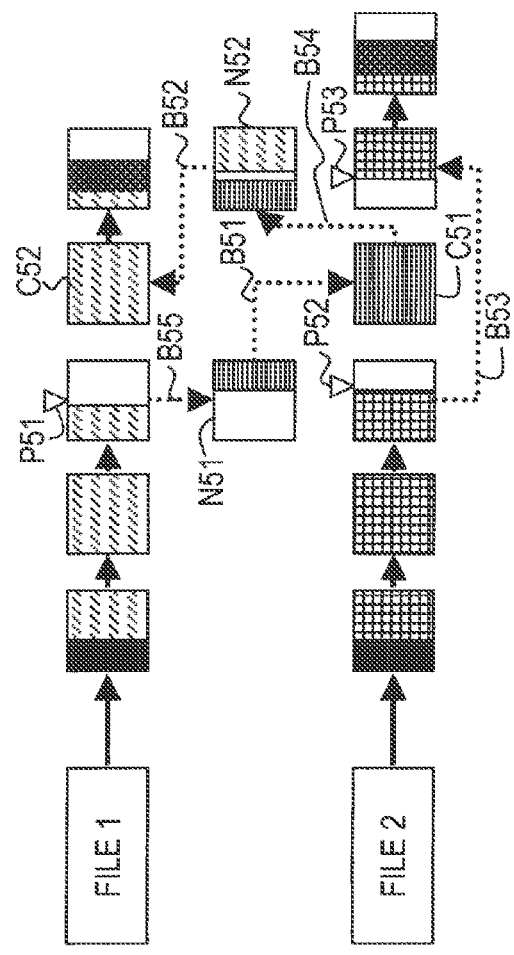
FIG. 30A
FIG. 30B

FIG. 31
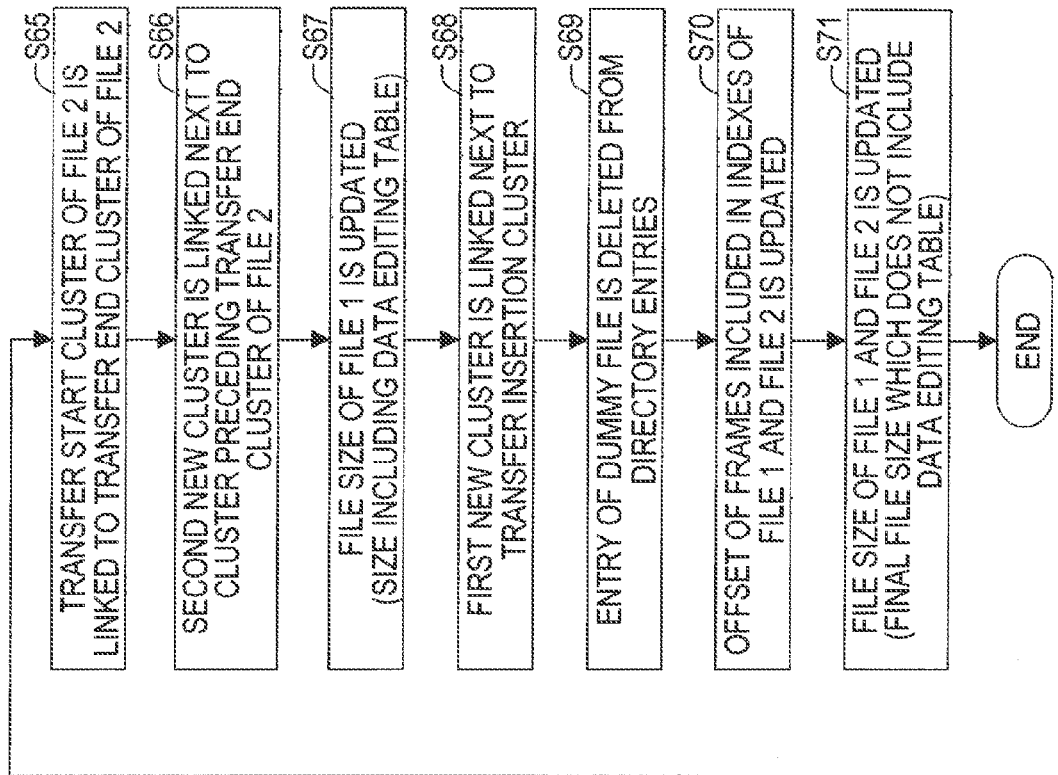
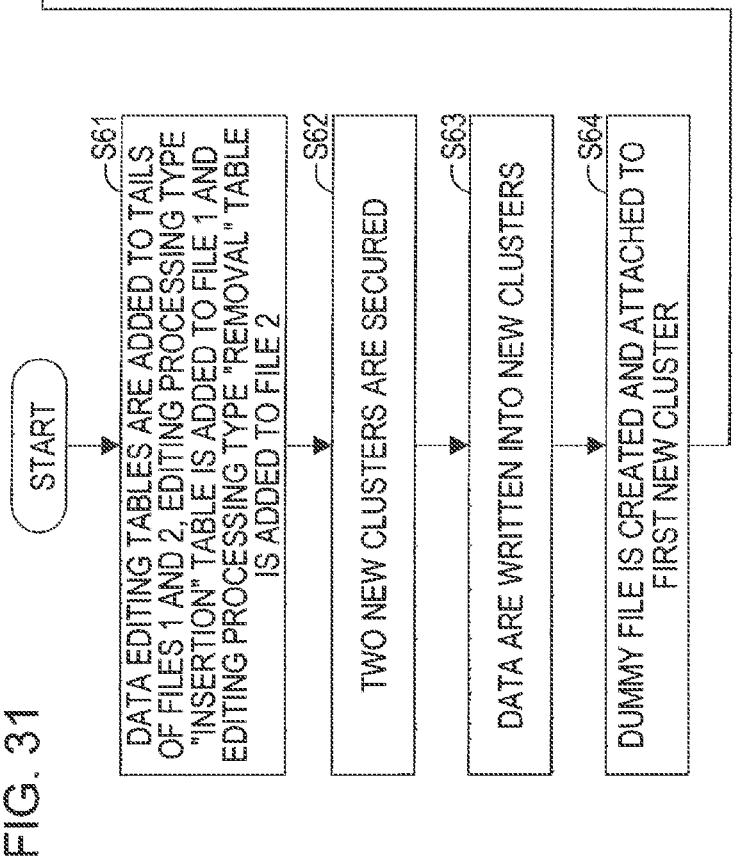

FIG. 32A

| PATTERN | CONDITIONS | | SHARED PATTERN |
|---|---|---|---|
| PATTERN 1-1 | REGION (B) + REGION (C) ≤ CLUSTER SIZE | REGION (a) < REGION (B) | - REGION (B) IS WRITTEN TO TAIL OF NEW CLUSTER 1<br>- REGION (C) IS WRITTEN TO HEAD OF NEW CLUSTER 2, AND REGION (a) IS WRITTEN TO TAIL OF NEW CLUSTER 2 |
| PATTERN 1-2 | | REGION (a) ≥ REGION (B) | - REGION (A) IS WRITTEN TO HEAD OF NEW CLUSTER 1, AND REGION (B) IS WRITTEN TO TAIL OF NEW CLUSTER 1<br>- REGION (C) IS WRITTEN TO HEAD OF NEW CLUSTER 2 |
| PATTERN 2 | REGION (B) + REGION (C) > CLUSTER SIZE | | - REGION (B) IS WRITTEN TO TAIL OF NEW CLUSTER 1<br>- REGION (a) IS WRITTEN TO TAIL OF NEW CLUSTER 2<br>- REGION (c) IS COPIED TO TAIL OF CLUSTER OF REGION (b) |

FIG. 32B

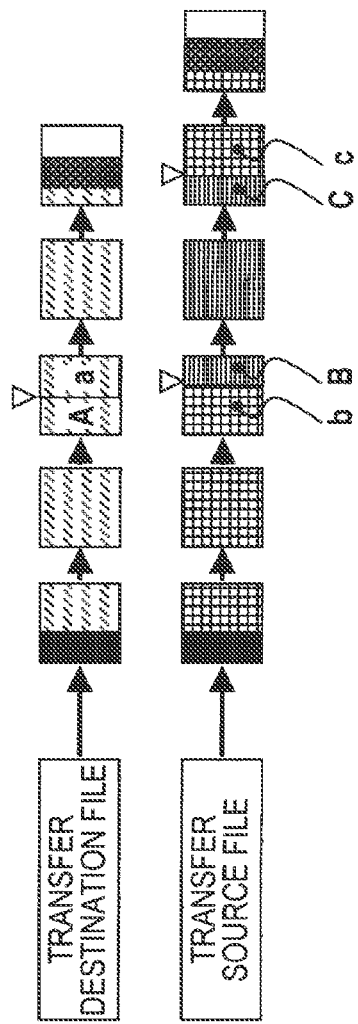

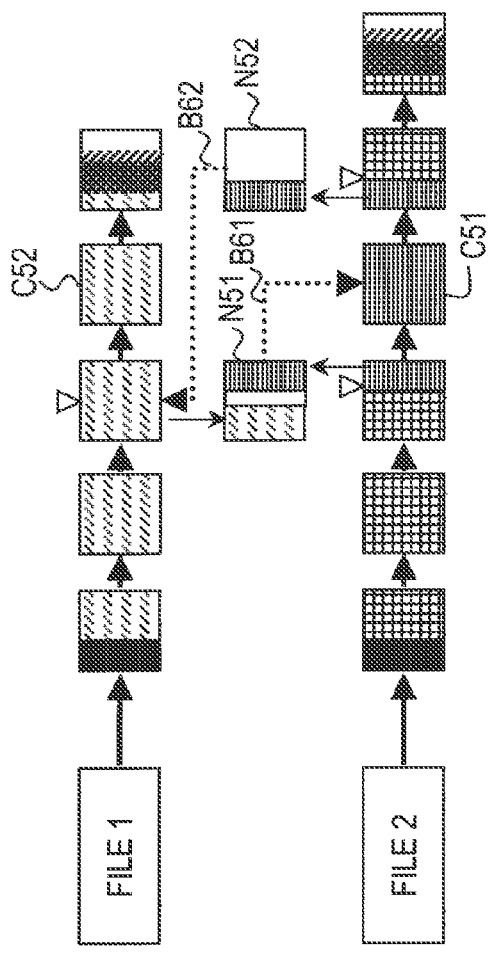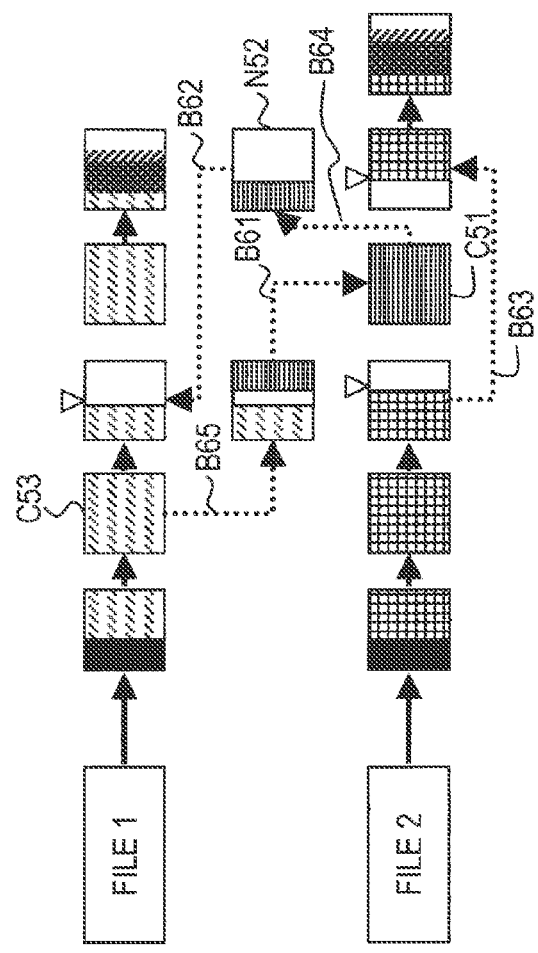
FIG. 33A
FIG. 33B

FIG. 35

| | TRANSFER DESTINATION FILE (FILE 1) | | | | TRANSFER SOURCE FILE (FILE 2) | | | | DUMMY FILE | | OTHERS | RECOVERY GUIDELINES | SAFETY |
|---|---|---|---|---|---|---|---|---|---|---|---|---|---|
| | FILE DATA | FILE SIZE | INDEX | DATA EDITING TABLE | FILE DATA | FILE SIZE | INDEX | DATA EDITING TABLE | PRESENT/ ABSENT | DATA EDITING TABLE | NON-REFERRED DATA | | |
| BEFORE S61 | — | — | — | — | — | — | — | — | — | — | — | | ○ |
| AFTER S61 | BEFORE TRANSFER | NORMAL | NORMAL | UN-READABLE | BEFORE TRANSFER | NORMAL | NORMAL | UN-READABLE | ABSENT | ABSENT | ABSENT | STATE BEFORE TRANSFER IS NOT REQUIRED TO BE RESTORED | ○ |
| AFTER S62 | BEFORE TRANSFER | NORMAL | NORMAL | UN-READABLE | BEFORE TRANSFER | NORMAL | NORMAL | UN-READABLE | ABSENT | ABSENT | PRESENT | | ○ |
| AFTER S63 | BEFORE TRANSFER | NORMAL | NORMAL | UN-READABLE | BEFORE TRANSFER | NORMAL | NORMAL | UN-READABLE | ABSENT | ABSENT | PRESENT | RESTORATION BEFORE TRANSFER | ○ |
| AFTER S64 | BEFORE TRANSFER | NORMAL | NORMAL | UN-READABLE | BEFORE TRANSFER | NORMAL | NORMAL | UN-READABLE | PRESENT | READABLE (FILE 2) | ABSENT | | ○ |
| AFTER S65 | BEFORE TRANSFER | NORMAL | NORMAL | UN-READABLE | AFTER TRANSFER | MIS-MATCHED | MIS-MATCHED | READABLE | PRESENT | READABLE (FILE 2) | ABSENT | | ○ |
| AFTER S66 | BEFORE TRANSFER | NORMAL | NORMAL | READABLE | AFTER TRANSFER | MIS-MATCHED | MIS-MATCHED | READABLE | PRESENT | READABLE (FILE 1) | ABSENT | RESTORATION AFTER TRANSFER | ○ |
| AFTER S67 | BEFORE TRANSFER | MIS-MATCHED | MIS-MATCHED | READABLE | AFTER TRANSFER | MIS-MATCHED | MIS-MATCHED | READABLE | PRESENT | READABLE (FILE 1) | ABSENT | | ○ |
| AFTER S68 | AFTER TRANSFER | NORMAL | MIS-MATCHED | READABLE | AFTER TRANSFER | MIS-MATCHED | MIS-MATCHED | READABLE | PRESENT | READABLE (FILE 1) | ABSENT | | ○ |
| AFTER S69 | AFTER TRANSFER | NORMAL | MIS-MATCHED | READABLE | AFTER TRANSFER | MIS-MATCHED | MIS-MATCHED | READABLE | ABSENT | ABSENT | ABSENT | | ○ |
| AFTER S70 | AFTER TRANSFER | NORMAL | NORMAL | READABLE | AFTER TRANSFER | MIS-MATCHED | NORMAL | READABLE | ABSENT | ABSENT | ABSENT | | ○ |
| AFTER S71 | — | — | — | — | — | — | — | — | — | — | — | STATE AFTER TRANSFER | ○ |

FIG. 36

| PROCESSING | | NUMBER OF UPDATES OF DIRECTORY ENTRIES | | NUMBER OF NEW CLUSTERS | FRAGMEN-TATION NUMBER |
|---|---|---|---|---|---|
| | | TOTAL | CONTENTS | | |
| DATA INSERTION | PRESENT EMBODIMENT (DATA EDITING TABLE IS PRESENT) | 2 | SIZE CHANGE: 2 | 1 | 2 |
| | PRESENT EMBODIMENT (DATA EDITING TABLE IS ABSENT) | 1 | SIZE CHANGE: 1 | 1 | 2 |
| | COMPARATIVE EXAMPLE | 7 | NEW CREATION: 1<br>DIVISION: 1 × 2<br>LINKING: 2 × 2 | 1 | 3 |
| DATA REMOVAL | PRESENT EMBODIMENT (DATA EDITING TABLE IS PRESENT) | 1 | SIZE CHANGE: 1 | 0 | 1 |
| | PRESENT EMBODIMENT (DATA EDITING TABLE IS ABSENT) | 1 | SIZE CHANGE: 1 | 2 | 2 |
| | COMPARATIVE EXAMPLE | 7 | DIVISION: 2 × 2<br>LINKING: 1 × 2<br>DELETION: 1 | 2 | 2 |
| DATA TRANSFER | PRESENT EMBODIMENT (DATA EDITING TABLE IS PRESENT) | 5 | SIZE CHANGE: 3<br>NEW CREATION: 1<br>DELETION: 1 | 2 | 5 |
| | PRESENT EMBODIMENT (DATA EDITING TABLE IS ABSENT) | 4 | SIZE CHANGE: 2<br>NEW CREATION: 1<br>DELETION: 1 | 2 | 5 |
| | COMPARATIVE EXAMPLE | 12 | DIVISION: 3 × 2<br>LINKING: 3 × 2 | 3 | 6 |

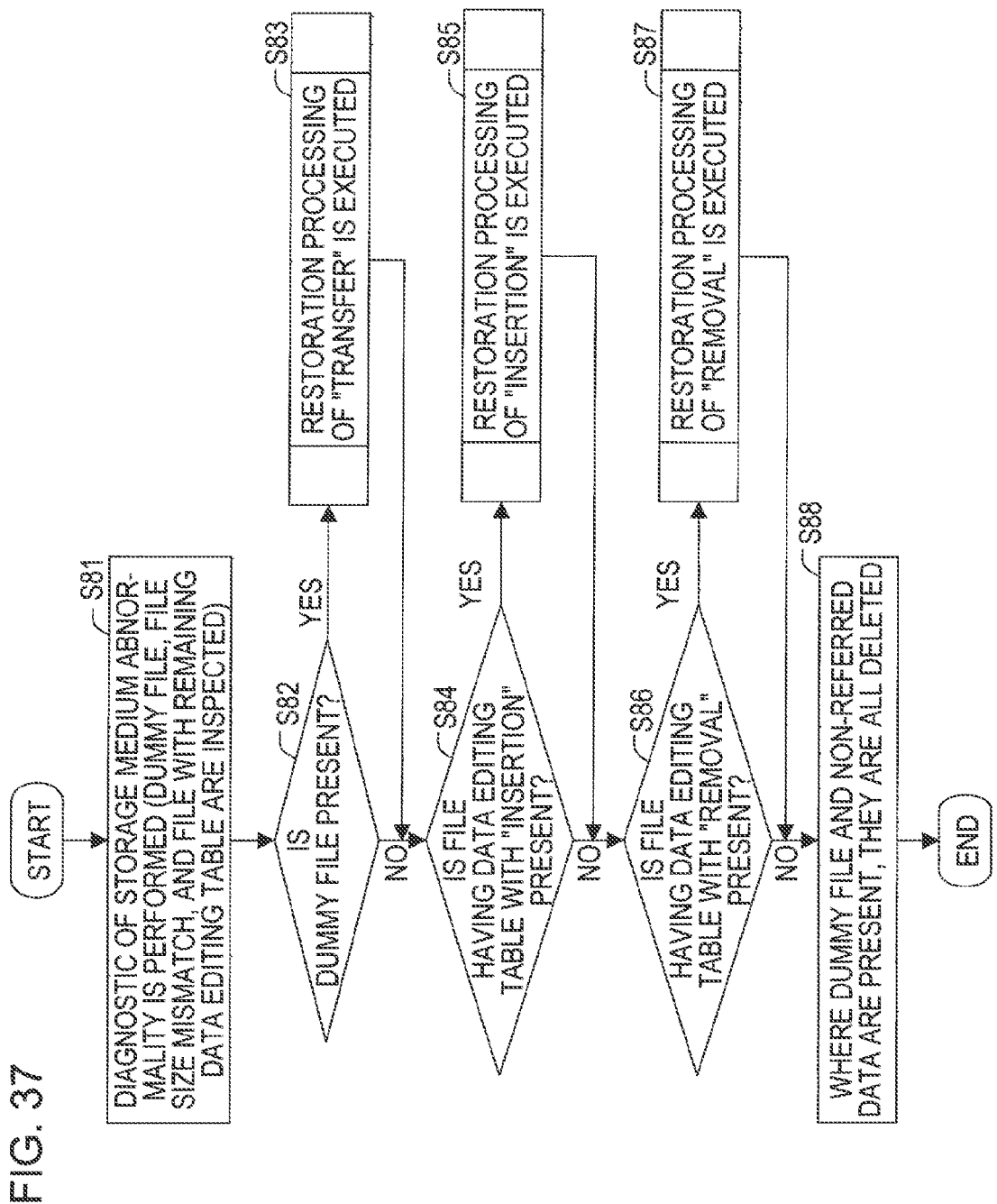

FIG. 42

| | ITEM | | | VALUE |
|---|---|---|---|---|
| TOTAL | CLUSTER SIZE | | | 4096 |
| | SIZE OF DATA EDITING TABLE | | | 20 |
| TRANSFER DESTINATION FILE (FILE 1) | FILE | FILE SIZE BEFORE EDITING | A | 18000 (5 CLUSTERS) |
| | DATA EDITING TABLE | EDITING PROCESSING TYPE | B | INSERTION |
| | | EDITING START POSITION | C | 10200 (THIRD CLUSTER) |
| | | EDITING DATA SIZE | D | 6000 |
| | | EDITING DATA OFFSET | E | 14496 (FOURTH CLUSTER) |
| | | FILE SIZE AFTER EDITING | F | 30288 (8 CLUSTERS) |
| TRANSFER SOURCE FILE (FILE 2) | FILE | FILE SIZE BEFORE EDITING | G | 22000 (6 CLUSTERS) |
| | DATA EDITING TABLE | EDITING PROCESSING TYPE | H | REMOVAL |
| | | EDITING START POSITION | I | 10400 (THIRD CLUSTER) |
| | | EDITING DATA SIZE | J | 6000 |
| | | EDITING DATA OFFSET | K | 12304 (FOURTH CLUSTER) |
| | | FILE SIZE AFTER EDITING | L | 17904 (5 CLUSTERS) |
| DUMMY FILE | FILE SIZE | | M | 18020 (5 CLUSTERS) |

FIG. 43

| | TRANSFER DESTINATION FILE (FILE 1) | | | TRANSFER SOURCE FILE (FILE 2) | | | DUMMY FILE | | RECOVERY GUIDELINES |
|---|---|---|---|---|---|---|---|---|---|
| | FILE DATA | ACTUAL NUMBER OF CLUSTERS | FILE SIZE | FILE DATA | ACTUAL NUMBER OF CLUSTERS | FILE SIZE | ACTUAL NUMBER OF CLUSTERS | FILE SIZE | |
| BEFORE S61 | BEFORE TRANSFER | 5 CLUSTERS | 18000 (5 CLUSTERS) | BEFORE TRANSFER | 6 CLUSTERS | 22000 (6 CLUSTERS) | NONE | NONE | RESTORATION OF STATE BEFORE TRANSFER IS NOT REQUIRED |
| AFTER S61 | | | | | | | | | |
| AFTER S62 | | | | | | | | | RESTORATION TO STATE BEFORE TRANSFER |
| AFTER S63 | | | | | | | | | |
| AFTER S64 | | | | | | | 4 CLUSTERS | | |
| AFTER S65 | | | | | | | | | |
| AFTER S66 | | | | | | | 5 CLUSTERS | 18020 (5 CLUSTERS) | |
| AFTER S67 | | | | | | | | | |
| AFTER S68 | AFTER TRANSFER | 8 CLUSTERS | 30308 (8 CLUSTERS) | AFTER TRANSFER | 5 CLUSTERS | 17904 (5 CLUSTERS) | | | RESTORATION TO STATE AFTER TRANSFER |
| AFTER S69 | | | | | | | | | |
| AFTER S70 | | | | | | | NONE | NONE | |
| AFTER S71 | | | 30288 (8 CLUSTERS) | | | | | | STATE AFTER TRANSFER |

COMPUTER-READABLE MEDIUM STORING DATA EDITING PROGRAM

CROSS-REFERENCE TO RELATED APPLICATION

This application is based upon and claims the benefit of priority of the prior Japanese Patent Application No. 2013-107980, filed on May 22, 2013, the entire contents of which are incorporated herein by reference.

FIELD

The embodiment discussed herein is related to computer-readable medium storing a data editing program.

BACKGROUND

Following recent increase in capacity of storage media, such as hard disks and secure digital (SD) cards, a demand arose for methods for efficient editing of data of large-size files. In particular, the need for editing large-size video files has increased in small systems with a low processing capacity such as digital cameras. However, when the processing of inserting a new frame or removing some frames is performed with respect to video files, data of the frame stored after the aforementioned frames have to be transferred forward or rearward and such processing takes time. The same problem also arises when the data volume of the frames that are the object of the insertion processing or removal processing is small.

In file systems of file allocation tables (FAT) that are used in storage media, data are stored in cluster units, and data links are managed by the link structure of clusters. As a result of the data being stored in cluster units, by modifying the link structure of the clusters, it is possible to perform the insertion processing or removal processing, without transferring the data. However, in this case, the position of data that are the object of editing is limited to boundary positions of the clusters and the size of data that are the object of insertion processing and removal processing is limited to a multiple of the cluster size. Accordingly, a technique for performing data editing processing which is not limited to the cluster size has been suggested (Japanese Patent Application Publication No. 2001-75856 and Japanese Patent Application Publication No. 2000-298611).

SUMMARY

However, the conventional methods do not take into account the increase in the number of updates of directory entries relating to file creation and deletion in editing processing of data, or the fragmentation of clusters in the file after the editing. As a result, the editing processing takes time and the access to the edited file also takes time. Further, safety of files and security of data in the case in which the editing processing of data is interrupted, for example, when the device power supply is down, has not been taken into account.

According to a first aspect of the embodiment, a non-transitory computer-readable medium storing a data editing program causing a computer to execute data editing processing of a recording medium including a data region which is provided with a plurality of clusters and in which a data file is recorded in the cluster units, and a management region where management data managing the data file are recorded, the data editing processing includes transferring insert data between a transfer start position and a transfer end position in a transfer source file to a transfer insertion position in a transfer destination file; the transferring the insert data including: transferring transfer-start-back-data at and after the transfer start position in a transfer start cluster having the transfer start position of the transfer source file to a first new cluster in which the transfer source file and the transfer destination file have not been recorded, the first new cluster being included in the plurality of clusters; transferring transfer-end-forward-data at and before the transfer end position in a transfer end cluster having the transfer end position of the transfer source file to a second new cluster in which the transfer source file and the transfer destination file have not been recorded, the second new cluster being different from the first new cluster and being included in the plurality of clusters; transferring transfer-insertion-forward-data at and before the transfer insertion position in a transfer insertion cluster having the transfer insertion position of the transfer destination file or transfer-insertion-back-data at and after the transfer insertion position in the transfer insertion cluster to the first new cluster or the second new cluster; and editing the management data with respect to the transfer destination file, such that a cluster which is next to the transfer start cluster is linked after the first new cluster, and a cluster preceding the transfer end cluster is linked before the second new cluster.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an example of a data editing table.

FIG. 8A and FIG. 8B are the first drawing illustrating the flow of data insertion processing in a comparative example.

FIG. 9A and FIG. 9B are the second drawing illustrating the flow of data insertion processing in the comparative example, as the continuation of the processing illustrated in FIG. 8B.

FIG. 12A and FIG. 12B are the second drawing illustrating the flow of data insertion processing in the embodiment, as the continuation of the processing illustrated in FIG. 11C.

FIG. 15 illustrates the file safety when the processing is interrupted in the course of data insertion processing.

FIG. 16A and FIG. 16B are the first drawing illustrating the flow of data removal processing in a comparative example.

FIG. 22 illustrates the file safety when the processing is interrupted in the course of data removal processing.

FIG. 23A and FIG. 23B are the first drawing illustrating the flow data transfer processing in a comparative example.

FIG. 26A and FIG. 26B are the first drawing illustrating the flow of data transfer processing in the present embodiment.

FIG. 28A and FIG. 28B are the third drawing illustrating the flow of data transfer processing in the present embodiment, as the continuation of the processing illustrated in FIG. 27B.

FIG. 30A and FIG. 30B are the fifth drawing illustrating the flow of data transfer processing in the present embodiment, as the continuation of the processing illustrated in FIG. 29B.

FIG. 31 is a flowchart illustrating the data transfer processing of the present embodiment.

FIG. 32A and FIG. 32B illustrate the patterns of data that are written into the two new clusters in the data transfer processing.

FIG. 33A and FIG. 33B illustrate a specific example of data transfer processing in the pattern 1-2.

FIG. 35 illustrates the file safety when the processing is interrupted in the course of data transfer processing.

FIG. 36 illustrates the difference in the number of updates to directory entries, number of new cluster, and fragmentation number between the present embodiment and the comparative example.

FIG. 37 is the first flowchart illustrating the flow of file restoration processing.

FIG. 42 illustrates an example of the data editing table corresponding to the specific example illustrated in FIG. 41A to FIG. 41C.

FIG. 43 illustrates specific examples of file states and restoration guidelines for the transfer destination file (file 1), transfer source file (file 2), and dummy file.

DESCRIPTION OF EMBODIMENTS

The embodiments of the present invention will be described below with reference to the drawings. However, the technical scope of the present invention is not limited to the embodiments and includes the matter described in the claims and equivalents thereof.

[Apparatus Configuration]

Figure 1:
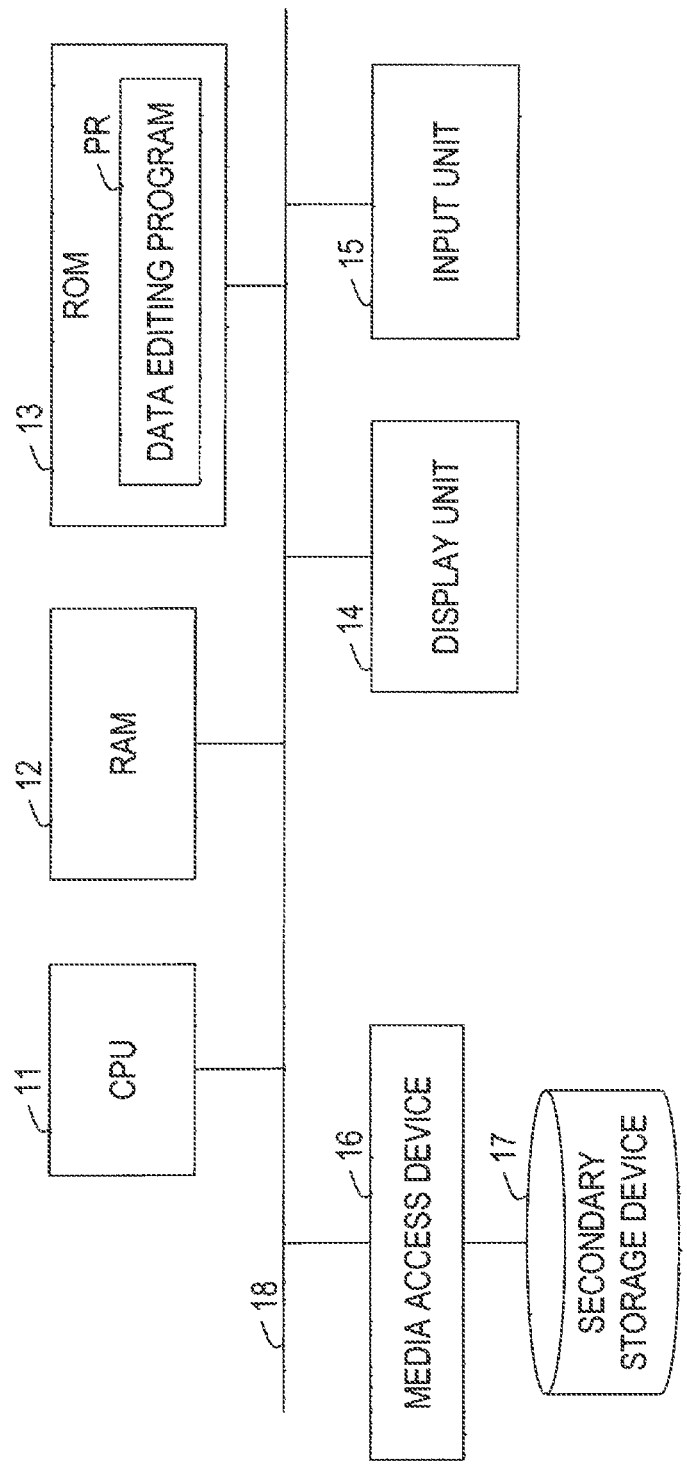
FIG. 1 illustrates an example of a data editing apparatus in the present embodiment.

FIG. 1 illustrates an example of a data editing apparatus in the present embodiment. In the figure, the data editing apparatus has, for example, a central processing unit (CPU) 11, a random access memory (RAM) 12, a read only memory (ROM) 13, a display unit 14, an input unit 15, a media access device 16, and a secondary storage device 17. The units are connected to each other by a bus 18. For example, a data editing program PR of the present embodiment is stored in the ROM 13. The display unit 14 is, for example, a display, and the input unit 15 is a keyboard or a mouse. The media access device 16 is a device that controls access to the nonvolatile secondary storage device 17 such as a hard disk or a flash memory.

[Software Configuration]

Figure 2:
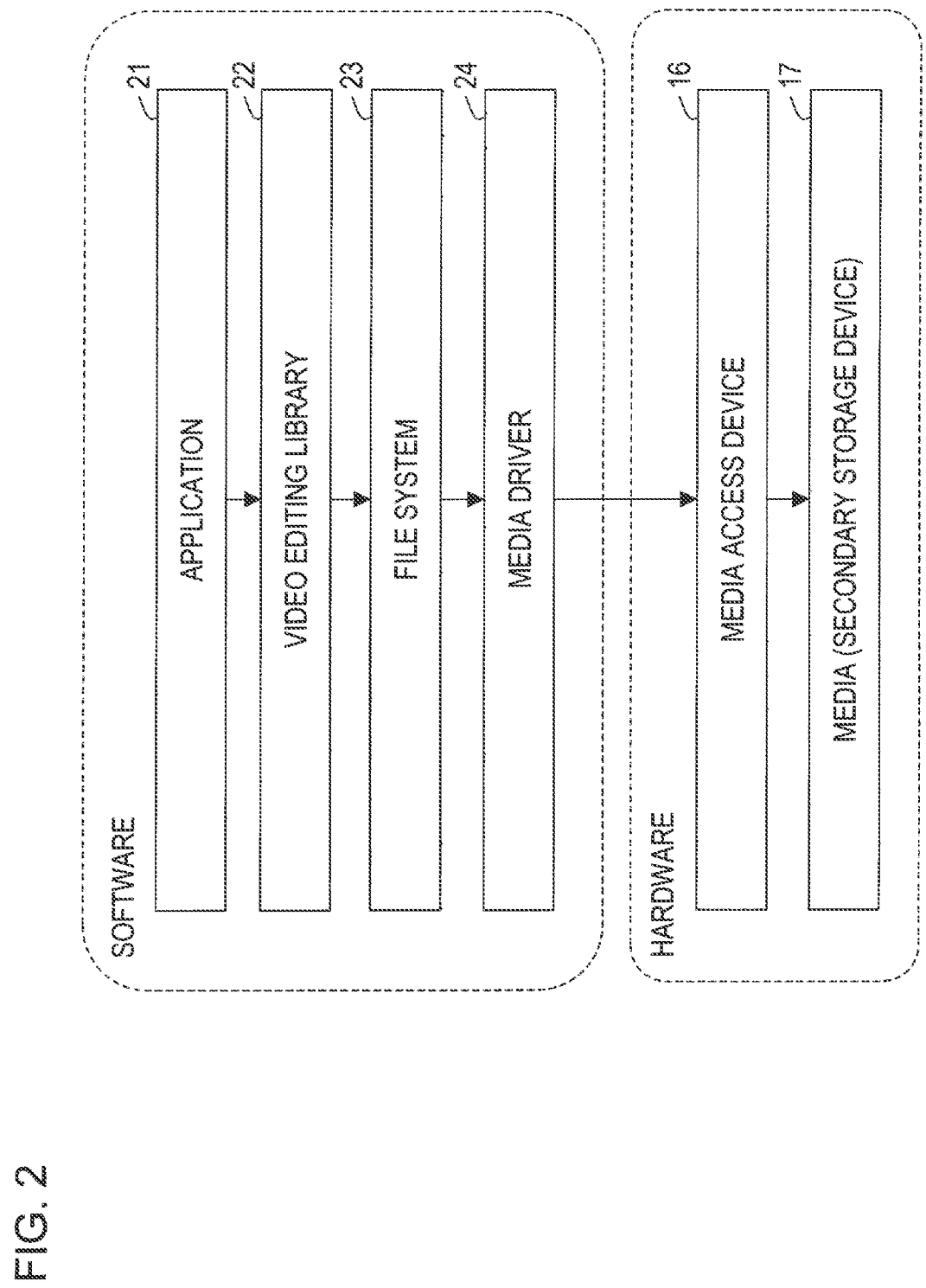
FIG. 2 illustrates an example of software configuration in the data editing apparatus of the present embodiment.

FIG. 2 illustrates an example of software configuration in the data editing apparatus of the present embodiment. The software is stored, for example, in the ROM 13 of the data editing apparatus illustrated in FIG. 1. The data editing program PR of the present embodiment is, for example, a program relating to a file system 23.

The software illustrated in FIG. 2 has, for example, an application 21, a video editing library 22, the file system 23, and a media driver 24. For example, where an operation performed by the user is accepted, the application 21 performing video editing or the like notifies the video editing library 22 of operation instruction information corresponding to the user's operation. For example, the operation instruction information is information indicating the processing of inserting data into a file recorded in the secondary storage device 17, the processing of removing data therefrom, and the processing of transferring data between the files. The video editing library 22 converts the operation instruction information to adapt to the interface of the file system 23 and notifies the file system 23. The file system 23 notifies the media driver 24 of the command based on the operation instruction information.

The hardware illustrated in FIG. 2 has the media access device 16 and the media (secondary storage device) 17. The media access device 16 reads, writes, or deletes information stored in the secondary storage device 17 on the basis of the command inputted from the media driver 24. The secondary storage device 17 of the present embodiment is formatted as a file allocation table (FAT) file system. The FAT file system is explained below.

[FAT File System]

Figure 3A:
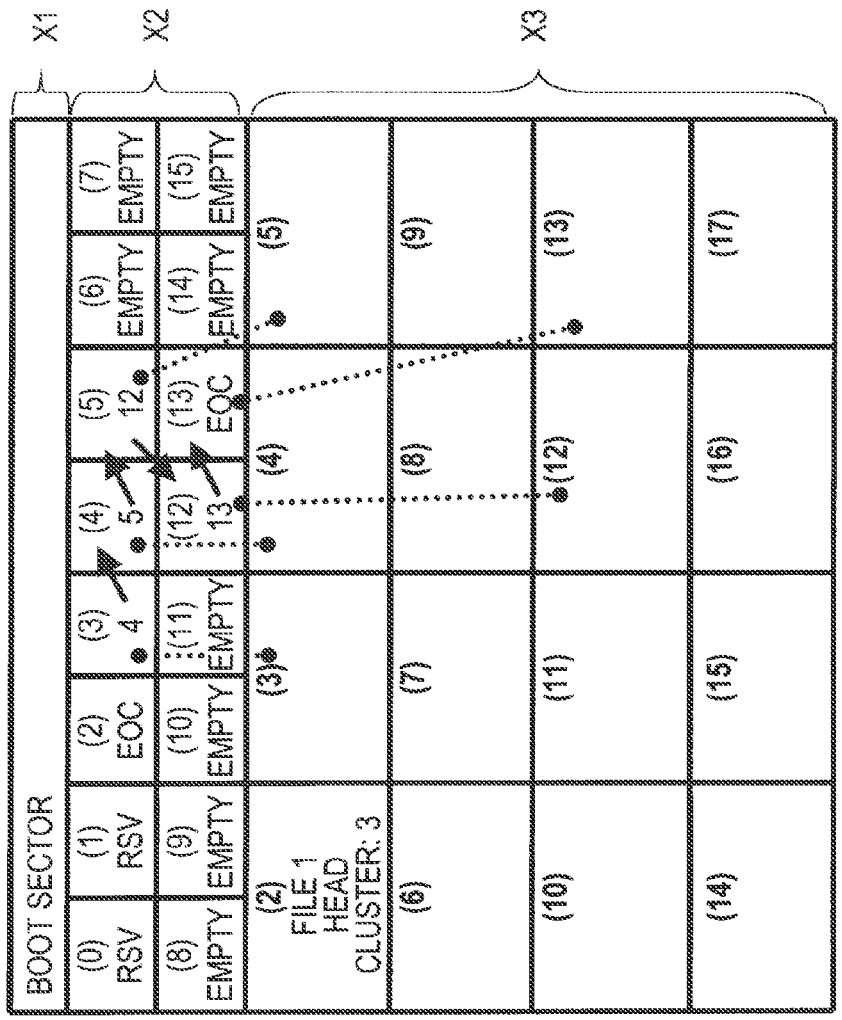
FIG. 3A and FIG. 3B exemplify an outline of a FAT file system.
Figure 3B:
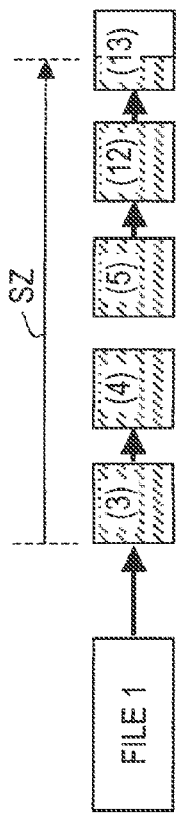

FIG. 3A and FIG. 3B exemplify an outline of a FAT file system. In the FAT file system, data are stored by using a cluster as a logical unit. Therefore, one or a plurality of clusters is allocated according to the size of data in the file. As illustrated in FIG. 3A, the FAT file system has, for example, three following regions: a boot sector region X1, a FAT region (management region) X2, and a file/directory region (data region) X3.

Information relating to the entire configuration, such as the capacity of the secondary storage device and a cluster unit size, is stored in the boot sector region X1. The boot sector region X1 is managed, for example, on the basis of 512-byte sector units. Further, file management information called directory entries and file data are stored in the file/directory region X3. The file/directory region is managed in cluster units of a size larger than that of the sector (greater than the sector size by a factor of two to the n-th power). The management information includes information such as a file name, a file size, and the serial number of the initial cluster where the data will be stored.

FAT entries that have been allocated at a one-to-one ratio to the clusters in the file/directory region are stored in the FAT region X2. Each FAT entry has a value (12 bit, 16 bit, or 32 bit) indicating the state of the corresponding cluster. More specifically, when the corresponding cluster is not used, the FAT entry has a value indicating the empty state. When the corresponding cluster is being used and data successive to the data that will be stored in the cluster are present, the FAT entry has the serial number of the cluster where the successive data are to be stored. Meanwhile, where the successive data are not present, the FAT entry has a value indicating the end of cluster (EOC). The serial number of the clusters starts, for example, from 2, whereas the serial number of the FAT entries starts from 0. Therefore, the FAT entries with the serial numbers of 0 and 1 store values indicating the reserved regions.

In other words, in the FAT file system, the object file is managed on the basis of one cluster or the chain of a plurality of clusters (cluster chain), with the directory entry being the head entry. More specifically, for the object file, the initial data are stored in the cluster with the serial number that is stored in the directory entry. The serial number of the next cluster linked to the initial cluster, or the value (EOC) indicating that the initial cluster is the tail cluster, is stored in the FAT entry corresponding to the initial cluster.

FIG. 3B illustrates an example of the structure of the object file (file 1), which corresponds to the configuration illustrated in FIG. 3A. In the present embodiment, a square illustrates a cluster, and the number presented inside the square illustrates the serial number of the cluster. In the present example, data of the file 1 are sequentially stored in cluster 3, which is the head cluster, cluster 4, cluster 5, cluster 12, and cluster 13.

For example, when data of the file 1 are read, the file system 23 acquires the file name and file size of the file 1 and also the serial number 3 of the head cluster where data will be recorded from the directory entry stored in the cluster 1. Then, the file system 23 acquires the serial number 4 of the next linked cluster, which has been stored in the FAT entry 3 corresponding to the cluster 3. Then, the file system 23 likewise acquires the serial number 5 of the cluster stored in the FAT entry 4 corresponding to the cluster 4. Information on the cluster 12 and cluster 13 successive to the cluster 5 is likewise acquired. Since the cluster 13 is the cluster at the very end of the file 1, the EOC is stored in the FAT entry 13.

Thus, in the FAT file system, the chain of data stored in cluster units in the file/directory region X3 is managed on the basis of the entries in the FAT region X2. Therefore, the file system can change the data chain by rewriting the serial numbers of the clusters stored in the FAT entries. In FIG. 3B, the size of the file 1 corresponds to the value SZ illustrated by an arrow.

[Fragmentation of Clusters]

The fragmentation of clusters in the present embodiment indicates a state in which the serial numbers of the clusters constituting data of one file are not consecutive. Thus, the fragmentation indicates a state in which the storage positions of data in the secondary storage device are not consecutive. For example, in FIG. 3B, the file 1 stores data in cluster 3 as a head cluster, cluster 4, cluster 5, cluster 12, and cluster 13 in the order of description. Therefore, in the file 1, the serial numbers of the clusters are not consecutive between cluster 3 to cluster 5 and cluster 12 and cluster 13, and the fragmentation number is 1. When the fragmentation number of the clusters is large, the access rate of the file data decreases.

The structure of the file having video data is explained below. In the present embodiment, the flow of processing is explained on the basis of editing processing of video data. However, the data editing processing in the present embodiment is not limited to the editing of video data.

[Structure of Video File Data]

Figure 4:
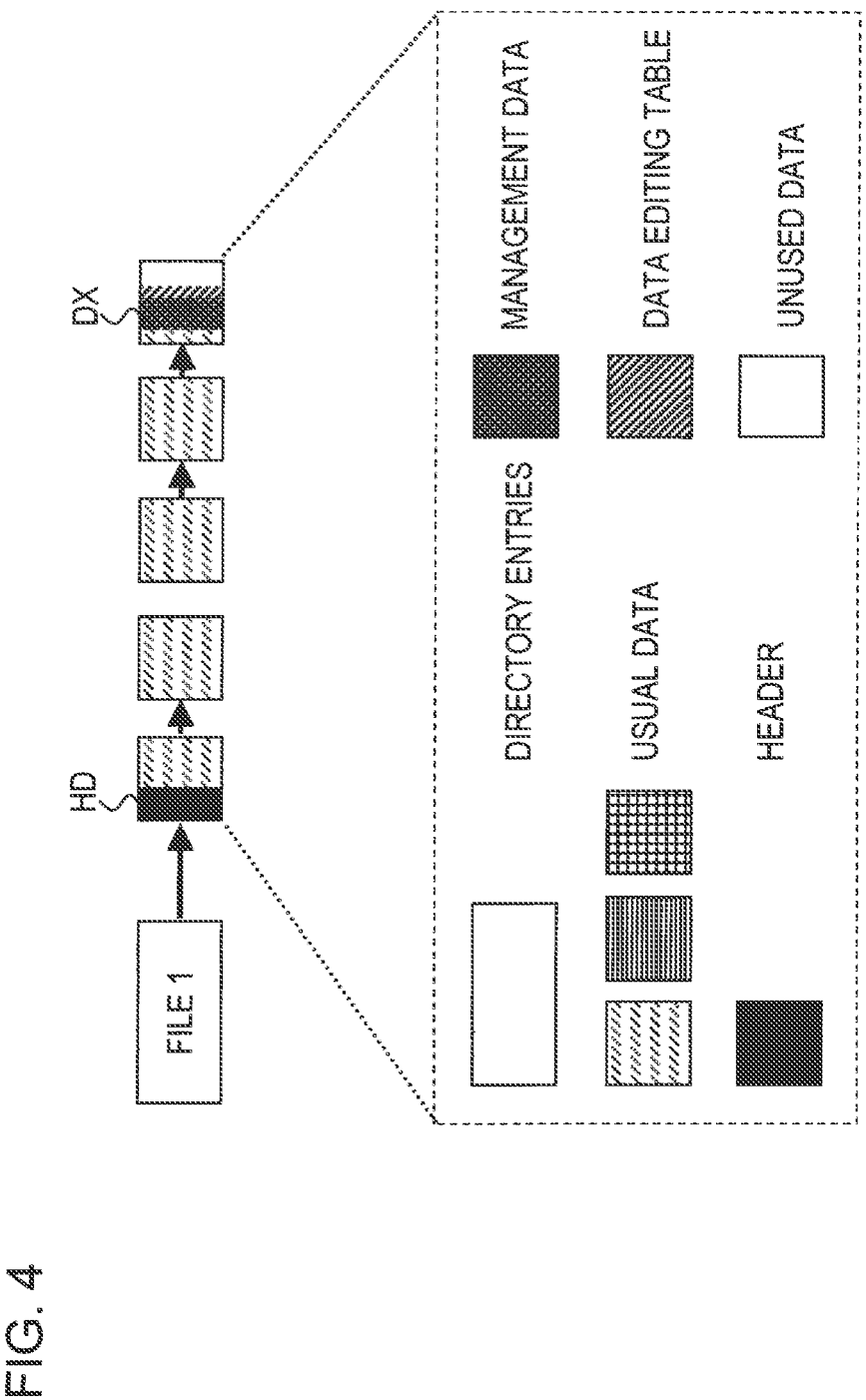
FIG. 4 illustrates an example of the structure of the file 1 including video data.

FIG. 4 illustrates an example of the structure of the file 1 including video data. The video data have a header HD and management data DX in addition to the usual data. The header HD has, for example, identification information indicating that the file 1 is a file having video data. Further, the management data DX include a position (offset) within the data of the frames constituting the vide data and an index indicating the size. One entry in the index is associated with one frame.

In the present embodiment, the blackened region in the cluster indicates the header HD, the region with black dots indicates the management data DX, and the black portion indicates an unused region. The oblique line, transverse line, and grid-like regions in a cluster each indicate a data portion, and the oblique line region indicates a data editing table region. The data editing table will be explained hereinbelow. For example, when the reproduction of the file 1 is indicated, data are sequentially referred to on the basis of the FAT entries and identified as video data on the basis of the header HD contained in the data. Thus, the data of the frame corresponding to the reproduction instruction are sequentially read on the basis of the index stored in the data tail. Thus, with the file having video data, the index corresponding to each frame is used to access the data corresponding to the frame. Therefore, the file having video data may have an unused region in the middle of the data.

[Data Editing Table]

FIG. 5 illustrates an example of a data editing table. In the present embodiment, the data editing table has, for example, editing instruction information and editing result information. In the figure, the editing instruction information indicates input classification, and the editing result information indicates output classification.

The data editing table is inputted, for example, from the video editing library 22 (FIG. 2) following a data editing instruction, and temporarily stored in the data tail during the data editing processing. In this case, the editing instruction information is stored in the data editing table. As a result, even when the data editing processing is interrupted, the file is restored to the state before the editing processing or after the editing processing. Once the data editing is completed, the editing result information is assigned to the data editing table, and the data editing table also deleted from the data tail and outputted to the video editing library 22.

The editing instruction information has, for example, information on the editing processing type, editing start position, and editing data size. The editing processing type is either INSERTION or REMOVAL. When data insertion is instructed, INSERTION is set, and when data removal is instructed, REMOVAL is set. In the case of data transfer processing, the data editing table corresponding to data insertion processing is assigned to the data transfer destination file, and the data editing table corresponding to the data removal processing is assigned to the data transfer source file. The editing start position indicates the position of the editing processing object in the data within the file. More specifically, the editing start position indicates a data insertion start position in the case of the insertion processing and the start position for the data that are the removal object in the case of the removal processing. The editing data size indicates the size of the data that are the removal object. More specifically, the editing data size indicates the size of the insertion data in the case of the insertion processing and the size of the data that are the removal object in the case of the removal processing.

The editing result information has, for example, information on the editing data offset and file size after the editing. The editing data offset indicates the head position of the data inserted or transferred by the editing processing. More specifically, the editing data offset indicates the start position of insertion data in the case of the insertion processing and the start position of the data behind the removed data in the case of the removal processing.

Examples of values in the data editing table will be explained below on the basis of data insertion processing and data removal processing.

[Example of Data Editing Table: Data Insertion Processing]

Figure 6:
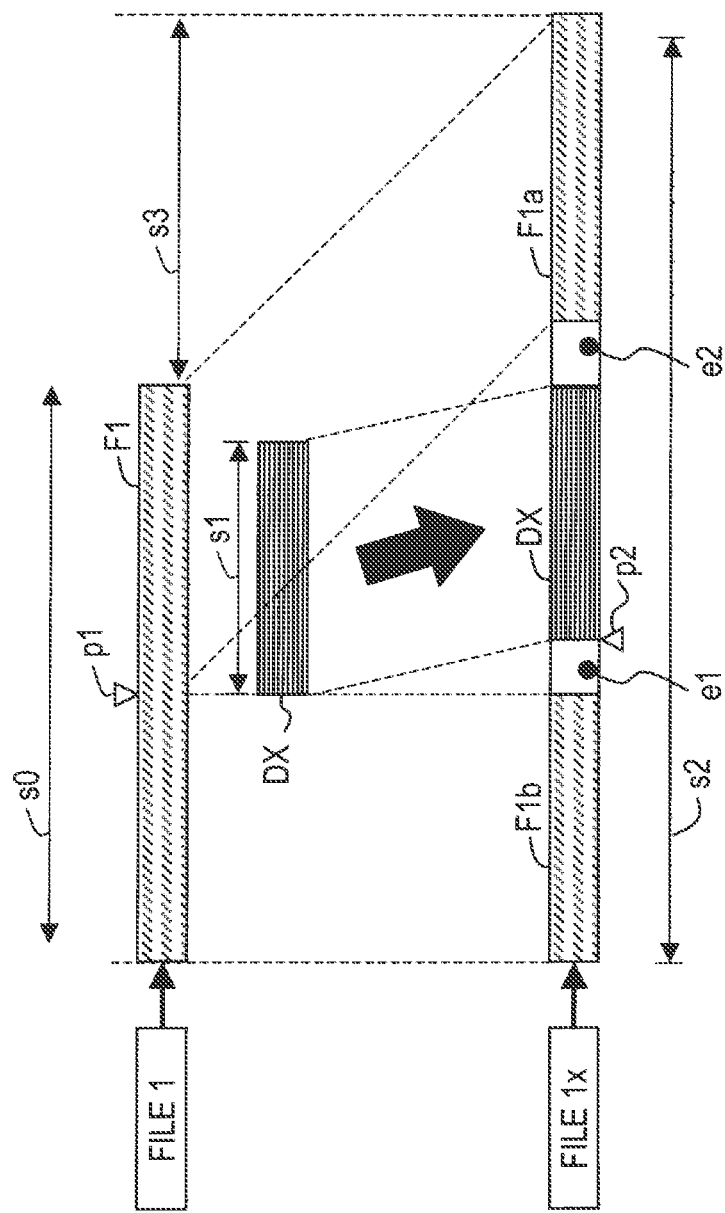
FIG. 6 illustrates an example of data insertion processing.

FIG. 6 illustrates an example of data insertion processing. In the figure, the file 1 before the data insertion and the file 1x after the data insertion are illustrated by way of example. In this example, insertion data DX represented by transverse lines are inserted at an insertion position p1 in data F1 of the file 1 represented by oblique lines. The insertion data DX are temporary data on a memory space, rather than the data stored in the secondary storage device.

In the file 1x after the editing, which is illustrated in FIG. 6, the insertion data DX are added after the data insertion position p1 and the data at and after the data insertion position p1 are transferred to a location after the insertion data DX. In this example, the data insertion position p1 is arranged in the middle of the cluster, and writing of the insertion data DX is started from the head of the new cluster. Therefore, in the file 1x, unused regions e1, e2 indicated by blanks are present between the original data F1b before the data insertion position p1 and the insertion data DX and between the insertion data DX and the original data F1a after the data insertion position p1.

In the example illustrated in FIG. 6, the editing processing type in the editing instruction information in the data editing table assigned to the file 1 is INSERTION, the editing start position is the data insertion position p1, and the editing data size is a size s1 of the insertion data DX. The editing data offset in the editing result information in the data editing table generated after the editing is a start position p2 of the insertion data in the file 1x after the editing. Further, the file size after the editing is a size s2 including the unused regions e1, e2. Thus, in this example, since the file 1x after the editing includes the unused regions, the editing start position p1 in the file 1 before the editing and the offset p2 of the editing data in the file 1x after the editing do not match. Further, by subtracting a size s0 of the file 1 before the editing from the size s2 of the file 1x after the editing, it is possible to detect a transfer amount s3 of the data after the data insertion position p1 (editing start position) in the file 1x after the editing from the position thereof before the editing.

[Data Editing: Removal]

The data removal processing will be explained below with reference to FIG. 7. In the figure, a file 2 before the removal of data and a file 2x after the removal of data are illustrated by way of example. In this example, data from a removal start position p3 to a removal end position p4 are removed from data F2 of the file 2 represented by oblique lines.

Figure 7:
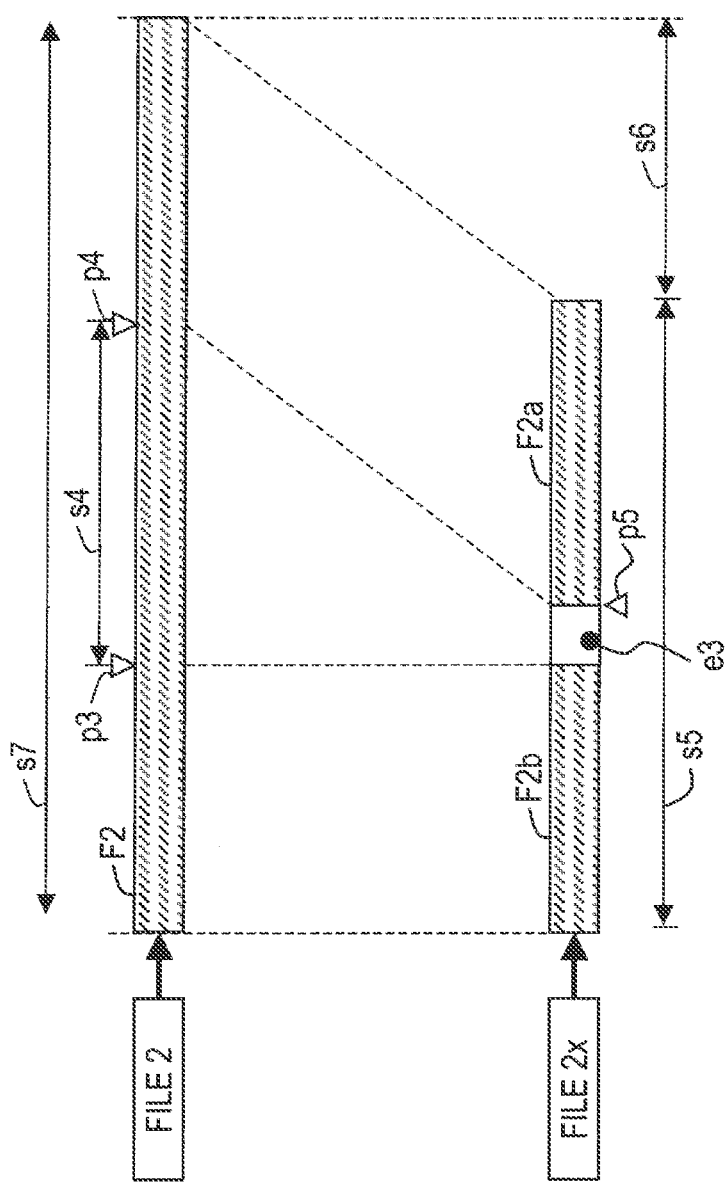
FIG. 7 illustrates the data removal processing.

Since the data from the removal start position p3 to the removal end position p4 are removed in the file 2x after the editing, which is illustrated in FIG. 7, data after the removal end position p4 are shifted forward. In this example, since the removal start position p3 and the removal end position p4 are positioned in the middle of a cluster, an unused region e3 represented by a blank is present between the original data F2b before the removal start position p3 and the original data F2a after the removal start position p4 in the file 2x.

In the example illustrated in FIG. 7, the editing processing type in the editing instruction information in the data editing table assigned to the file 2 is REMOVAL, the editing start position is the removal start position p3, and the editing data size is a size s4 from the removal start portion p3 to the removal end position p4. The editing data offset in the editing result information in the data editing table generated after the editing is a start position p5 of the data after the removal end position p4 in the file 2x after the editing. Further, the file size after the editing is a size s5 including the unused region e3. Thus, in this example, since the file 2x after the editing includes the unused region, the editing start position p3 in the file 2 before the editing and the offset p5 of the editing data in the file 2x after the editing do not match. Further, by subtracting a size s7 of the file 2 before the editing from the size s5 of the file 2x after the editing, it is possible to detect a transfer amount s6 of the data F2a after the data insertion position p5 (editing start position) in the file 2x after the editing.

The processing of the data editing program PR in the present embodiment will be explained hereinbelow on the basis of a specific example. The editing processing of data in the present embodiment is data insertion processing, processing of removing some data in a file, and processing of transferring data between the files. Those types of editing processing will be sequentially explained in comparison with comparative examples. The data insertion processing is the first to be explained.

Data Insertion Processing: Comparative Example

FIG. 8A and FIG. 8B are the first drawing illustrating the flow of data insertion processing in a comparative example. In the figures, as mentioned hereinabove, the region represented by oblique lines in the cluster represented by a square indicates data of an insertion destination file, the region represented by transverse lines indicates insertion data, and a blank portion indicates an unused region. In the figures, a dot-line arrow indicates a link of cluster fragmentation in the comparative example, the data indicate non-video data, and the region ff represented by grid dots indicates attribution information. In the comparative example, as a result of managing the unused region on the basis of the attribution information, data can be accessed even when a cluster includes the unused region.

FIG. 8A illustrates an insertion destination file before the data insertion processing. In this example, the file 1, which is the insertion destination file, is constituted by six clusters.

A data insertion position P1 is included in the third cluster. Then, as illustrated in FIG. 8B, the insertion data represented by transverse lines are written as the file 2 into the secondary storage device. In this example, the insertion data are sequentially written into four clusters.

FIG. 9A and FIG. 9B are the second drawing illustrating the flow of data insertion processing in the comparative example, as the continuation of the processing illustrated in FIG. 8B. In FIG. 9A, the file 1, which is the insertion destination file, is divided into a file 1 and a file 3. More specifically, data at and after the insertion position P1 of the cluster (referred to hereinbelow as "insertion cluster") having an insertion position in the file 1 are transferred to a new cluster N1 and stored as the file 3, and a cluster C1 next to the insertion cluster is linked after the new cluster N1 (B1). Since the new cluster N1 and the cluster C1 next to the insertion cluster are not the consecutive clusters, a fragmentation state is assumed between the new cluster N1 and the cluster C1 next to the insertion cluster. Therefore, the link B1 is represented by a dot-line arrow.

Then, in FIG. 9B, the file 1 and the file 2 are linked. More specifically, a head cluster C2 among the clusters of the file 2 is linked after the insertion cluster of the file 1 (B2), and the entry of the file 2 in the directory entries is deleted. Although the file 2 has been deleted, the clusters attached to the file 2 are referred to as clusters of the file 2. A fragmentation state is assumed between the insertion cluster of the file 1 and the head cluster C2 of the file 2, and a link B2 is represented by a dot-line arrow.

In FIG. 9B, the file 1 to which the file 2 has been linked is then linked to the file 3. More specifically, the new cluster N1 of the file 3 is linked next to the cluster C2 (cluster at the very end of the file 2) at the very end of the file 1 (B3), and the entry of the file 3 in the directory entries is deleted. In this case, a fragmentation state is assumed between the cluster C2 at the very end of the file 1 and the new cluster N1 of the file 3.

As a result, in the comparative example, the insertion data are inserted into the file 1. In the comparative example, the data insertion processing is performed by using the file division processing and file linking processing. Therefore, the data insertion processing is performed by dividing the file 1, which is the insertion destination file, into the file 1 and file 3 by using the insertion position P1 as a division point, and linking the files to the file 2 where the insertion data have been stored.

In the data insertion processing of the comparative example, one new cluster N1 is used. The fragmentation number of clusters in the file after the data insertion processing is 3 (B1 to B3). Further, in the comparison example, the access to the directory entries is generated a total of three times, namely, once when the file 2 is generated anew and twice (updating of the file 1 and file 3 in the directory entries) when the file 1 is divided. The access to the directory entries is also generated four times, namely, twice when the file 1 and the file 2 are linked and twice when the file 1 and the file 3 are linked (the linking source file and linking destination file in the directory entries are updated). Therefore, the access to the directory entries in the data insertion processing in the comparative example is generated a total of seven times.

Flowchart of Data Insertion Processing: Comparative Example

Figure 10:
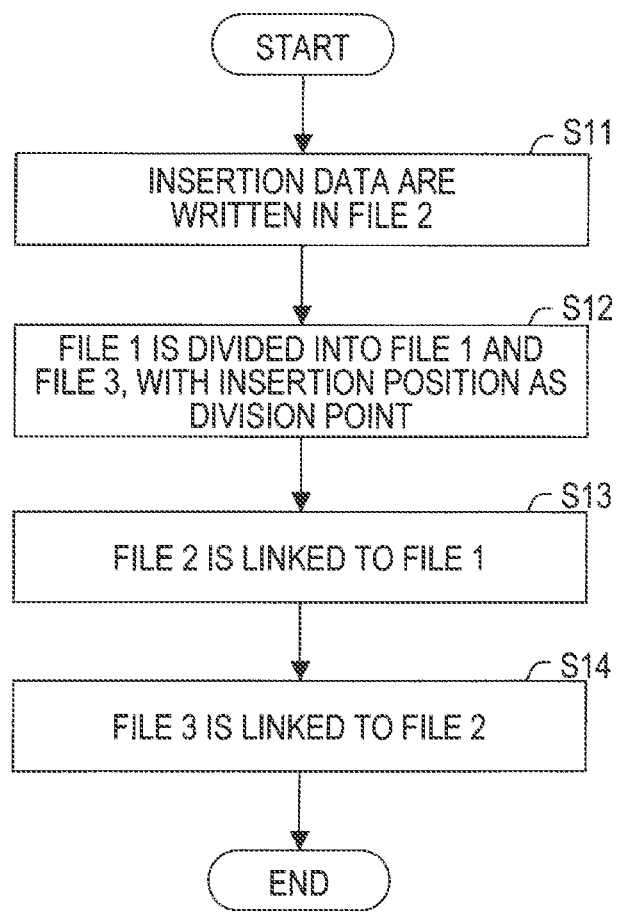
FIG. 10 is a flowchart illustrating the data insertion processing in the comparative example.

FIG. 10 is a flowchart illustrating the data insertion processing in the comparative example. As illustrated in the figure, the insertion data are initially written into the new file 2 (S11). Then, the file 1, which is an insertion destination file, is divided into the file 1 and the new file 3 (S12). More specifically, data at and after the insertion position of the insertion cluster are transferred to the new cluster N1, and the cluster C1 next to the insertion cluster is linked (B1) after the new cluster N1 and stored as the file 3.

The file 2 is then linked to the file 1 (S13). More specifically, the head cluster C2 of the file 2 is linked (B2) after the insertion cluster of file 1, and the entry of the file 2 is deleted from the directory entries. The file 3 is then linked to the file 1 to which the file 2 has been linked (S14). More specifically, the new cluster N1 of the file 3 is linked (B3) next to the cluster N2 (cluster at the very end of the file 2) at the very end of the file 1, and the entry of the file 3 is deleted from the directory entries. The insertion data are thus inserted to the insertion position of the file 1.

Data Insertion Processing: Present Embodiment

Figure 11A:
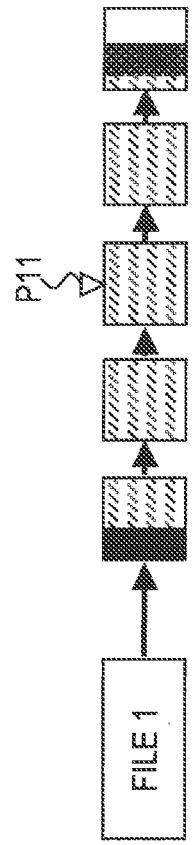
FIG. 11A to FIG. 11C are the first drawing illustrating the flow of data insertion processing in the present embodiment.
Figure 11B:
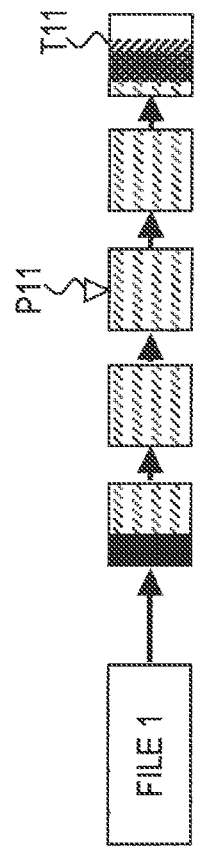
Figure 11C:
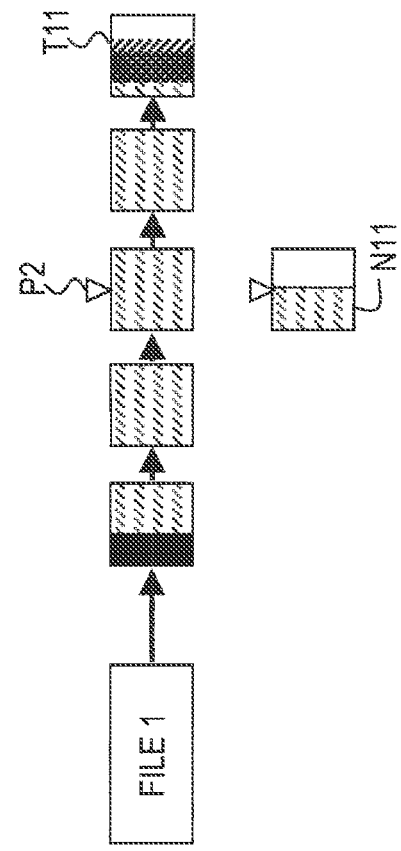

FIG. 11A to FIG. 11C are the first drawing illustrating the flow of data insertion processing in the present embodiment. FIG. 11A illustrates the insertion destination file before the data insertion processing. In this example, the file 1, which is the insertion destination file, is constituted by five clusters. An insertion position P11 of data is included in the third cluster.

In FIG. 11B, a data editing table T11 is added to the very end of the file. The editing instruction information including an editing processing type indicating INSERTION, an editing start position indicating the insertion position P11 in the file 1, and an editing data size indicating the size of the insertion data is stored in the data editing table T11. Although the size of the file 1 increases as a result of attaching the data editing table T11, at this point of time, the size of the file 1 managed in the directory entries is not updated. Then, in FIG. 11C, data at and before the insertion position in the insertion cluster having the insertion position P11 in the file 1 are written into a new cluster N11.

FIG. 12A and FIG. 12B are the second drawing illustrating the flow of data insertion processing in the embodiment, as the continuation of the processing illustrated in FIG. 11C. In FIG. 12A, insertion data D11 represented by transverse lines are written successively to the new cluster N11. Then, in FIG. 12B, the insertion cluster is linked (B11) after the cluster C11 at the very end of the cluster to which the insertion data D11 have been added. In this case, a fragmentation state is assumed between the tail cluster C11 and the insertion cluster of the file 1.

Figure 13A:
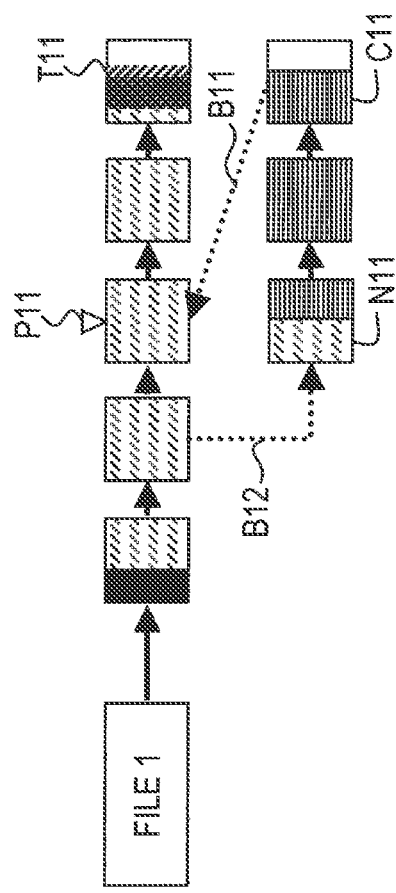
FIG. 13A and FIG. 13B are the third drawing illustrating the flow of data insertion processing in the embodiment, as the continuation of the processing illustrated in FIG. 12B.
Figure 13B:
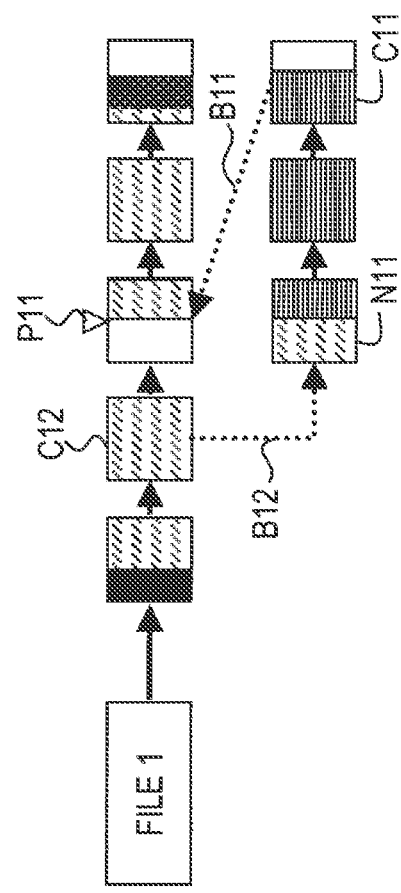

FIG. 13A and FIG. 13B are the third drawing illustrating the flow of data insertion processing in the embodiment, as the continuation of the processing illustrated in FIG. 12B. Here, the size of the file 1 managed by the directory entries is updated prior to relinking processing (B12) of the cluster chain of the file 1 in FIG. 13A. More specifically, the size of the file 1 is updated to the value obtained by adding the size of the insertion data D11 and the size of the data editing table T11 to the file size before the editing. As a result, a state in which the data editing table of the file 1 can be read is assumed after the relinking processing (B12) of the cluster chain.

The file size update is performed in preparation for the processing (B12) of relinking the cluster chain with respect to the file 1 that will be thereafter performed. As a result of performing the relinking processing (B12) of the cluster chain, the number of clusters constituting the file 1 is increased and some data of the file 1 before the editing are not able to be read. For this reason, before the relinking processing (B12) of the cluster chain, the data editing program PR enlarges the size of the file 1 to the size such that all of the data in the file before the editing and also the data editing table could be read. As a result, even when the editing processing is interrupted after the relinking of the cluster chain, the data editing PR can restore the file 1 to the state after the data editing on the basis of the data editing table. The restoration processing of the file based on the data editing table is described in detail hereinbelow.

In the relinking (B11) of the cluster chain in FIG. 12B, the file 1 is unaffected when a separate cluster is linked before the clusters constituting the file 1. Thus, the file 1 is affected when a separate cluster is linked after the clusters constituting the file 1. For this reason, the update processing of the file size is not performed before the relinking (B11) processing of the cluster chain in FIG. 12B.

Further, in FIG. 13A, the cluster chain of the file 1 is updated by linking (B12) the new cluster N11 after the cluster C12 preceding the insertion destination cluster of the file 1. The cluster C12 preceding the insertion destination cluster and the new cluster N11 are in a fragmentation state. The offset of each frame in the index of the file 1 is then updated. More specifically, the indexes of the insertion data D11 and the data at and after the insertion position P11 for which the offset is changed by the insertion of data are updated. Further, the region before the insertion position P11 in the insertion cluster is changed to the unused state. In FIG. 13B, the data editing table T11 is deleted and the file size managed in the directory entries is updated. In this case, the size of the file 1 is updated to a value obtained by adding the size of the insertion data to the size of the file before the editing.

Thus, in the data insertion processing of the present embodiment, one new cluster N11 is used. Further, the fragmentation number of the clusters in the file after the data insertion processing is 2 (B11, B12). Furthermore, in the present embodiment, the directory entries are accessed one by one when the size of the file 1 is updated. Therefore, in the data insertion processing of the present embodiment, the access to the directory entries is generated a total of two times.

[Case in which Data Editing Table is not Used]

The use of the data editing table in the present embodiment is not mandatory. When the data editing table is not used, the file size update processing performed immediately before the processing illustrated in FIG. 13A can be omitted. As a result, in this case, the file size update processing becomes one-cycle update processing to a value obtained by adding the size of the insertion data to the size of the file before the editing which is illustrated in FIG. 13B. Therefore, the number of updates of directory entries in the data insertion processing performed when the data editing table is not generated is one.

Flowchart of Data Insertion Processing: Present Embodiment

Figure 14:
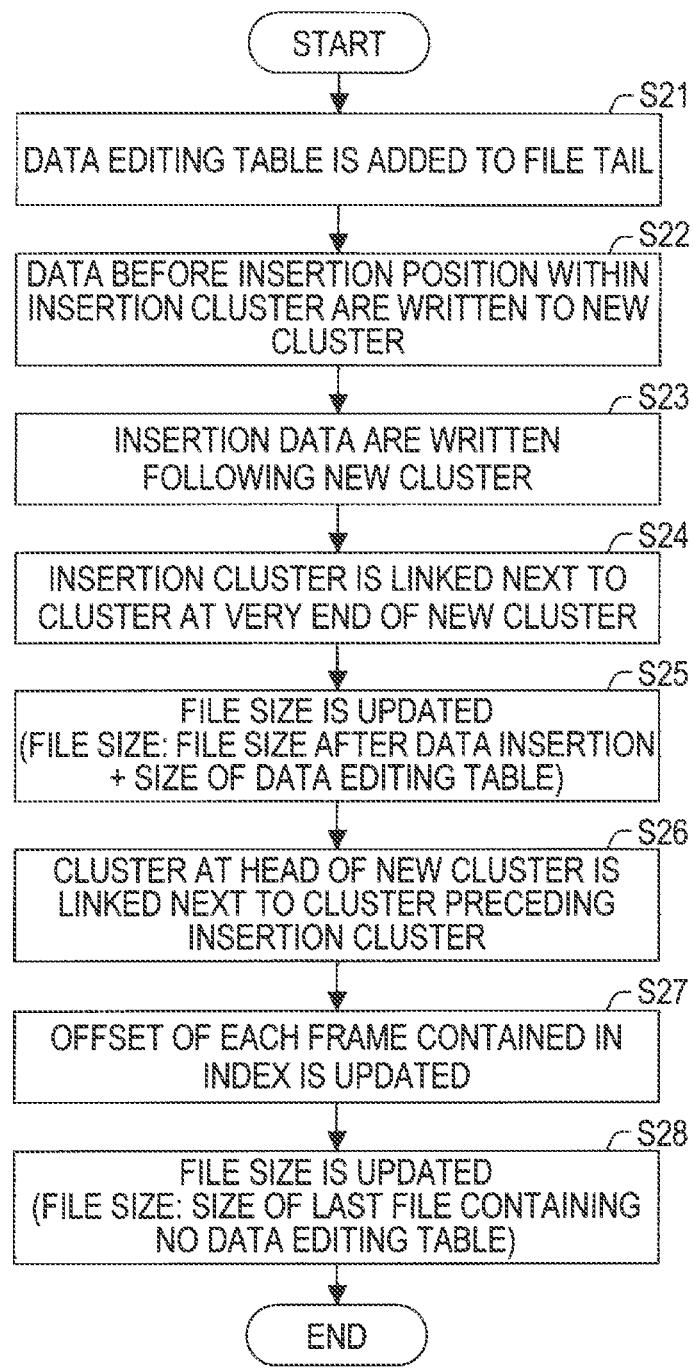
FIG. 14 is a flowchart illustrating the data insertion processing in the present embodiment.

FIG. 14 is a flowchart illustrating the data insertion processing in the present embodiment. In the figure, the data editing program PR initially adds the data editing table T11 to the tail of data of the file 1 which is the insertion designation file (S21). For example, the data editing table T11 is generated and delivered by the video editing library. When the data editing table is not generated, the processing of step S21 can be omitted.

Then, the data editing program PR writes the data preceding the insertion position P11 within the insertion cluster in the file 1 into the new cluster N11 (S22). The data editing program PR then writes the insertion data after the new cluster N11 (S23). Then, the data editing program PR links (B11) the insertion cluster after the tail cluster C11 (S24). The data editing program PR then updates the file size of the file 1 (S25). The data editing program PR updates the size of the file 1 to a value obtained by adding the size of the insertion data and the size of the data editing table T11 to the size of the file 1 prior to editing. When the data editing table is not used, the processing of step S25 can be omitted. The data editing program PR links (B12) the new cluster N11 after the cluster C12 preceding the insertion destination cluster of the file 1 (S26).

Thus, the data editing program PR in the present embodiment initially links (B11) to the new cluster N11 the cluster that is linked after, from among the cluster that is linked after and the cluster that is linked before. Thus, in this example, the data editing program PR initially links the insertion cluster after the cluster at the very end of the new cluster N11 in step S24 and then links the cluster C12 preceding the insertion destination cluster of the file 1 before the new cluster N11 in step S26. As a result, the data editing program PR can delay the timing at which the cluster chain of the file 1 is chained and can maintain the file 1 in the state before the editing till the cluster chain is changed.

The data editing program PR then updates the offset of each frame in the indexes contained in the data of the file 1 (S27). For example, the data editing program PR updates the indexes corresponding to the data at and after the insertion position and the insertion data. In this case, the editing result information contained in the data editing table T11 is updated. More specifically, the editing data offset indicating the start position of insertion data and the file size after the editing in the editing result information are updated.

The data editing program PR then carries the data editing table T11 over to the video editing library 22 and deletes the table from the file 1, and also updates the file size of the file 1 to a value obtained by adding the size of the insertion data to the size before the editing (S28). As a result, the video editing library 22 can accurately detect the contents of the editing processing on the basis of the editing result information.

Thus, in the data insertion processing performed by the data editing program PR of the present embodiment, the number of updates of directory entries is reduced (from 7 to 2) and the fragmentation number of the clusters is reduced (from 3 to 2) by comparison with those in the comparative example. When the data editing table is not used in the present embodiment, the number of updates of directory entries can be further reduced by one (from 7 to 1). As a result, by inhibiting the number of updates of directory entries, the data editing program PR of the present embodiment can raise the efficiency of access to the secondary storage device and raise the speed of data insertion processing. Further, by inhibiting the cluster fragmentation number, the data editing program PR of the present embodiment can increase the speed of access to the file after the editing and use efficiently the regions of the file system.

Further, in the present embodiment, the file data are, for example, video data and therefore may include an unused region within a cluster. Thus, since the position of the data editing object is not limited to the cluster boundary, the data editing program PR can minimize the transfer of data that have been stored in advance in the secondary storage medium.

Further, in the present embodiment, since the data editing table having editing instruction information is added to the very end of the data, the insertion destination file can be restored to the state before the editing or the state after the editing even when the data insertion processing is interrupted.

[Interruption of Data Insertion Processing]

FIG. 15 illustrates the file safety when the processing is interrupted in the course of data insertion processing. The processing is interrupted, for example, when the power source of the device is down and data insertion processing is interrupted or when the data editing program PR is forcibly stopped. This figure also includes the file states and restoration guidelines corresponding to each step of the flowchart illustrated in FIG. 14. The file states are the states of file data, file size, index, data editing table, and non-referred data.

More specifically, in FIG. 15, the file 1, which is the insertion destination file, is in the state before the editing processing before step S21, and in the state after the editing processing after step S28. As a result, safety of the file 1 is ensured even when the editing processing is interrupted. Although the data editing table is added after step S21, the file size is not updated. Therefore, the file 1 is in the state before the editing and safety of the file 1 is ensured.

After steps S22 to S25, the cluster chain of the file 1 is unchained. In other words, the file 1 is in the state before the editing. Therefore, safety of the file 1 is ensured even when the editing processing is interrupted after steps S22 to S25. However, since the insertion data have been stored in the secondary storage device, they remain as non-referred data. For this reason, clear processing of the inserted data (and the data editing table), which are the non-referred data, is performed according to the restoration guidelines. However, after step S25, the state is before the cluster chain is changed, and the file size is updated to the size after relinking of the cluster chain. Therefore, mismatch occurs in file sizes. In this case, the file size is updated for the file 1 on the basis of editing instruction information of the readable data editing table and the file is restored to the state before the editing.

When the editing processing is interrupted after step S26, relinking of the cluster chain is performed, whereby the mismatch of file sizes is eliminated, but the indexes assume a mismatched state. In this case, the indexes are updated with respect to the file 1 on the basis of the editing instruction information of the data editing table, and also the data editing table is deleted and the file is restored to the state after the editing. Then the data editing processing is interrupted after step S27, the data editing table is deleted from file 1, the file size is updated, and the file is restored to the state after the editing.

Thus, with the data editing program PR of the present embodiment, even when the processing is interrupted after any step in the editing processing, the insertion destination file can be restored to the state before the editing or the state after the editing by using the data editing table having editing instruction information. As a result, safety of the insertion destination file is maintained. Further, by adding the data editing table to the very end of the file, the data editing program PR can restore the insertion destination file on the basis only of the data stored in the secondary storage device. The file restoration processing is described in detail hereinbelow.

As mentioned hereinabove, when the insertion data are inserted at the insertion position in the insertion destination file in the editing processing, the data editing program PR of the present embodiment transfers the data at and after the insertion position in the insertion cluster having the insertion position of the insertion destination file and the insertion data to one or a plurality of third new clusters in which the insertion destination file has not been recorded, and the third new clusters being included in the plurality of clusters. The data editing program PR then edits the management data such that the previous cluster preceding the insertion cluster is linked before the head cluster of the third new clusters and such that the next cluster which is next to the insertion cluster is linked after the tail cluster from among the third new clusters.

Thus, with the data editing program PR of the present embodiment, the unnecessary division processing and linking processing of the files are inhibited. As a result, the data editing program PR of the present embodiment can reduce the fragmentation number of the files after the editing performed by the data insertion processing and also can reduce the number of updates of the directory entries. As a result, the data editing program PR can perform the data insertion processing rapidly and efficiently and increases the rate of access to the file after the editing. Further, the data editing program PR can minimize the amount of transfer of the data that have been stored in advance in the clusters and can rapidly perform the data insertion processing.

Further, in the data editing program PR of the present embodiment, the management data are edited such that, from among the first cluster linked after the new cluster and the second cluster linked before the new cluster, the first cluster is the first to be linked to the new cluster. Thus, the data editing program PR initially updates the rear link of the new cluster, and the front link is updated as late as possible. With such an approach, even if the rear link is linked to a cluster of a separate file, when the editing processing in which the front link is not linked from anywhere is interrupted, the data can be handled as unused data and safely deleted. Further, in such a case, the data program PR can delay the timing at which the insertion destination file is changed. In other words, the data editing program PR can maintain the insertion destination file in the state before the editing as long as possible.

The data editing program PR of the present embodiment stores, in the data tail of the object file of the data editing processing, the editing instruction information, which is inputted and includes an editing type indicating the insertion processing, an editing object position indicating the insertion position in the insertion processing, and an editing object size indicating the size of insertion data in the insertion processing. Further, the data editing program PR restores the object file of the data editing processing to the state before or after the data editing processing on the basis of the editing instruction information, when the reading of the object file of the data editing processing is not able to be performed.

As a result, the data editing program PR of the present embodiment can restore the object file to the state before the data insertion processing or after the processing even when the processing of data insertion into the object file is interrupted along the way. Safety of the insertion destination file is thus ensured.

In the data editing program PR of the present embodiment updates, before editing of the management data linking a cluster before the new cluster, a size of the file which is managed in the data region to the sum total size obtained by adding a size of the editing instruction information to a size of the file after editing of the management data, when the size of the file which is managed in the data region is less than the sum total size.

As a result, the data editing program PR can update in advance, that is, before the insertion destination file is changed, the file size to the size enabling the reading of the data editing table. Therefore, even when the editing processing is interrupted and a file mismatch occurs after the insertion destination file has changed, the data editing program PR can restored the insertion destination file to the state after the editing on the basis of the data editing table.

Further, the data editing program PR of the present embodiment outputs the data editing table having information indicating the result of the data insertion processing. As a result, for example, a higher-level interface can accurately detect the editing processing result.

Removal Processing: Comparative Example

FIG. 16A and FIG. 16B are the first drawing illustrating the flow of data removal processing in a comparative example. In the figures, in the same manner as described hereinabove, the region represented by oblique lines in the cluster represented by a square indicates data of a removal source file, and a blank portion indicates an unused region. In the comparative example, the data indicate non-video data, and the region ff represented by grid dots indicates attribution information. In the comparative example, as a result of managing the unused region on the basis of the attribution information, data can be accessed even when a cluster includes the unused region.

FIG. 16A illustrates a removal source file before the data removal processing. In this example, the file 1, which is the removal source file, is constituted by six clusters. A data removal start position P21 is included in the third cluster, and a removal end position P22 is included in the fifth cluster. Data from the removal start position P21 to the removal end position P22 correspond to removal object data D21.

Then, in FIG. 16B, the file 1 is divided into a file 1 and a file 2. More specifically, data at and after the removal start position P21 within the cluster (referred to hereinbelow as "removal start cluster") having the removal start position P21 are transferred to a new cluster N21 and stored as the file 2, and a cluster C21 next to the removal start cluster is linked after the new cluster N21 (B21). Further, a fragmentation state is assumed between the new cluster N21 of the file 2 and the cluster next to the removal start cluster. In this processing, one new cluster is used.

Then, in FIG. 16B, the file 2 generated by the division is further divided into a file 2 and a file 3. More specifically, data at and after the removal end position P22 within the cluster (referred to hereinbelow as "removal end cluster") having the removal end position P22 are transferred to a new cluster N22 and stored as the file 3, and a cluster C22 next to the removal end cluster is linked after the new cluster N22 (B22). Further, a fragmentation state is assumed between the new cluster N22 of the file 3 and the cluster after the removal end cluster. In this processing, one new cluster is used.

Figure 17:
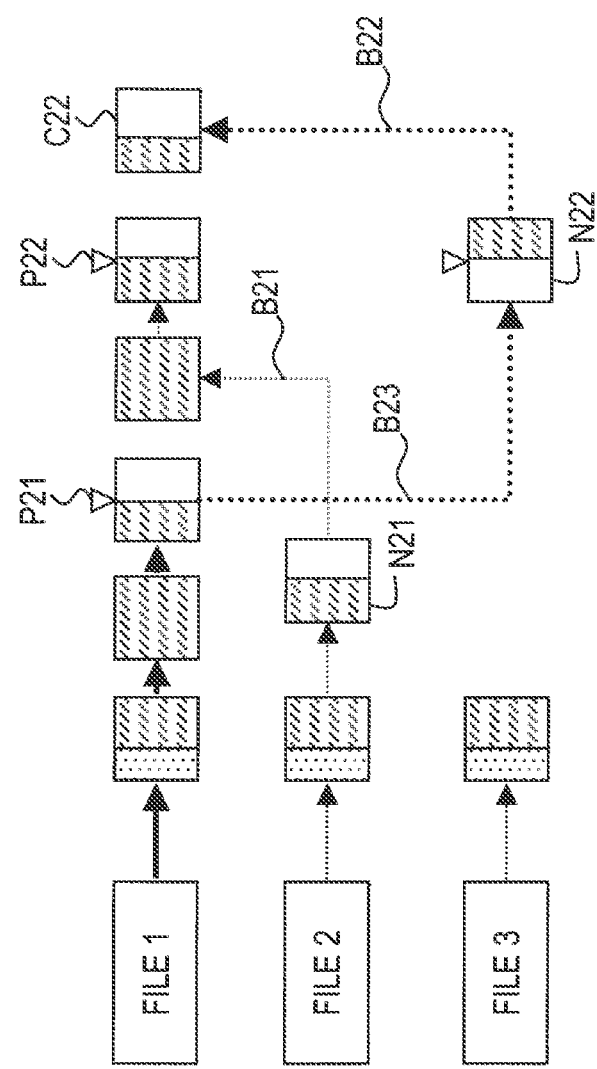
FIG. 17 is the second drawing illustrating the flow of data removal processing in the comparative example, as the continuation of the processing illustrated in FIG. 16B.

FIG. 17 is the second drawing illustrating the flow of data removal processing in the comparative example, as the continuation of the processing illustrated in FIG. 16B. In FIG. 17, the file 3 is linked to the file 1. More specifically, the new cluster N22 of the file 3 is linked (B23) after the removal start cluster of the file 1, and the entry of the file 3 in the directory entries is deleted. Further, a fragmentation state is assumed between the removal start cluster of the file 1 and the new cluster N22 of the file 3. In FIG. 17, the entry of the file 2 in the directory entries is deleted.

As a result, in the comparative example, the removal object data are removed from the file 1. In the comparative example, the data removal processing is performed by using the file division processing and file linking processing. Therefore, the data removal processing is performed by dividing the file 1, which is the removal source file, into the file 2 and file 3 by using the removal start position and removal end position division points, and linking the file 1 with the file 3.

In the data removal processing of the comparative example, two new clusters N21 and N22 are used. The fragmentation number of clusters in the file after the data removal processing is 2 (B22, B23). Further, in the comparison example, the access to the directory entries is generated twice in each division of the file 1 and the file 2 (a total of four times). The access to the directory entries is also generated twice when the file 1 and the file 3 are linked and once when the file 2 is deleted (a total of three time). Therefore, the access to the directory entries in the data removal processing in the comparative example is generated a total of seven times.

Flowchart of Data Removal Processing: Comparative Example

Figure 18:
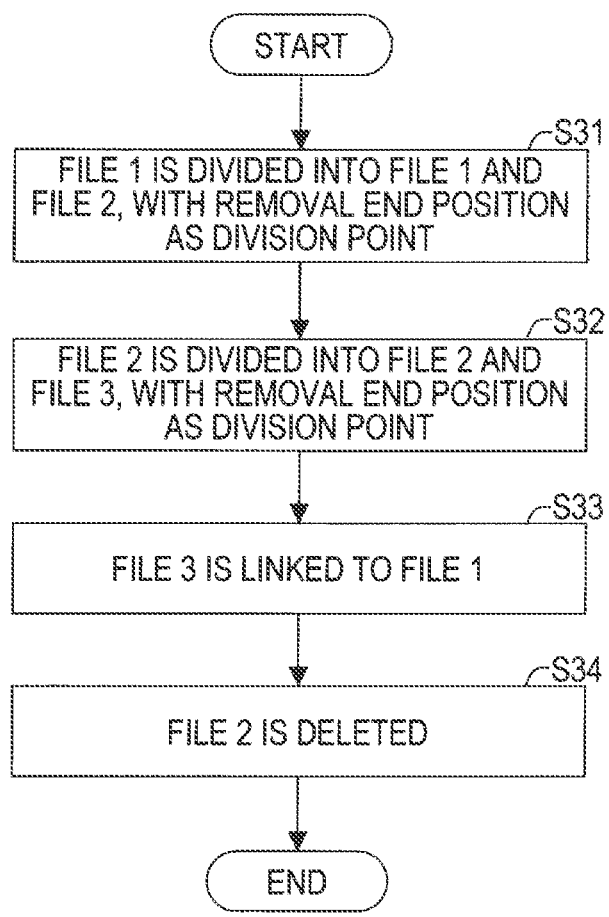
FIG. 18 is a flowchart illustrating the data removal processing in the comparative example.

FIG. 18 is a flowchart illustrating the data removal processing in the comparative example. As illustrated in the figures, the file 1, which is the removal source file, is initially divided into the file 1 and the new file 2 (S31). More specifically, data at and after the removal start position of the removal start cluster are transferred to the new cluster N21, and the cluster C21 next to the removal start cluster is linked (B21) after the new cluster N21 and stored as the file 2. The generated file 2 is then further divided into the file 2 and the new file 3 (S32). More specifically, data at and after the removal end position of the removal end cluster are transferred to the new cluster N22, and the cluster C22 next to the removal end cluster is linked (B22) after the new cluster N22 and stored as the file 3.

Then, the file 3 is linked to the file 1 (S33). More specifically, the new cluster N21 of the file 3 is linked (B23) after the removal start cluster of file 1, and the entry of the file 3 is deleted from the directory entries. The entry of the file 2 is then deleted from the directory entries (S34).

Data Removal Processing: Present Embodiment

Figure 19A:
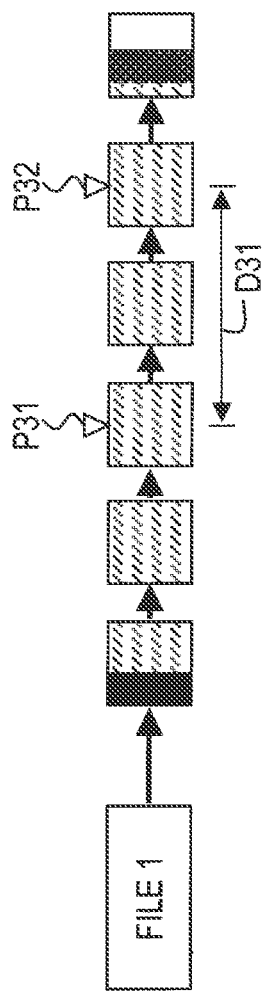
FIG. 19A to FIG. 19C are the first drawing illustrating the flow of data removal processing in the present embodiment.
Figure 19B:
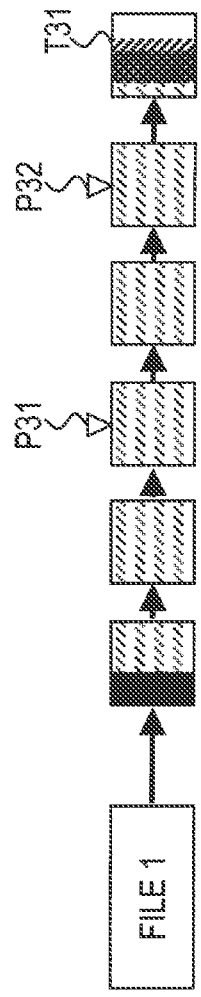
Figure 19C:
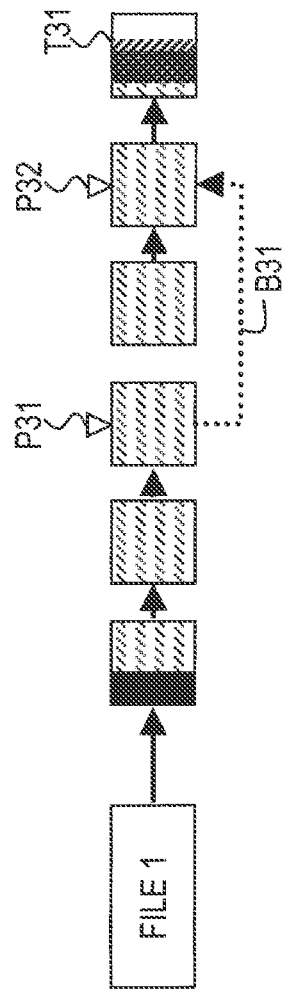

FIG. 19A to FIG. 19C are the first drawing illustrating the flow of data removal processing in the present embodiment. FIG. 19A illustrates the removal source file before the data removal processing. In this example, the file 1, which is the removal source file, is constituted by six clusters. Further, the data removal start position is included in the third cluster, and the removal end position is included in the fifth cluster.

In FIG. 19B, a data editing table T31 is added to the very end of the file. The editing instruction information including an editing processing type indicating REMOVAL, an editing start position indicating the removal start position P31 in the file 1, and an editing data size indicating the size of the removal object data D31 is stored in the data editing table T31. Although the size of the file 1 increases as a result of attachment of the data editing table T31, at this point of time, the size of the file 1 managed in the directory entries is not updated. Then, in FIG. 19C, the removal end cluster is linked (B31) after the removal start cluster. A fragmentation state is assumed between the removal start cluster and the removal end cluster.

Figure 20A:
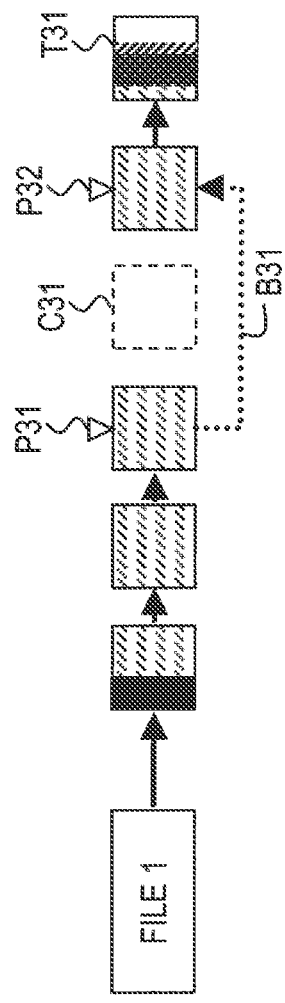
FIG. 20A to FIG. 20C are the second drawing illustrating the flow of data removal processing in the embodiment.
Figure 20B:
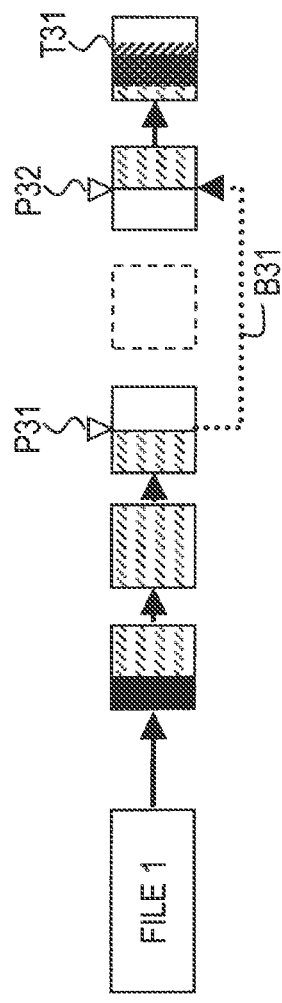
Figure 20C:
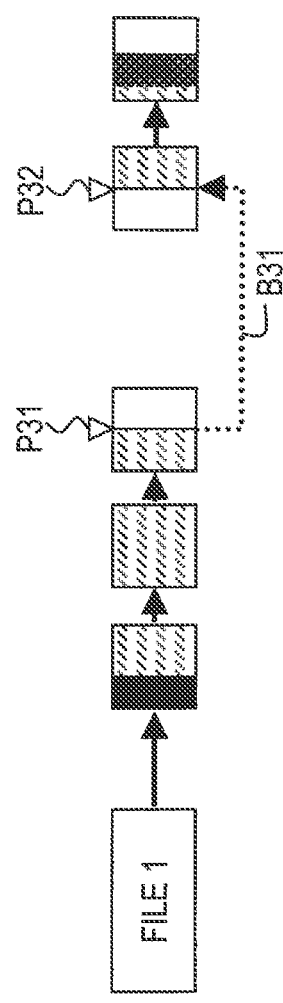

FIG. 20A to FIG. 20C are the second drawing illustrating the flow of data removal processing in the embodiment. In FIG. 20A, the cluster C31 located between the removal start cluster and removal end cluster, from among the clusters constituting the removal object data D31, is released. Then, in FIG. 20B, the offset of each frame in the indexes of the file 1 is updated. More specifically, the indexes of the data at and after the removal end position at which the offset is changed by the removal of data are updated. As a result, the region at and after a removal start position P31 within the removal start cluster and the region at and before a removal end position P32 of the removal end cluster are changed to an unused state. Further, in FIG. 20C, the data editing table T31 is deleted and the file size is updated. In this case, the size of the file 1 is updated to a value obtained by subtracting the size of the removal object data D31 from the size of the file before the editing.

Thus, in the data removal processing of the present embodiment, no new cluster is used. Further, the fragmentation number of clusters in the file after the data removal processing is 1 (B31). Furthermore, in the present embodiment, the access to the directory entries is generated once when the size of the file 1 is updated. Even when the data editing table T31 is not used in the data removal processing, the directory entries are accessed once.

Flowchart of Data Removal Processing: Present Embodiment

Figure 21:
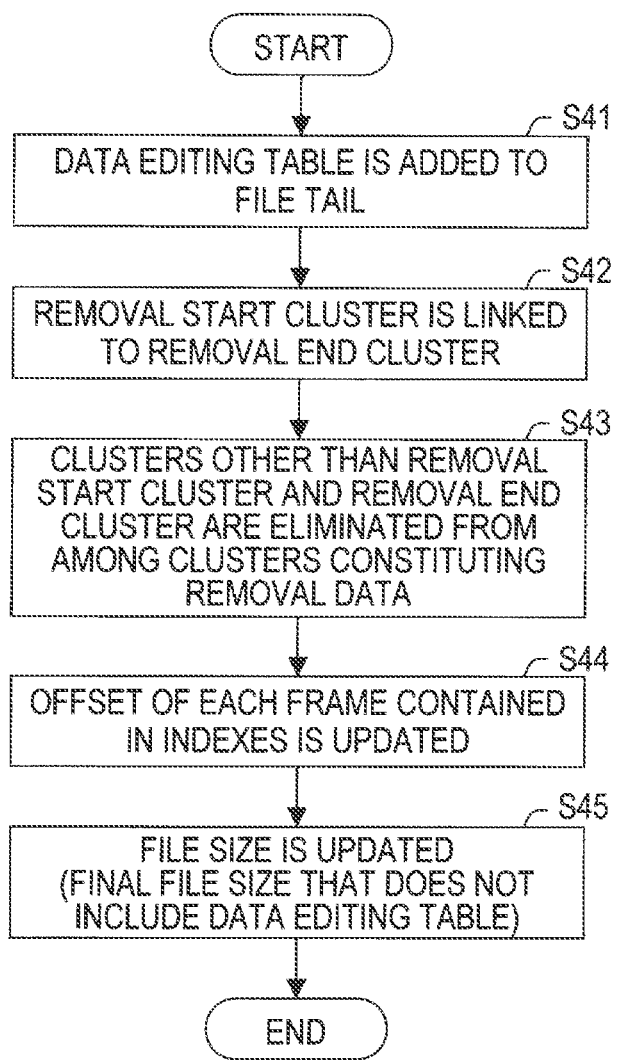
FIG. 21 is a flowchart illustrating the data removal processing in the present embodiment.

FIG. 21 is a flowchart illustrating the data removal processing in the present embodiment. In the figure, the data editing program PR initially adds the data editing table T31 to the tail of data of the file 1 which is the removal source file (S41). For example, the data editing table T31 is generated and delivered by the video editing library. When the data editing table is not used, the processing of step S41 can be omitted.

Then, the data editing program PR links (B31) the removal end cluster after the removal start cluster (S42). The data editing program PR then eliminates the cluster C31 located between the removal start cluster and the removal end cluster, from among the clusters constituting the removal object data D31 (S43). The data editing program PR then updates the offset of each frame in the indexes contained in the data of the file 1 (S44). For example, the data editing program PR updates the indexes corresponding to the data at and after the removal end position. In this case, the editing data offset in the editing result information included in the data editing table T31 and the file size after the editing are updated. More specifically, the editing data offset indicating the start position of the data following the removal object data D31 and the file size after the editing in the editing result information are updated.

The data editing program PR then transfers the data editing table T31 to the video editing library and deletes the table from the file 1, and also updates the file size of the file 1 to a value obtained by subtracting the size of the removal object data from the size before the editing (S44). As a result, the video editing library can accurately detect the contents of editing processing on the basis of editing result information.

Thus, in the data removal processing performed by the data editing program PR of the present embodiment, the number of updates of directory entries is reduced (from 7 to 1) and the fragmentation number of the clusters is reduced (from 2 to 1) by comparison with those in the comparative example. Further, in the comparative examples, two new clusters are used, whereas in the present embodiment, no new clusters are used. As a result, by inhibiting the number of updates of directory entries, the data editing program PR of the present embodiment can raise the efficiency of access to the secondary storage device and increase the speed of data removal processing. Further, by inhibiting the cluster fragmentation number, the data editing program PR of the present embodiment can increase the speed of access to the file after the editing and use efficiently the regions of the file system. Furthermore, since the data editing program PR of the present embodiment does not use new clusters, the data removal processing can be performed even when the number of unused clusters is insufficient.

Further, in the present embodiment, the file data are, for example, video data and therefore may include an unused region within a cluster. Thus, since the position of the data editing object is not limited to the cluster boundary, the data editing program PR can minimize the transfer of data that have been stored in advance in the secondary storage medium.

Further, in the present example, the file size update processing is not performed before the relinking processing (B31) of the cluster chain to the file 1. This is because, in the case of data removal processing, the relinking processing (B31) of the cluster chain reduces the number of the clusters constituting the file 1, and the actual size of the file 1 becomes less than the size of the file managed by the directory entries. In this case, the data editing table T31 can be read after the relinking processing (B31) of the cluster chain to the file 1, without updating the file size. As a result, the data editing program PR can restore the file 1 to the state after the data editing on the basis of the data editing table T31 even when the editing processing has been interrupted after the relinking processing (B31) of the cluster chain. The file restoration processing based on the data editing table T31 is explained in detail hereinbelow.

[Interruption of Data Removal Processing]

FIG. 22 illustrates the file safety when the processing is interrupted in the course of data removal processing. This figure also includes the file states and restoration guidelines corresponding to each step of the flowchart illustrated in FIG. 21. The file states are the states of file data, file size, index, data editing table, and non-referred data.

More specifically, in FIG. 22, the file 1, which is the removal source file, is in the state before the editing processing prior to step S41, and in the state after the editing processing after step S45. As a result, safety of the file 1 is ensured even when the editing processing is interrupted. Although the data editing table is added after step S41, the file size is not updated. Therefore, the file 1 is in the state before the editing and safety of the file 1 is ensured.

When the editing processing is interrupted after steps S42 to S44, the file 1 is changed from the state before the editing by performing the relinking processing (B31) of the cluster chain. In this case, since the number of the clusters constituting the file 1 is reduced, although the size of the file 1 is not updated, the data editing program PR can read the data editing table. Accordingly, the data editing program PR updates the file size and indexes on the basis of the editing instruction information of the data editing table and eliminates the file mismatch. As a result, the removal source file is restored to the state after the editing. When the removal object data remain as un-referred data, they are deleted.

Thus, with the data editing program PR of the present embodiment, even when the processing is interrupted after any step in the editing processing, the removal source file can be restored to the state before the editing or the state after the editing by generating the data editing table. As a result, safety of the removal source file is maintained. Further, by adding the data editing table to the very end of the file, the data editing program PR can restore the removal source file on the basis only of the data stored in the secondary storage device. The file restoration processing is described in detail hereinbelow.

As mentioned hereinabove, when the data located between the removal start position and removal end position in the removal source file are removed, the data editing program PR of the present embodiment deletes the data at and after the removal start position in the removal start cluster having the removal start position of the removal source file and the data at and before the removal end position within the removal end cluster having the removal end position, and edits the management data such that the removal end cluster is linked after the removal start cluster.

Thus, with the data editing program PR of the present embodiment, the unnecessary division processing and linking processing of the files are inhibited. As a result, the data editing program PR of the present embodiment can reduce the fragmentation number of the files after the editing performed by the data removal processing and also can reduce the number of updates of the directory entries. As a result, the data editing program PR can perform the data removal processing rapidly and efficiently and increases the rate of access to the file after the editing. Further, the data editing program PR of the present embodiment does not use a new cluster, thereby making it possible to perform the data removal processing even when no usable cluster is present. In addition, the data editing program PR can minimize the amount of transfer of the data that have been stored in advance in the clusters and can rapidly perform the data removal processing.

Further, the data editing program PR of the present embodiment stores, in the data tail of the object file of the data editing processing, the editing instruction information, which is inputted and includes the editing type indicating the removal processing, the editing object position indicating the removal start position in the removal processing, and the editing object size indicating the size of removal data in the removal processing. Further, the data editing program PR restores the object file of the data editing processing to the state before or after the data editing processing on the basis of the editing instruction information, when the reading of the object file of the data editing processing is not able to be performed.

As a result, the data editing program PR of the present embodiment can restore the object file to the state after the data insertion processing even when the data removal processing of the object file is interrupted along the way. Safety of the removal source file is thus ensured.

In the data editing program PR of the present embodiment updates before editing of the management data linking a cluster before the new cluster, a size of the file which is managed in the data region to the sum total size obtained by adding a size of the editing instruction information to a size of the file after editing of the management data, when the size of the file which is managed in the data region is less than the sum total size.

In the data removal processing, the size of the pre-editing file before the cluster chain of the removal source file is changed is larger than the sum total size obtained by adding the size of the data editing table (editing instruction information) to the size of the file after the change. In the case of data removal processing, the data editing program PR can read the data editing table even after the cluster chain of the removal source file has changed. Therefore, the mismatch of the removal source file can be restored on the basis of the data editing table, without changing the file size.

Further, the data editing program PR of the present embodiment outputs the data editing table having information indicating the result of the data insertion processing. As a result, for example, a higher-level interface can accurately detect the editing processing result.

Data Transfer Processing: Comparative Example

FIG. 23A and FIG. 23B are the first drawing illustrating the flow data transfer processing in a comparative example. The region represented by oblique lines in the cluster represented by a square indicates data of a removal source file, and a blank portion indicates an unused region. In the data transfer processing, the region represented by transverse lines and the region illustrated by a grading indicate data of a transfer source file, and the region represented by transverse lines indicates transfer object data D41. In the comparative example, the data indicate non-video data, and the region ff represented by grid dots indicates attribution information. In the comparative example, as a result of managing the unused region on the basis of the attribution information, data can be accessed even when a cluster includes the unused region.

FIG. 23A illustrates a file 1, which is a transfer destination file, and a file 2, which is a transfer source file before the data transfer processing. In this example, the file 1 is constituted by five clusters, a data transfer insertion position P41 is included in the third cluster, the file 2 is constituted by six clusters, a data transfer start position P42 is included in the third cluster, and a transfer end position P43 is included in the fifth cluster. In this example, the insertion data D41 from the transfer start position P42 to the transfer end position P43 in the file 2 are transferred to the transfer insertion position P41 in the file 1.

Then, in FIG. 23B, the file 1 is divided into a file 1 and a file 3. More specifically, data at and after the transfer insertion position P41 within the cluster (referred to hereinbelow as "transfer insertion cluster") having the transfer insertion position P41 are transferred to a new cluster N41 and stored as the file 3. At the same time, a cluster C41 next to the transfer insertion cluster is linked (B41) after the new cluster N41. A fragmentation state is assumed between the new cluster N41 of the file 3 and the cluster C41 next to the transfer insertion cluster.

Further, in FIG. 23B, the file 2 is divided into a file 2 and a file 4. More specifically, data at and after the transfer start position P42 within the cluster (referred to hereinbelow as "transfer start cluster") having the transfer start position P42 are transferred to a new cluster N42 and stored as the file 4. At the same time, a cluster C42 next to the transfer start cluster is linked (B42) after the new cluster N42. A fragmentation state is assumed between the new cluster N42 of the file 4 and the cluster C42 next to the transfer start cluster. Further, in FIG. 23B, the file 4 is divided into a file 4 and a file 5. More specifically, data at and after the transfer end position P43 within the cluster (referred to hereinbelow as "transfer end cluster") having the transfer end position P43 is transferred to a new cluster N43 and stored as the file 5. At the same time, a cluster C43 next to the transfer end cluster is linked (B43) after the new cluster N43. A fragmentation state is assumed between the new cluster N43 of the file 5 and the cluster C43 next to the transfer end cluster. In FIG. 23B, three new clusters N41 to N43 are used.

Figure 24:
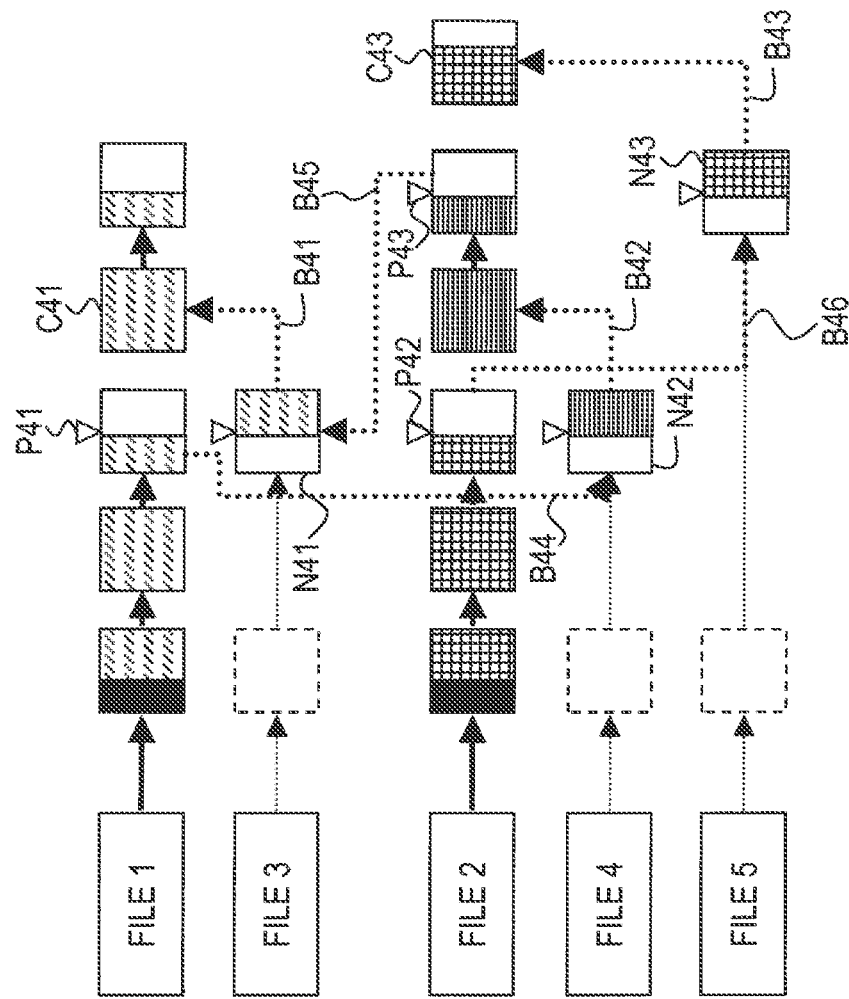
FIG. 24 is the second drawing illustrating the flow of data transfer processing in the comparative example, as the continuation of the processing illustrated in FIG. 23B.

FIG. 24 is the second drawing illustrating the flow of data transfer processing in the comparative example, as the continuation of the processing illustrated in FIG. 23B. In FIG. 24, the file 4 is linked to the file 1. More specifically, the new cluster N42 of the file 4 is linked (B44) after the transfer insertion start cluster of the file 1, and the entry of the file 4 in the directory entries is deleted. Although the file 4 has been deleted, the cluster attached to the file 4 will still be referred to hereinbelow as the cluster of the file 4. A fragmentation state is assumed between the transfer insertion cluster of the file 1 and the new cluster N42.

In FIG. 24, the file 3 is linked to the file 1 to which the file 4 has been linked. More specifically, the new cluster N41 of the file 3 is linked (B45) next to the transfer end cluster at the very end of the file 1 (cluster at the very end of file 4), and the entry of the file 3 in the directly entries is deleted. A fragmentation state is assumed between the transfer end cluster at the very end of the file 1 (cluster at the very end of the file 4) and the new cluster N41 of the file 3. Further, in FIG. 24, the file 5 is linked to the file 2. Thus, the linking processing is performed with respect to the transfer source file. More specifically, the new cluster N43 of the file 5 is linked (B46) after the transfer start cluster of the file 2, and the entry of the file 5 in the directory entries is deleted. A fragmentation state is assumed between the transfer start cluster of the file 2 and the new cluster N43 of the file 5.

As a result, in the comparative example, the transfer object data D41 in the file 2 are transferred to the transfer insertion position P41 of the file 1. In the comparative example, the data transfer processing is performed by the file division processing and file linking processing. Thus, the file 2, which is the transfer source file, is divided into the file 4 and the file 5 by using the transfer start position and transfer end position as division points. Further, the file 1, which is the transfer destination file, is divided into the file 3 by using the transfer insertion position as the division point. The transfer destination file is generated by linking the file 1 with file 4 and also the file 3, and the transfer source file is generated by linking the file 2 with the file 5.

Thus, in the data transfer processing of the comparative example, a total of three new clusters N41, N42, N43 are used. Further, the fragmentation number of the clusters in the file after the data transfer processing is 6 (B41 to B46). In the comparative example, the access to the directory entries is generated twice for each of three file divisions (a total of 6 times) and twice for each of three file linking operations (a total of 6 times). Therefore, the access to the directory entries in the data transfer processing of the comparative example is generated a total of 12 times.

Flowchart of Data Transfer Processing: Comparative Example

Figure 25:
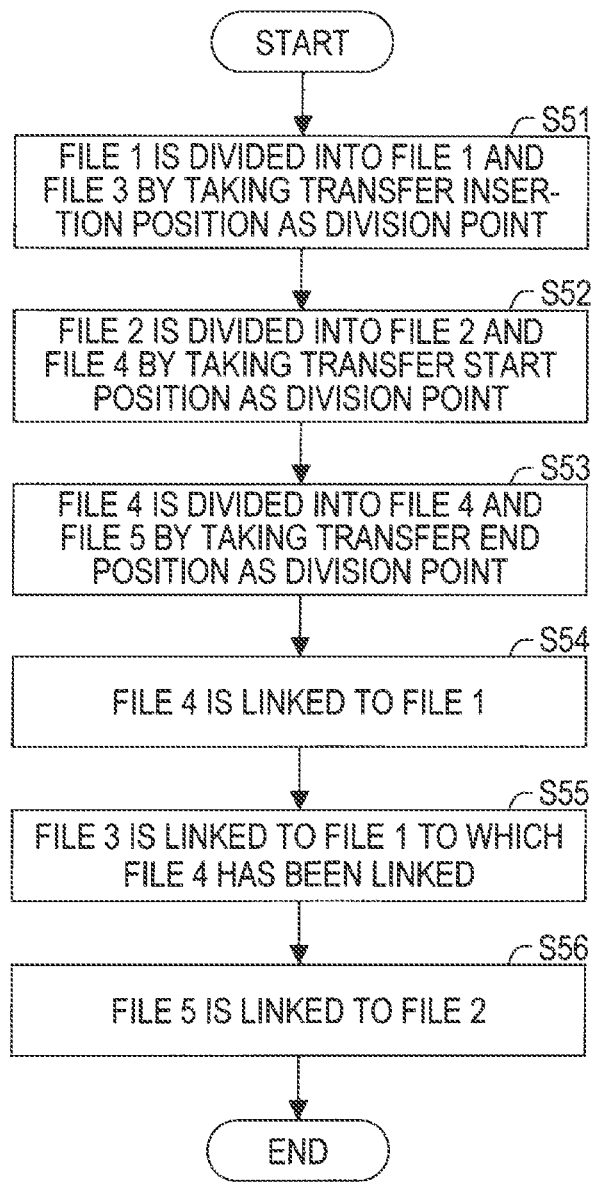
FIG. 25 is a flowchart illustrating the data transfer processing in the comparative example.

FIG. 25 is a flowchart illustrating the data transfer processing in the comparative example. In the figure, the file 1, which is the transfer destination file, is initially divided into the file 1 and the new file 3 (S51). More specifically, data at and after the transfer insertion position of the transfer insertion cluster are transferred to the new cluster N41, and the cluster C41 next to the transfer insertion cluster is linked (B41) after the new cluster N41 and stored as the file 3.

Then, the file 2, which is the transfer source file, is divided into the file 2 and the new file 4 (S52). More specifically, data at and after the transfer start position of the transfer start cluster are transferred to the new cluster N42, and the cluster C42 next to the transfer start cluster is linked (B42) after the new cluster N42 as stored as the file 4. The generated file 4 is then further divided into the file 4 and the new file 5 (S53). More specifically, data at and after the transfer end position of the transfer end cluster are transferred to the new cluster N43, and the cluster C43 next to the transfer end cluster is linked (B43) after the new cluster N43 and stored as the file 5.

Then, the file 4 is linked to the file 1 (S54). More specifically, the new cluster N42 of the file 4 is linked (B44) after the transfer insertion cluster of the file 1, and the entry of the file 4 is deleted from the directory entries. Then, the file 3 is linked to the file 1 to which the file 4 has been linked (S55). More pacifically, the new cluster N41 of the file 3 is linked (B45) after the transfer end cluster at the very end of the file 1, and the entry of the file 3 is deleted from the directory entries. Linking processing is thus performed with respect to the transfer destination file. The file 5 is then linked to the file 2 (S56). More specifically, the new cluster N43 of the file 5 is linked (B46) after the transfer start cluster of the file 2, and the entry of the file 5 is deleted from the directory entries. Linking processing is thus performed with respect to the transfer source file.

Data Transfer Processing: Present Embodiment

FIG. 26A and FIG. 26B are the first drawing illustrating the flow of data transfer processing in the present embodiment. FIG. 26A illustrates the file 1, which is the transfer destination file, and the file 2, which is the transfer source file, before the data transfer processing in the same manner as in the comparative example. In this example, the file 1 is constituted by five clusters, and a data transfer insertion position P51 is included in the third cluster. Further, the file 2 is constituted by six clusters, a data transfer start position P52 is included in the third cluster, and a transfer end position P53 is included in the fifth cluster.

Then, in FIG. 26B, data editing tables T51, T52 are added to the very end of the file 1 and the file 2. Editing instruction information including an editing processing type indicating INSERTION, an editing start position indicating the insertion position in the file 1, and an editing data size indicating the size of the transfer object data is stored in the data editing table T51 in the file 1. Editing instruction information including an editing processing type indicating REMOVAL, an editing start position indicating the removal start position in the file 2, and the editing data size indicating the size of transfer object data is stored in the data editing table T52 in the file 2. Although the size of the file 1 and the file 2 is increased following the addition of the data editing tables T51, T52, at this point of time, the size of the file 1 and the file 2 that are managed in the directory entries is not updated.

Figure 27A:
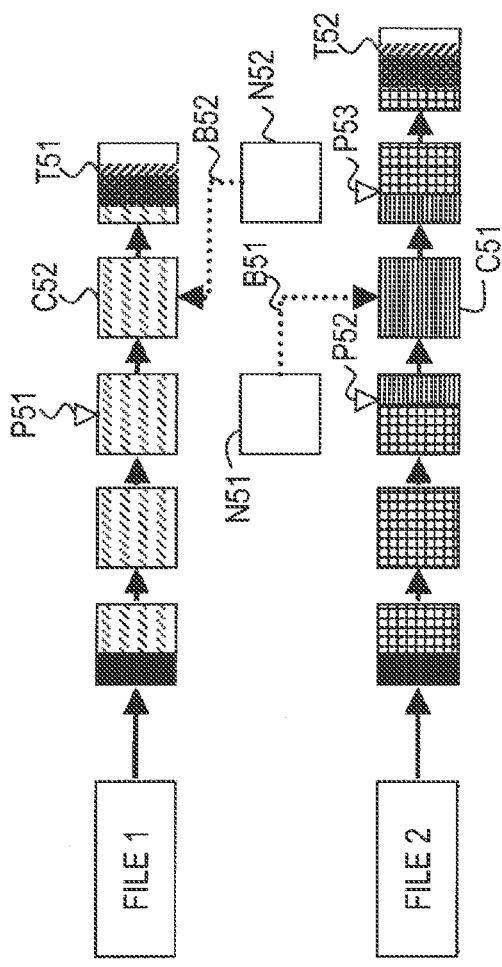
FIG. 27A and FIG. 27B are the second drawing illustrating the flow of data transfer processing in the present embodiment, as the continuation of the processing illustrated in FIG. 26B.
Figure 27B:
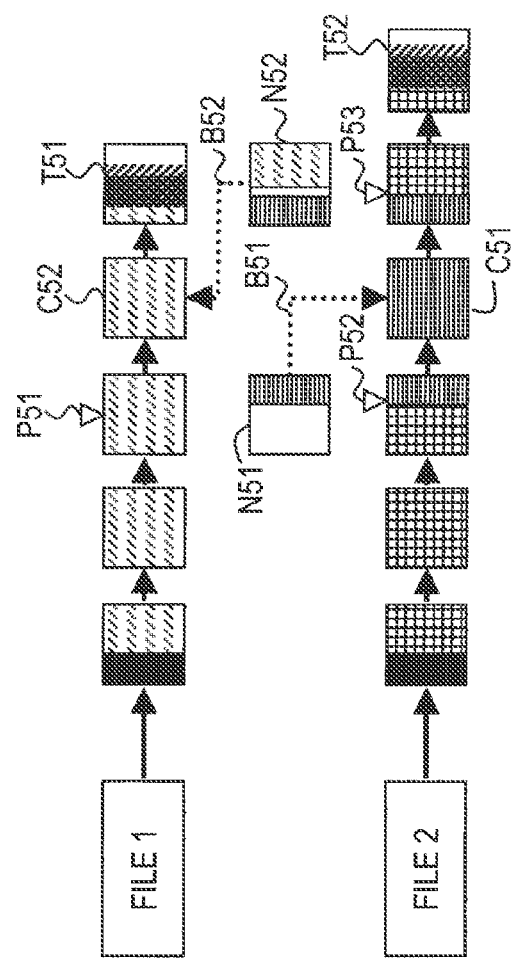

FIG. 27A and FIG. 27B are the second drawing illustrating the flow of data transfer processing in the present embodiment, as the continuation of the processing illustrated in FIG. 26B. In FIG. 27A, two new clusters N51, N52 are secured. Then, a cluster C51 next to a cluster having a transfer start position P52 in the file 2 (referred to hereinbelow as "transfer start cluster") is linked after the first new cluster N51. A cluster C52 next to a cluster having a transfer insertion position P51 of the file 1 (referred to hereinbelow as "transfer insertion cluster") is linked (B51) after the second new cluster N52. A fragmentation state is assumed between the first new cluster N51 and the cluster C51 next to the transfer start cluster of the file 2 and between the second new cluster N52 and the cluster C52 next to the transfer insertion cluster of the file 1.

Then, in FIG. 27B, the respective data are written into the new clusters N51, N52. More specifically, for example, data at and after the transfer start position P52 in the transfer start cluster of the file 2 are written into the first new cluster N51. Further, data at and before a transfer end position P53 within a cluster having a transfer end position P53 of the file 2 (referred to hereinbelow as "transfer end cluster") and data at and after the transfer insertion position P51 of the transfer insertion cluster of the file 1 are written into the second new cluster N52.

FIG. 28A and FIG. 28B are the third drawing illustrating the flow of data transfer processing in the present embodiment, as the continuation of the processing illustrated in FIG. 27B. In FIG. 28A, a dummy file is newly created and attached to the first new cluster N51. When the dummy file is newly created, the size of the dummy file is set such that the data editing tables T51, T52 of the file 1 and the file 2 could be read. As a result, at this point of time, the data editing table T52 of the file 2 can be read on the basis of the dummy file. Further, as a result of generating the dummy file, the transfer data D51 can be attached to the dummy file. Therefore, even when the editing processing is interrupted after the transfer data D51 have been removed from the file 2 by the relinking processing (B53) of the dummy file illustrated in FIG. 28B, loss of the transfer data D51 can be avoided. Further, In FIG. 28B, the transfer end cluster is linked (B53) after the transfer start cluster of the file 2. A fragmentation state is assumed between the transfer start cluster and the transfer end cluster.

Figure 29A:
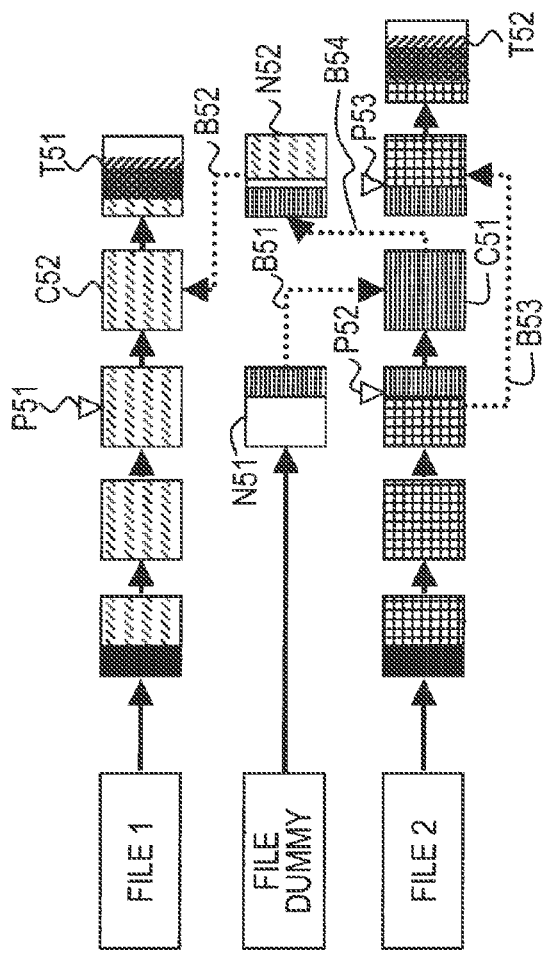
FIG. 29A and FIG. 29B are the fourth drawing illustrating the flow of data transfer processing in the present embodiment, as the continuation of the processing illustrated in FIG. 28B.
Figure 29B:
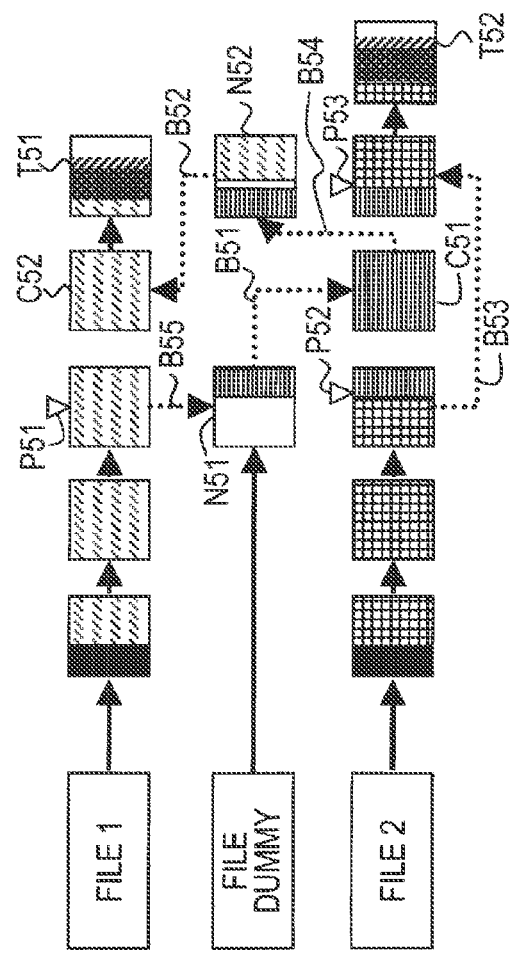

FIG. 29A and FIG. 29B are the fourth drawing illustrating the flow of data transfer processing in the present embodiment, as the continuation of the processing illustrated in FIG. 28B. In FIG. 29A, the second new cluster N52 is linked (B54) after the cluster C51 preceding the transfer end cluster of the file 2. A fragmentation state is assumed between the cluster C51 preceding the transfer end cluster and the second new cluster N52. As a result, at this point of time, the data editing table T51 of the file 1 can be read on the basis of the dummy file.

Then, in FIG. 29B, before the first new cluster N51 is linked after the transfer insertion cluster of the file 1, the file size of the file 1 is updated. Thus, the size of the file 1 managed in the directory entries is updated before the relinking processing (B55) of the cluster chain performed with respect to the file 1. More specifically, the size of the file 1 is updated to a value obtained by adding the size of the transfer data D51 and the size of the data editing table T51 to the file size before the editing. As a result, a state is assumed in which the data editing table T51 of the file 1 can be read after the relinking processing (B55) of the cluster chain. Further, in FIG. 29B, the first new cluster N51 is linked after the transfer insertion cluster of the file 1. A fragmentation state is assumed between the transfer insertion cluster and the first new cluster N51.

As explained in the example of data insertion, as a result of updating the cluster chain of the file 1, the configuration of the clusters constituting the file 1 is updated and the number of clusters constituting the file 1 is increased. As a consequence, the data editing table T51 is in the unreadable stage. For this reason, the size of the file 1 managed in the directly entries is updated in advance to a size at which the data editing table T51 can be read prior to the relinking processing (B55) of the cluster chain of the file 1. As a result, even when the editing processing is interrupted after the relinking processing (B55) of the cluster chain, the file 1 can be restored to the state after the data editing on the basis of the data editing table T51. The file restoration processing based on the data editing table T51 will be explained in detail hereinbelow.

As explained in the example of data insertion processing, in FIG. 27A, when the cluster C52 next to the transfer insertion cluster of the file 1 is linked (B52) after the second new cluster N52, no effect is produced on the configuration of the clusters constituting the file 1. Therefore, the file size update processing is not performed before the relinking processing of the cluster chain.

FIG. 30A and FIG. 30B are the fifth drawing illustrating the flow of data transfer processing in the present embodiment, as the continuation of the processing illustrated in FIG. 29B. In FIG. 30A, the entry of the dummy file is deleted from the directory entries. In FIG. 29B, the transfer data D51 are attached to the file 1 by the relinking processing (B55) of the cluster chain. Therefore, the entry of the dummy file is not needed.

Then, in FIG. 30B, the offset of each frame in the indexes of the file 1 and the file 2 is updated. The offset of data following the transfer insertion position P51 in the file 1 and data at and after the transfer end position P53 in the file 2 are updated by insertion of the transfer data D51. Therefore, the index corresponding to the data with a changed offset is updated. Further, as a result of index updating, data at and after the transfer insertion position P51 in the transfer insertion cluster, data at and after the transfer start position P52 in the transfer start cluster, and data at and before the transfer end position P53 in the transfer end cluster are updated to an unused state.

In FIG. 30B, the data editing tables T51, T52 attached to the very end of the files 1 and 2 are deleted, and the file size of each file is updated. In this case, the size of the file 1 is updated to a value obtained by adding the size of the transfer data to the size of the file before the editing. The size of the file 2 is updated to a value obtained by subtracting the size of the transfer data from the size of the file before the editing.

Thus, in the data transfer processing of the present embodiment, two new clusters N51, N52 are used. Further, the fragmentation number of the clusters in the file after the data transfer processing is 5 (B51 to B55). In the embodiment, the access to the directory entries is generated when the file 1 is twice updated and when the file 2 is once updated (a total of three times). Further, in the present embodiment, the access to the directory entries is generated once when the dummy file is newly created and once when the dummy file is deleted (a total of two times). Therefore, in the data transfer processing of the present embodiment, the access to the directory entries is generated a total of five times.

[Case in which Data Editing Table is not Used]

When the data editing table is not used, the update processing of the file size of the file 1 performed directly before the processing illustrated in FIG. 29B can be omitted. Therefore, in this case, the update processing of the file size is performed twice as the updated processing of the sizes of files 1 and 2 in FIG. 30B. As a result, the directory entries are updated a total of four times. In the data transfer processing of the present embodiment, when the loss of the transfer data D51 is not taken into account, the dummy file generation processing and deletion processing can be omitted. When the dummy file generation processing can be omitted, the access to the directory entries needed to generate and delete the dummy files can be skipped, and therefore, the number of updates of the directory entries can be further reduced by two.

Flowchart of Data Transfer Processing: Present Embodiment

FIG. 31 is a flowchart illustrating the data transfer processing of the present embodiment. In this figure, the data editing program PR initially adds the data editing tables T51, T52 to the tails of the file 1, which is the transfer destination file, and the file 2, which is the transfer source file (S61). For example, the data editing tables T51, T52 are generated and delivered by the video editing library. When the data editing tables T51, T52 are not used, the processing of step S61 can be omitted.

Then, the data editing program PR secures two new clusters N51, N52 (S62). In this case, the cluster C51 next to the transfer start cluster of the file 2 is linked after the first new cluster N51, and the cluster C52 next to the transfer insertion cluster of the file 1 is linked after the second new cluster N52 (B51, B52). Then, the data editing program PR writes the respective data into the new clusters N51, N52 (S63). For example, data at and after the transfer start position P52 in the transfer start cluster of the file 2 are written into the first new cluster N51, and data at and before the transfer end position P53 in the transfer end cluster of the file 2 and data at and after the transfer insertion position P51 of the transfer insertion cluster of the file 1 are written into the second new cluster N52. The data editing program PR then newly creates the dummy file and attaches the dummy file to the first new cluster N51 (S64). As a result, the insertion data D51 are attached to the dummy file.

Then, the data editing program PR links (B53) the transfer end cluster after the transfer start cluster of the file 2 (S65). As a result, the file 2, which is the transfer source file, is linked. Then, the data editing program PR links (B54) the second new cluster N52 after the cluster C51 preceding the transfer end cluster of the file 2 (S66). The data editing program PR then updates (S67) the file size of the file 1 to a value such that the data after the cluster chain change and the data editing table T51 could be read before the relinking processing (step S68) of the cluster chain performed with respect to the file 1. More specifically, the data editing program PR updates the size of the file 1 to a value obtained by adding the size of the transfer data and the size of the data editing table T51 to the size of the file 1 before the editing. When the data editing tables T51, T52 are not used, the processing of step S67 can be omitted.

Then, the data editing program PR links (B55) the first new cluster N51 after the transfer insertion cluster of the file 1 (S68). The data editing program PR then deletes the entry of the dummy file from the directory entries (S69). Then, the data editing program PR updates the offset of data after the transfer insertion position P51 where the change of offset in the file 1 has occurred and data at and after the transfer end position in the file 2 (S70). In this case, the data editing program PR updates the editing data offset included in the data editing tables T51, T52 of the files 1 and 2 and the file size after the editing. More specifically, the editing result information, which includes the editing data offset indicating the start position of the transfer data D51 and also the file size after the editing, is stored in the data editing table T51 of the file 1. The editing result information, which includes the editing data offset indicating the start position of the data at and after the insertion end position and also the file size after the editing, is stored in the data editing table T52 of the file 2.

The data editing program PR then deletes the data editing tables T51, T52 attached to the very ends of the files 1 and 2 by carryover to the video editing library and updates the file size of each file (S71). As a result, the video editing library can accurately detect the contents of the editing processing on the basis of the editing result information. Further, the data editing program PR updates the size of the file 1 to a value obtained by adding the size of the transfer data to the size of the file before the editing, and updates the size of the file 2 to a value obtained by subtracting the size of the transfer data from the size of the file before the editing.

[Patterns in Data Transfer Processing]

The data transfer processing of the present embodiment is explained hereinabove with reference to FIG. 26 to FIG. 31. The linking of the object data that are written into two new clusters in the data transfer processing and the cluster chain may be also performed by a method different from the method illustrated by FIG. 26 to FIG. 31.

FIG. 32A and FIG. 32B illustrate the patterns of data that are written into the two new clusters in the data transfer processing. In table H1 in FIG. 32A, three patterns including the pattern (1-1) explained in FIG. 26 to FIG. 31 are illustrated by way of example. In table H1, the regions in the transfer insertion cluster, transfer start cluster, and transfer end cluster are illustrated as region (A), region (a), region (B), region (b), region (C), and region (c). Each region will be explained below. As illustrated in FIG. 32B, the region (A) indicates a region at and before the transfer insertion position in the transfer insertion cluster in the transfer destination file, and the region (a) indicates a region at and after the transfer insertion position. The region (B) indicates a region at and after the transfer start position in the transfer start cluster in the transfer source file, and the region (b) indicates a region at and before the transfer start position. Further, the region (C) indicates a region at and before the transfer end position in the transfer end cluster in the transfer source file, and the region (c) indicates a region at and after the transfer end position.

First, the pattern 1-1 and pattern 1-2 in table H1 illustrated in FIG. 32A will be explained. The pattern 1-1 and pattern 1-2 are used when "region (B)+region (C)≤cluster size". In this case, the region (B) at and after the transfer start position in the transfer start cluster and the region (C) at and before the transfer end position in the transfer end cluster are fit into one cluster. When "region (a)<region (B)", the pattern 1-1 is used, and when "region (a)≥region (B)", the pattern 1-2 is used.

[Pattern 1-1]

The pattern 1-1 is explained below in greater detail. As mentioned hereinabove, the pattern 1-1 is used when "region (a)<region (B)" and "region (B)+region (C)≤cluster size". As explained with reference to FIG. 26 to FIG. 31, in the pattern 1-1, the data in a region (region (B)) at and after the transfer start position in the transfer start cluster are written into the first new cluster N51, and the data in the region (region (C)) at and before the transfer end position in the transfer end cluster and the data in the region (region (a)) at and after the transfer insertion position in the transfer insertion cluster are written into the second new cluster N52.

The cluster size is uniform. Therefore, when "region (B)+region (C)≤cluster size", the condition of "region (B)≤region (c)" is fulfilled. Where the condition of "region (B)≤region (c)" is matched with the condition of "region (a)<region (B)", the condition of "region (a)<region (c)" is obtained. Further, when "region (a)<region (c)", the condition of "region (C)<region (A)" is fulfilled. In this case, where "region (a)+region (A)=cluster size", it means that the data of the region (a) and the data of the region (C) are fit into one cluster. Therefore, one cluster is shared by the region (a) and the region (C)). Thus, the data of the region (region (C)) at and before the transfer end position in the transfer end cluster and the data of the region (region (a)) at and after the transfer insertion position in the transfer insertion cluster are written into the second new cluster N52.

[Pattern 1-2]

The pattern 1-2 is explained below. As mentioned hereinabove, the pattern 1-2 is used when "region (a)≥region (B)" and "region (B)+region (C)≤cluster size". In the pattern 1-2, the data in a region (region (A)) at and before the transfer insertion position in the transfer insertion cluster and the data in a region (region (B)) at and after the transfer start position in the transfer start cluster are written into the first new cluster N51, and the data in a region (region (C)) at and before the transfer end position in the transfer end cluster are written into the second new cluster N52.

When "region (a)≤region (B)", the condition of "region (a)+region (A)=cluster size" is fulfilled, and it means that the region (B), which is of a size equal to or less than that of the region (a), and the region (A) are fit into one cluster. Therefore, one cluster is shared by the region (A) and the region (B). Thus, the data of a region (region (A)) at and before the transfer insertion position in the transfer insertion cluster and the data of a region (region (B)) at and after the transfer start position in the transfer start cluster are written into the first new cluster N51.

[Pattern 2]

The pattern 2 is used when "region (B)+region (C)>cluster size". This indicates the case in which the region (B) at and after the transfer start position in the transfer start cluster and the region (C) at and before the transfer end position in the transfer end cluster are not fit into one cluster. When "region (B)"+region (C)>cluster size", the condition of "region (C)+region (c)=cluster size" is fulfilled. Therefore, it means that the region (b) and the region (c) are fit into one cluster. Therefore, in the pattern 2, the data of a region (region (B)) at and after the transfer start position in the transfer start cluster are written into the first new cluster N51, and the data of a region (region (a)) at and after the transfer insertion position in the transfer insertion cluster are written into the second new cluster N52. Further, the data of a region (region (c)) at and after the transfer end position in the transfer end cluster are written into the transfer start cluster in the transfer source file.

Thus, the data editing program PR of the present embodiment can fit the data of three regions, which are the data before and after the position of the editing object, into two new clusters in the data transfer processing. Specific examples of the patterns 1-2 and 2 are explained below with reference to the drawings.

[Specific Example of Pattern 1-2]

FIG. 33A and FIG. 33B illustrate a specific example of data transfer processing in the pattern 1-2. In FIG. 33A, two new clusters N51, N52 are secured as the processing of step S62 in the flowchart illustrated in FIG. 31, the cluster C51 next to the transfer start cluster of the file 2 is linked after the first new cluster N51, and the transfer insertion cluster of the file 1 is linked after the second new cluster N52 (B61, B62). Then, in the subsequent step S63, the data at and before the transfer insertion position in the transfer insertion cluster of the file 1 (transfer destination file) and the data at and after the transfer start position in the transfer start cluster of the file 2 (transfer source file) are written into the first new cluster N51. Further, in the same step, the data at and before the transfer end position in the transfer end cluster of the file 2 are written into the second new cluster N52.

Further, in FIG. 33B, the transfer end cluster is linked (B63) after the transfer start cluster of the file 2, in the same manner as in the pattern 1-1, as the processing of step S65 illustrated in FIG. 31. Further, in step S66 illustrated in FIG. 31, the second new cluster N52 is linked (B64) after the cluster C51 preceding the transfer end cluster of the file 2, in the same manner as in the pattern 1-1. In step S68 illustrated in FIG. 31, the first new cluster N51 is linked (B65) after the cluster C53 preceding the transfer insertion cluster of the file 1.

Thus, in the case of the pattern 1-2, the transfer data from the transfer start position to the transfer end position in the file 2 are likewise transferred to the transfer insertion position in the file 1. Further, in the data transfer processing of the pattern 1-2, in the same manner as in the pattern 1-1, two new clusters N51, N52 are used and the fragmentation number of the clusters in the file after the transfer processing is 5 (B61 to B65). The number of generated accesses to the directory entries is also the same as in the pattern 1-1.

[Specific Example of Pattern 2]

Figure 34A:
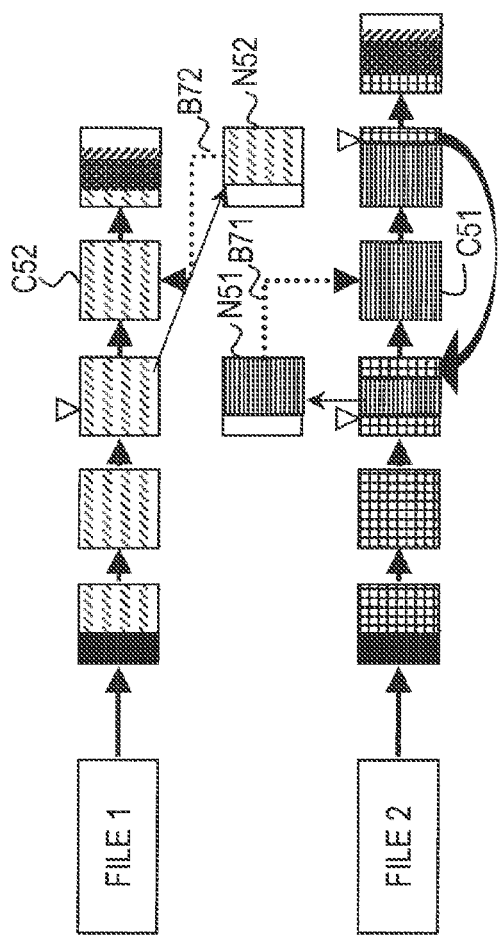
FIG. 34A and FIG. 34B illustrate a specific example of data transfer processing in pattern 2.
Figure 34B:
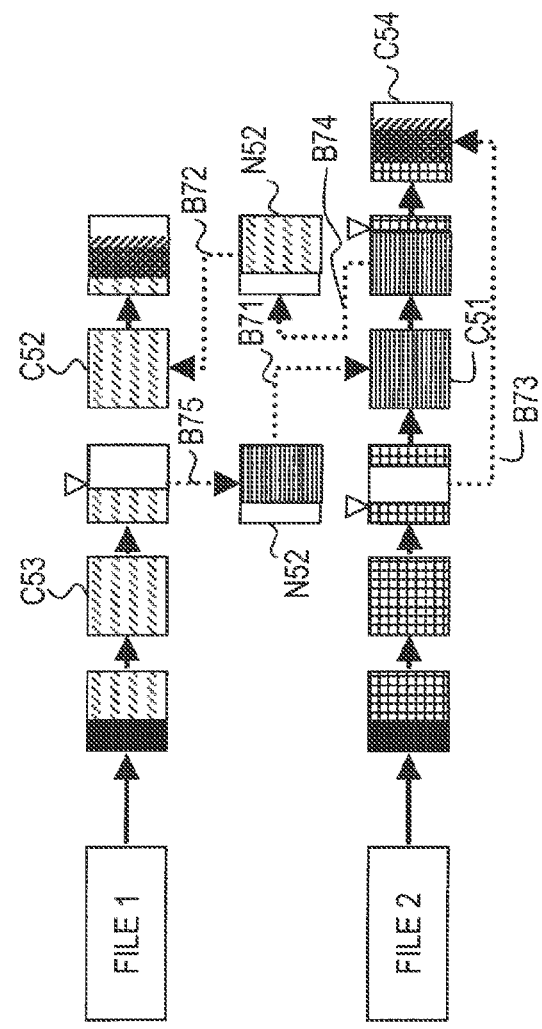

FIG. 34A and FIG. 34B illustrate a specific example of data transfer processing in pattern 2. In FIG. 34A, two new clusters N51, N52 are secured as the processing of step S62 in the flowchart illustrated in FIG. 31, the cluster C51 next to the transfer start cluster of the file 2 is linked after the first new cluster N51, and the cluster C52 next to the transfer insertion cluster of the file 1 is linked after the second new cluster N52 (B71, B72). Then, in the subsequent step S63, the data at and after the transfer start position in the transfer start cluster of the file 2 (transfer source file) are written into the first new cluster N51, and the data at and after the transfer insertion position in the transfer insertion cluster of the file 1 are written into the second new cluster N52. Further, in the pattern 2, the data at and after the transfer end position of the transfer end cluster are written following the data at and before the transfer start position in the transfer start cluster of the file 2 in the same step.

In FIG. 34B, the cluster C54 next to the transfer end cluster is linked after the transfer start cluster of the file 2 (B73) as the processing of step S65 illustrated in FIG. 31. Further, in step S66 illustrated in FIG. 31, the second new cluster N52 is linked after the transfer end cluster of the file 2 (B74). In step S68 illustrated in FIG. 31, the first new cluster N51 is linked after the transfer insertion cluster of the file 1 (B75).

Thus, in the pattern 2, the transfer data from the transfer start position to the transfer end position in the file 2 are likewise transferred to the transfer insertion position in the file 1. Further, in the data transfer processing of the pattern 2, the two new clusters N51, N52 are used and the fragmentation number of the clusters in the file after the transfer processing is 5 (B71 to B75) in the same manner as in the case of the patterns 1-1 and 1-2. The number of generated accesses to the directory entries is also the same as in the case of patterns 1-1 and 1-2.

Thus, with any of the patterns, the data of two regions share one cluster, thereby making it possible to reduced the number of new clusters to 2 and inhibit the fragmentation number of the file to 5. Further, in the data transfer processing of the present embodiment, the number of updates to the directory entries is reduced (from 12 to 5) and the fragmentation number of the clusters is also reduced (from 6 to 5) by comparison with those in the comparative example. When no data editing table is used in the present embodiment, the number of updates to the directory entries can be further reduced by one (from 12 to 4).

Therefore, by reducing the number of updates to the directory entries, the data editing program PR of the present embodiment can increase the processing efficiency and raise the speed of data transfer processing. Further, by reducing the fragmentation number of clusters, the data editing program PR of the present embodiment can raise the speed of access to the file after the editing and use efficiently the regions of the file system.

Further, in the present embodiment, the file data are, for example, video data and therefore may include an unused region within a cluster. Thus, since the position of the data editing object is not limited to the cluster boundary, the data editing program PR can minimize the transfer of data that have been stored in advance in the secondary storage medium.

Further, in the present embodiment, as a result of the data editing table being generated and added to the very end of the data, the transfer destination file and transfer source file can be restored to the state before the editing or the state after the editing even when the data transfer processing is interrupted along the way.

[Interruption of Data Transfer Processing]

FIG. 35 illustrates the file safety when the processing is interrupted in the course of data transfer processing. This figure also includes the file states and restoration guidelines corresponding to each step of the flowchart illustrated in FIG. 31 with respect to the transfer destination file (file 1) and transfer source file (file 2). The file states are the states of file data, file size, index, data editing table, and non-referred data.

More specifically, in FIG. 35, the file 1 and the file 2 are in the state before the editing processing before step S61, and in the state after the editing processing after step S71. As a result, safety of the file 1 and the file 2 is ensured even when the editing processing is interrupted. Although the data editing table is the added after step S61, the file size is not updated. Therefore, the file 1 and the file 2 are in the state before the editing and safety of the file 1 and the file 2 is ensured.

When the editing processing is interrupted after steps S62 to S64, the file 1 and the file 2 are restored to the state before the editing. After steps S62 to S64, the cluster chain of the file 1 and the file 2 is unchanged. Therefore, safety of the file 1 and the file 2 is ensured even when the editing processing is interrupted. Further, after step S65, the cluster chain of the file 2 is in a changed state. In this case, the data editing program PR restores the file 2 to the state before the editing by returning the transfer data to the file 2 on the basis of the data editing table of the file 2 and the transfer data attached to the dummy file.

The data editing program PR of the present embodiment can refer to the transfer data by generating a dummy file and attaching the dummy file to the transfer data. As a result, the data editing program PR can restored the file 2 to the state before the editing on the basis of the transfer data even after the cluster chain of the file 2 has been changed.

Further, when the editing processing is interrupted after steps S66 to S70, the file 1 and the file 2 are restored to the state after the editing. When the editing processing is interrupted after steps S66 and S67 with respect to the file 1, the cluster chain of the file 1 is unchanged. Thus, after step S66, the data editing table of the file 1 is in the unreadable state, but the data editing table of the file 1 can be read on the basis of a dummy table. Therefore, the data editing program PR can restore the file 1 to the state after the editing on the basis of the data editing table of the file 1 attached to the dummy file and the transfer data. Further, after step S67, the data editing table of the file 1 is in a readable state due to the enlargement of the file size of the file 1. Therefore, the data editing program PR restores the file 1 to the state after the editing on the basis of the readable data editing table and the transfer data attached to the dummy file.

Thus, the data editing program PR of the present embodiment sets the data editing table of the file 1 to a readable state by using a dummy file till a point of time after step S68 in which the cluster chain is changed. As a result, when the data editing processing is interrupted after step S66 and step S67, the data editing program PR can restore the file 1 to the state after the editing.

When the editing processing is interrupted after step S68, the cluster chain of the file 1 is changed and a mismatch of the file size or index is generated. Therefore, the data editing program PR restores the mismatch of the file size or index of the file 1 on the basis of the data editing table and restores the file 1 to the state after the editing. Further, when the editing processing is interrupted after steps S66 to S70 with respect to the file 2, the data editing program PR restores the mismatch of the file size or index of the file 2 on the basis of the data editing table of the file 2 and restores the file 2 to the state after the editing.

Thus, with the data editing program PR of the present embodiment, by using the data editing table having editing instruction information, it is possible to restore the transfer destination file and transfer source file to the state before the editing or the state after the editing even when the processing is interrupted after any step in the editing processing. As a result, safety of the transfer destination file and transfer source file is maintained. Further, the data editing program PR can restore the transfer destination file and transfer source file on the basis of only the data stored in the secondary storage device by adding the data editing table to the file tail.

As describes hereinabove, with the data editing program PR of the present embodiment, the data editing processing includes transferring insert data between a transfer start position and a transfer end position in a transfer source file to a transfer insertion position in a transfer destination file. The transferring the insert data includes transferring transfer-start-back-data at and after the transfer start position in a transfer start cluster having the transfer start position of the transfer source file to a first new cluster in which the transfer source file and the transfer destination file have not been recorded, the first new cluster being included in the plurality of clusters. Further, the transferring the insert data includes transferring transfer-end-forward-data at and before the transfer end position in a transfer end cluster having the transfer end position of the transfer source file to a second new cluster in which the transfer source file and the transfer destination file have not been recorded, the second new cluster being different from the first new cluster and being included in the plurality of clusters. Further, the transferring the insert data includes transferring transfer-insertion-forward-data at and before the transfer insertion position in a transfer insertion cluster having the transfer insertion position of the transfer destination file or transfer-insertion-back-data at and after the transfer insertion position in the transfer insertion cluster to the first new cluster or the second new cluster. Further, the transferring the insert data includes editing the management data with respect to the transfer destination file, such that a cluster which is next to the transfer start cluster is linked after the first new cluster, and a cluster preceding the transfer end cluster is linked before the second new cluster.

Thus, with the data editing program PR of the present embodiment, the unnecessary division processing and linking processing of files is inhibited. Further, the data editing program PR of the present embodiment can fit the data of three regions, which are the data before and after the position of the editing object, into two new clusters in the data transfer processing. As a result, the data editing program PR can reduce the fragmentation number of the file after the editing performed by data transfer processing and can also reduce the number of updates to the directory entries. As a result, the data editing program PR can efficiently and rapidly perform the data transfer processing and can rapidly access the files after the editing. Further, the data editing program PR can minimize the transfer of data that have been recorded in advance in the clusters and can rapidly perform the data transfer processing.

Further, with the data editing program PR of the present embodiment, when the size of the transfer-insertion-back-data at and after the transfer insertion position in the transfer insertion cluster is less than the size of the transfer-start-back-data at and after the transfer start position in the transfer start cluster, the transferring the transfer-insertion-forward-data or the transfer-insertion-back-data, transfers the transfer-insertion-back-data, from among the transfer-insertion-forward-data and the transfer-insertion-back-data, to the second new cluster. Further, the data editing program PR edits the management data such that the transfer insertion cluster is linked before the first new cluster, and a cluster which is next to the transfer insertion cluster is linked after the second new cluster.

As a result, with the data editing program PR, where the size of the transfer-insertion-back-data is less than the size of the transfer-start-back-data (pattern 1-1 in the present embodiment), the second new cluster can be shared by data of two regions. Therefore, the number of new clusters to be used in the data transfer processing is inhibited to two and the fragmentation number of the transfer destination file is inhibited.

Further, with the data editing program PR of the present embodiment, when the size of the transfer-insertion-back-data is equal to or greater than the size of the transfer-start-back-data, the transferring the transfer-insertion-forward-data or the transfer-insertion-back-data, the transfer-insertion-forward-data, from among the transfer-insertion-forward-data and the transfer-insertion-back-data, to the first new cluster. The data editing program PR edits the management data such that the previous cluster preceding the transfer insertion cluster is linked before the first new cluster, and the transfer insertion cluster is linked after the second new cluster.

As a result, with the data editing program PR, when the size of the transfer-insertion-back-data is equal to or greater than the size of the transfer-start-back-data (pattern 1-2 in the present embodiment), the first new cluster can be shared by data of two regions. Therefore, the number of new clusters to be used in the data transfer processing is inhibited to two and the fragmentation number of the transfer destination file is inhibited.

Further, with the data editing program PR of the present embodiment, the management data are further edited such that the transfer end cluster is linked after the transfer start cluster with respect to the transfer source file. As a result, the number of new clusters to be used in the data transfer processing is inhibited to two and the fragmentation number of the transfer source file is inhibited.

Further, in the data editing program PR of the present embodiment, when a sum total of the size of the transfer-start-back-data and the size of the transfer-end-forward-data is equal to or less than a size of a cluster, the transferring the transfer-start-back-data to the first new cluster, the transferring the transfer-end-forward-data to the second new cluster, the transferring the transfer-insertion-forward-data or the transfer-insertion-back-data to the first new cluster or the second new cluster, and the editing are executed. As a result, the number of new clusters to be used in the data transfer processing is inhibited to two and the fragmentation number of the transfer source file is inhibited.

In the data editing program PR, the transferring the insert data includes, when the sum total of the size of the transfer-start-back-data and the size of the transfer-end-forward-data is greater than the size of the cluster, transferring the transfer-start-back-data to the first new cluster in which the transfer source file and the transfer destination file have not been recorded, the first new cluster being included in the plurality of clusters, and transferring the transfer-insertion-back-to the second new cluster in which the transfer source file and the transfer destination file have not been recorded, the second new cluster being different from the first new cluster and being included in the plurality of clusters. Further, the transferring the insert data includes editing the management data with respect to the transfer destination file, such that the transfer insertion cluster is linked before the first new cluster, the cluster which is next to the transfer start cluster is linked after the first new cluster, the transfer end cluster is linked before the second new cluster, and a cluster which is next to the transfer insertion cluster is linked after the second new cluster. As a result, the number of new clusters to be used in the data transfer processing is inhibited to two and the fragmentation number of the transfer source file is inhibited.

Further, in the data editing program PR of the present embodiment, when the sum total of the size of the transfer-start-back-data and the size of the transfer-end-forward-data is greater than the size of the cluster, the management data are further edited with respect to the transfer source file, such that the transfer start cluster for which data at and after the transfer end position in the transfer end cluster have been transferred is linked before a cluster which is next to the transfer end cluster are linked.

Therefore, with the data editing program PR, when the sum total of the size of the transfer-start-back-data and the size of the transfer-end-forward-data is greater than the size of the cluster (pattern 2 in the present embodiment), one cluster can be shared by data of two regions in the transfer source file. As a result, the number of new clusters to be used in the data transfer processing is inhibited to two and the fragmentation number of the transfer source file is inhibited.

Further, in the data editing program PR of the present embodiment, the management data are edited such that, from among the first cluster linked after the new cluster and the second cluster linked before the new cluster, the first cluster is the first to be linked to the new cluster. Thus, the data editing program PR initially updates the rear link of the new cluster, and the front link is updated as late as possible. With such an approach, even if the rear link is linked to a cluster of a separate file, when the editing processing in which the front link is not linked from anywhere is interrupted, the data can be handled as unused data and safely deleted. Further, the data program PR can delay the timing at which the transfer destination file is changed. In other words, the data editing program PR can maintain the transfer destination file in the state before the editing as long as possible.

In the data editing processing, the data editing program PR of the present embodiment further stores, in the data tail of the object file of the data editing processing, the editing instruction information, which is inputted and includes an editing type indicating either of the insertion processing and the removal processing, an editing object position indicating either of the insertion position in the insertion processing and the removal start point in the removal processing, and an editing object size indicating either of the size of insertion data in the insertion processing or the deletion size in the removal processing. Further, the data editing processing restores the object file of the data editing processing to the state before or after the data editing processing on the basis of the editing instruction information, when the reading of the object file of the data editing processing is not able to be performed.

As a result, the data editing program PR of the present embodiment can restore the object file to the state before the data transfer processing or after the data transfer processing even when the processing of data transfer between the files is interrupted along the way. Safety of the insertion destination file is thus ensured.

In the data editing program PR of the present embodiment, the data editing processing updates, before editing of the management data linking a cluster before the new cluster, a size of the file which is managed in the data region to the sum total size obtained by adding a size of the editing instruction information to a size of the file after editing of the management data, when the size of the file which is managed in the data region is less than the sum total size.

As a result, the data editing program PR can update in advance, that is, before the cluster chain of the transfer destination file is changed, the file size to a size enabling the reading of the data editing table. Therefore, even when the editing processing is interrupted and a file mismatch occurs after the cluster chain of the transfer destination file has changed, the data editing program PR can restore the transfer destination file to the state before or after the transfer on the basis of the data editing table.

Further, in the data editing program PR of the present embodiment, the data editing processing further outputs editing result information including the position of data of which position has changed before the editing processing, and the size of the data of which position has changed, after the data editing processing. As a result, for example, a higher-level interface can accurately detect the editing processing result.

[Number of Updates to Directory Entries]

FIG. 36 illustrates the difference in the number of updates to directory entries, number of new cluster, and fragmentation number between the present embodiment and the comparative example. The total number of updates to directory entries, number of new cluster, and fragmentation number in the present embodiment and comparative example are explained above for each editing processing. More specifically in the data insertion processing, the total number of updates to directory entries in the comparative example is 7, the number of newly used clusters is 1, and the fragmentation number is 3. By contrast, the total number of updates to directory entries in the present embodiment is 2 (twice when the data editing table is not generated), the number of newly used clusters is 1, and the fragmentation number is 2.

In the data removal processing, the total number of updates to directory entries in the comparative example is 7, the number of newly used clusters is 2, and the fragmentation number is 2. By contrast, the total number of updates to directory entries in the present embodiment is 1, the number of newly used clusters is 0, and the fragmentation number is 1. In the data transfer processing, the total number of updates to directory entries in the comparative example is 12, the number of newly used clusters is 3, and the fragmentation number is 6. By contrast, the total number of updates to directory entries in the present embodiment is 5 (4 times when the data editing table is not generated), the number of newly used clusters is 2, and the fragmentation number is 5.

Thus, with the data editing program PR of the present embodiment, the number of updates to the directory entries is reduced and, therefore, the speed of editing processing is increased. Further, with the data editing program PR of the present embodiment, the number of newly used clusters is inhibited and, therefore, data editing processing can be performed even when the number of empty clusters is insufficient. Further, with the data editing program PR of the present embodiment, the fragmentation number of the file after the editing is small. Therefore, the file system can be used efficiently and the rate of access to the file after the editing is increased.

The recovery processing of the editing object that is based on the data editing table is explained below.

[Flowchart of File Restoration Processing]

FIG. 37 is the first flowchart illustrating the flow of file restoration processing. In the figure, the data editing program PR initially diagnoses the presence/absence of abnormal data in the secondary storage device (S81). More specifically, the data editing program PR checks the presence/absence of a dummy file and non-referred data stored in the secondary storage device, the presence/absence of file size mismatch, and the presence/absence of the remaining data editing table. Where the checking result indicates that the dummy file is present (YES in S82), the data editing program PR performs file restoration processing corresponding to the data transfer processing (S83). This processing is explained below with reference to a separate flowchart.

The checking result is then used to determine whether or not the data editing table with INSERTION as the editing processing type is present (S84). Where the data editing table is present (YES in S84), the data editing program PR performs file restoration processing corresponding to the data insertion processing (S85). This processing is explained below with reference to a separate flowchart. The processing of step S85 also includes the restoration processing of the transfer destination file in the data transfer processing.

The checking result is then used to determine whether or not the data editing table with REMOVAL as the editing processing type is present (S86). Where the data editing table is present (YES in S86), the data editing program PR performs file restoration processing corresponding to the data removal processing (S87). This processing is explained below with reference to a separate flowchart. The processing of step S87 also includes the restoration processing of the transfer source file in the data transfer processing. Where the dummy file and non-referred data remain, the data editing program PR deletes the dummy file and non-referred data (S88).

[Flowchart: File Restoration Processing Corresponding to Data Transfer Processing]

Figure 38:
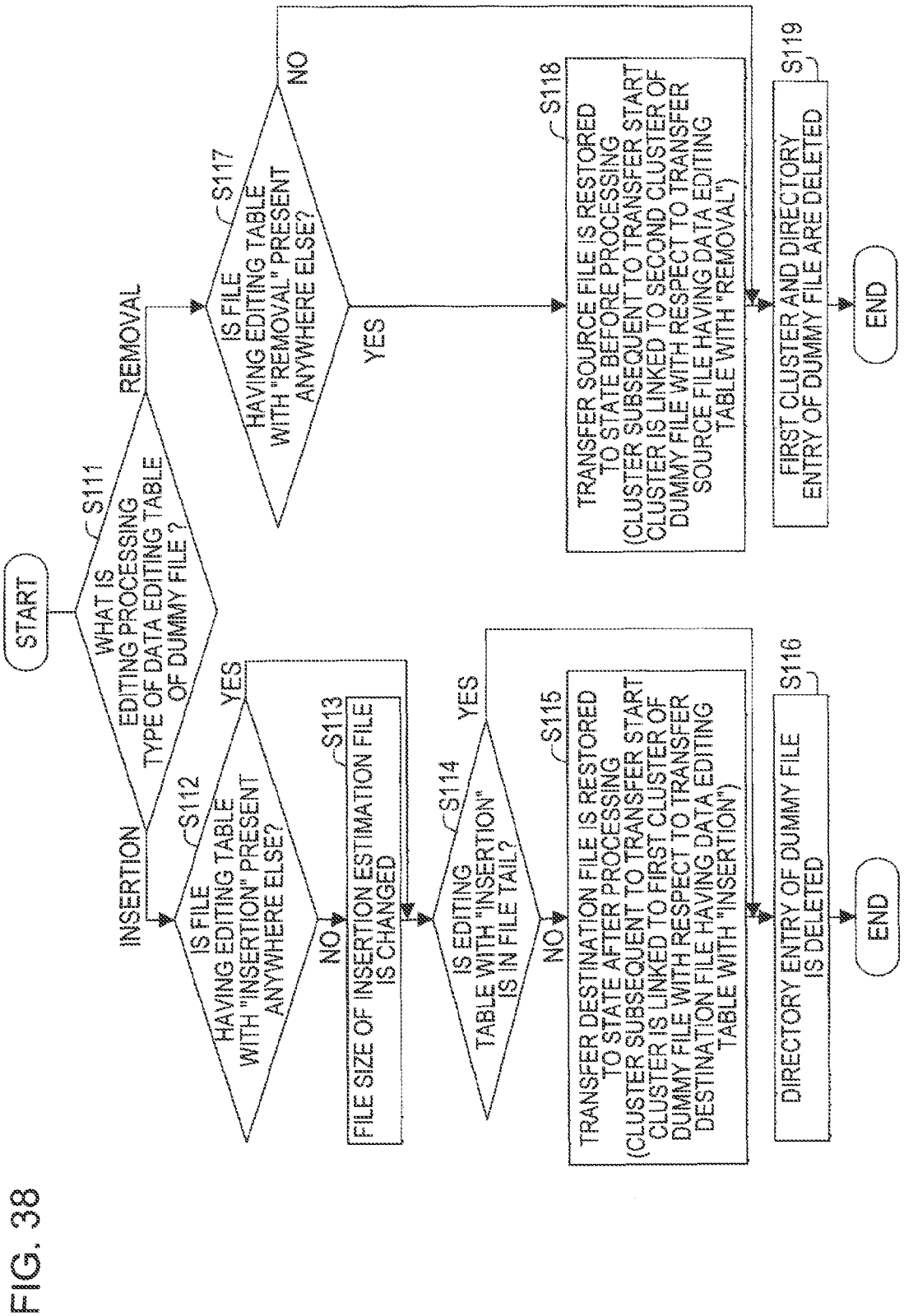
FIG. 38 illustrates the file restoration processing (S83 in FIG. 37) corresponding to data transfer processing.

FIG. 38 illustrates the file restoration processing (S83 in FIG. 37) corresponding to data transfer processing. In the figure, the data editing program PR initially determines whether the editing processing type in the data editing table attached to the dummy file is INSERTION or REMOVAL (S111). The case in which the editing table attached to the dummy file is present corresponds to the state after steps S64 to S68 in the flowchart of the data transfer processing illustrated in FIG. 31.

Where the editing processing type in the data editing table attached to the dummy file is INSERTION, the data editing program PR determines whether or not a file having an editing table with INSERTION as an editing processing type is present somewhere else (S112). Where such file is not present anywhere else (NO in S112), the data editing program PR changes the size of the insertion destination file to the size after data transfer in which the data editing table has been removed. This case (NO in S112) corresponds to the state after step S66 from among steps S64 to S68 illustrated in FIG. 31. Meanwhile, the case in which the aforementioned file is present somewhere else (YES in S112) corresponds to the state after steps S67 and S68 in FIG. 31. In this case, since the file size has already been updated in step S67, the file size update processing is unnecessary.

The data editing program PR then determines whether or not the data editing table with INSERTION as the editing processing type is present in the file tail (S114). The case in which the data editing table is not present in the file tail (NO in S114) corresponds to the state after steps S66 and S67 in the flowchart illustrated in FIG. 31. In this case, the data editing program PR performs the processing of step S68 illustrated in FIG. 31 and restores the transfer destination file to the state after the editing (S115). More specifically, the data editing program PR links a cluster next to the cluster having the transfer start position to the head cluster (first new cluster) attached to the dummy file with respect to the file (processing transfer destination file) having the data editing table with INSERTION as the editing processing type.

Meanwhile, the case in which the data editing table with INSERTION as the editing processing type is present in the file tail (YES in S114) corresponds to the state after step S68 in FIG. 31. Therefore, relinking of the cluster chain is unnecessary. The data editing program PR then deletes the entry of the dummy file from the directory entries (S116).

Where the editing processing type in the data editing table attached to the dummy file is REMOVAL, the data editing program PR determines whether or not a file having an editing table with REMOVAL as an editing processing type is present somewhere else (S117). Where such a file is present somewhere else (YES in S117), it means that the data editing table can be read from both the insertion source file and the dummy file. Thus, this case corresponds to the state after step S65 in FIG. 31. In this case, the data editing program PR restores the transfer source file to the state before the editing (S118). More specifically, the data editing program PR links a cluster next to the cluster having the transfer start position to the second cluster attached to the dummy file with respect to the transfer source file. As a result, the transfer source file is restored to the state before the editing.

Meanwhile, the case in which the file having the data editing table with REMOVAL as the editing type is not present anywhere else (NO in S117) corresponds to the state after step S64 in the flowchart illustrated in FIG. 31. In this case, the transfer source file is in the state before the relinking processing (B53) of the cluster chain. Therefore, the processing of step S118 is not performed. The data editing program PR then deletes the first cluster of the dummy file and also deletes the entry of the dummy file from directory entries (S119).

[Flowchart: File Restoration Processing Corresponding to Data Insertion Processing]

Figure 39:
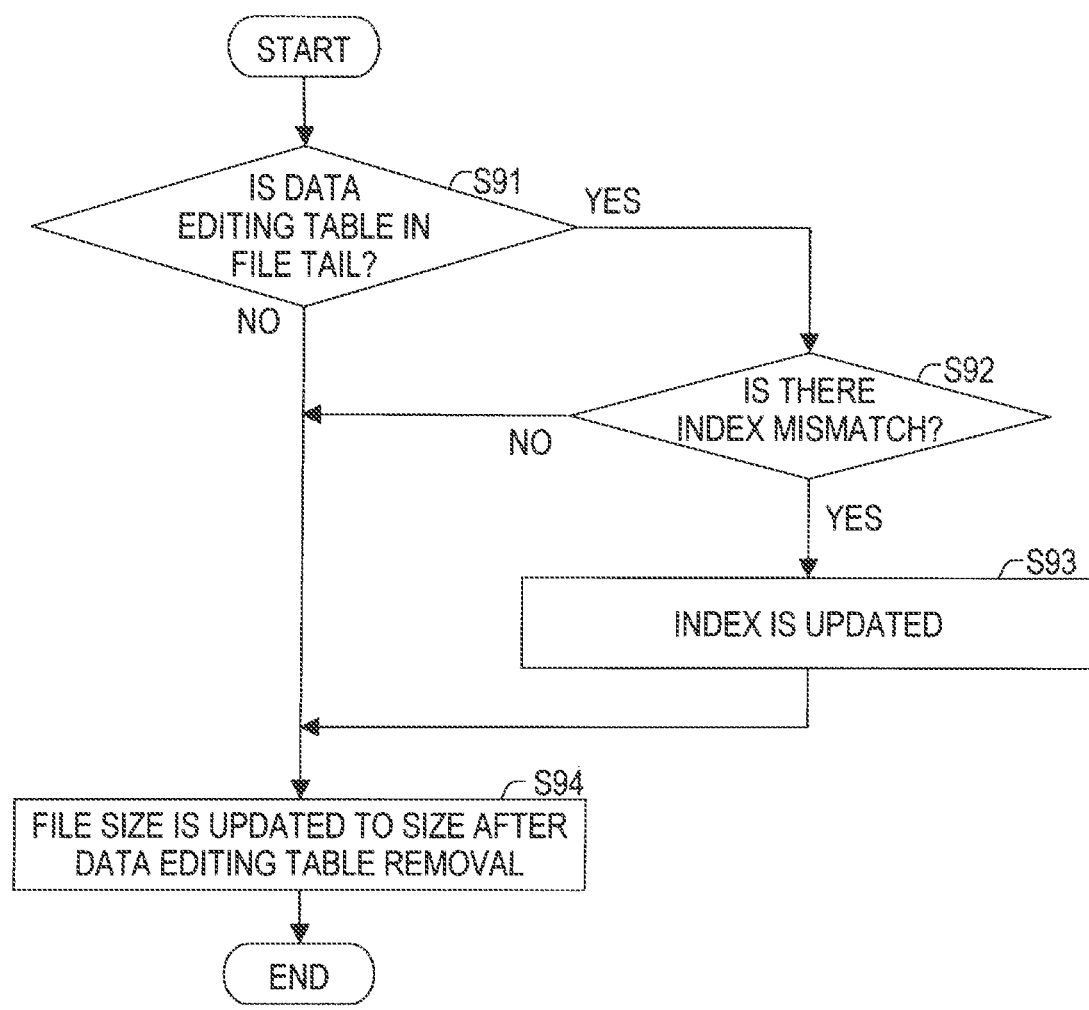
FIG. 39 illustrates the file restoration processing (S85 in FIG. 37) corresponding to data insertion processing.

FIG. 39 illustrates the file restoration processing (S85 in FIG. 37) corresponding to data insertion processing. In the figure, the data editing program PR initially determines whether or not the data editing table with INSERTION as the editing processing type is present in the file tail (S91). Where the data editing table is present in the file tail (YES in S91), the data editing program PR determines whether or not there is a mismatch in the file index (S92). Where there is a mismatch in the index (YES in S92), the data editing program PR updates the index on the basis of the data editing table (S93). The data editing program PR then updates the file size to the size after the removal of the data editing table (S94).

[Flowchart: File Restoration Processing Corresponding to Data Removal Processing]

Figure 40:
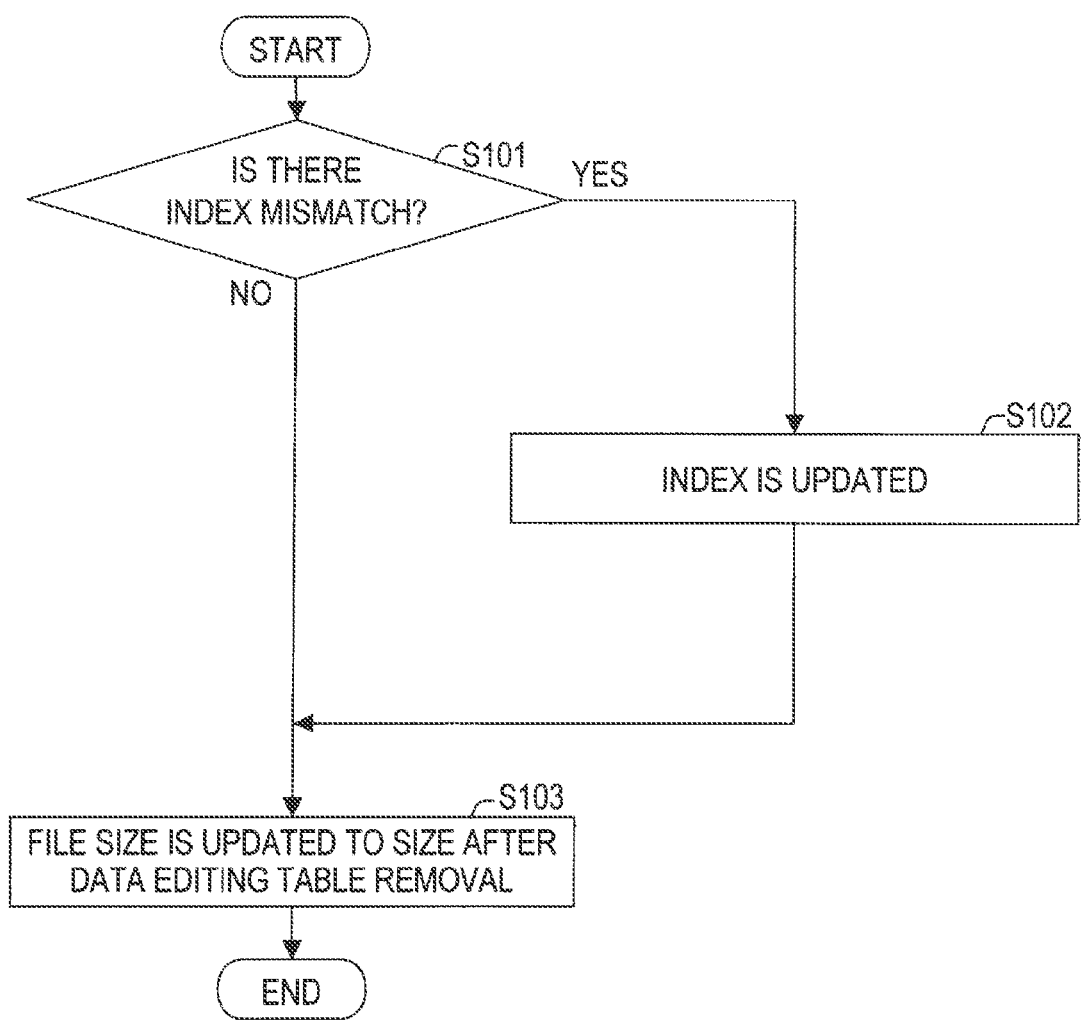
FIG. 40 illustrates the file restoration processing (S87 in FIG. 37) corresponding to data removal processing.

FIG. 40 illustrates the file restoration processing (S87 in FIG. 37) corresponding to data removal processing. In the figure, the data editing program PR initially determines whether or not there is a mismatch in the file index (S101). Where there is a mismatch in the index (YES in S101), the data editing program PR updates the index on the basis of the data editing table (S102). The data editing program PR then updates the file size to the size after the removal of the data editing table (S103).

A specific example of data editing table is explained below.

[Specific Example of Data Editing Table]

Figures 41A, 41B, 41C:
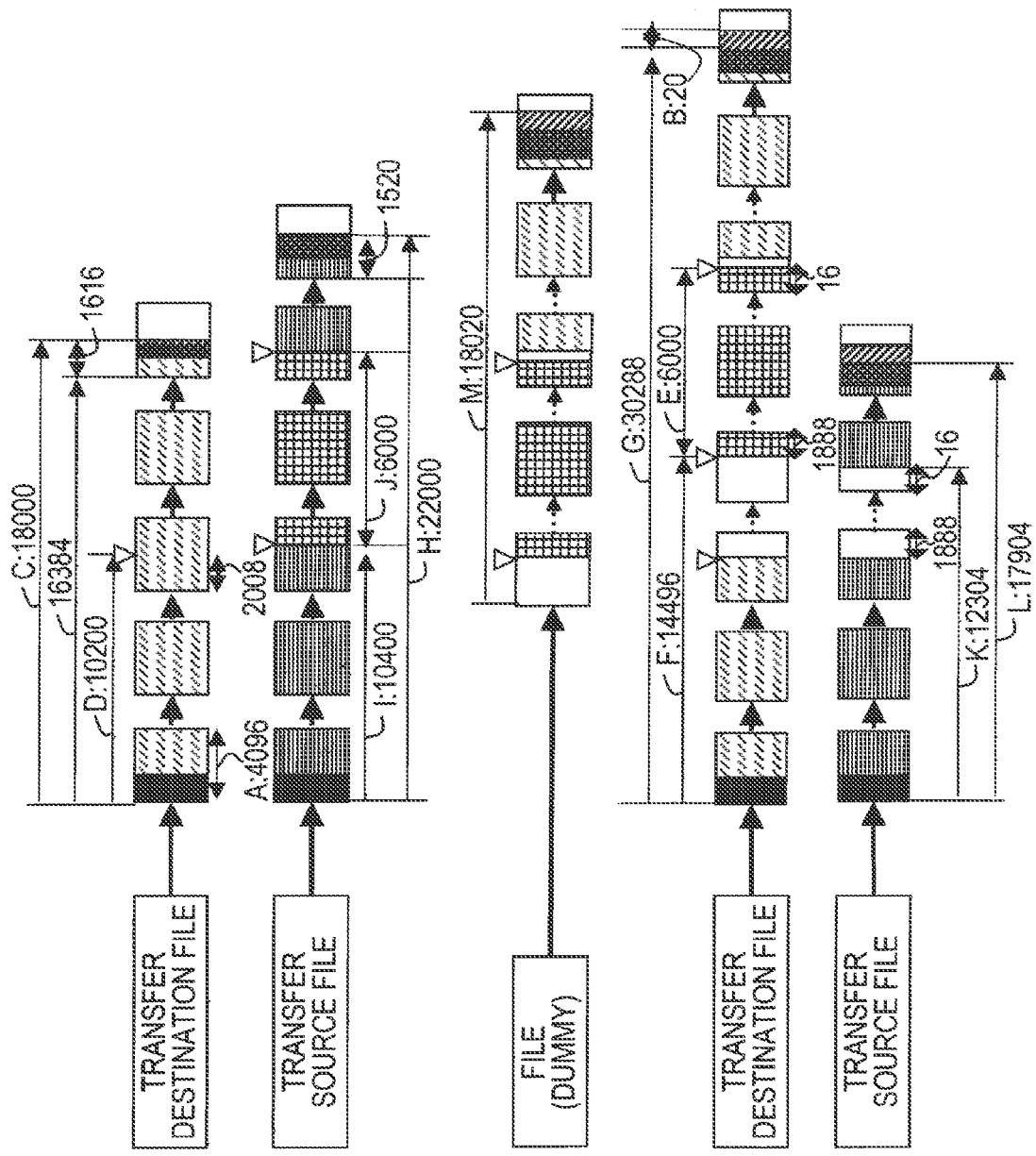
FIG. 41A to FIG. 41C illustrate a specific example of the size of each file in data transfer processing.

FIG. 41A to FIG. 41C illustrate a specific example of the size of each file in data transfer processing. FIG. 41A illustrates the configuration of the transfer destination file and transfer source file before the editing. FIG. 41B illustrates the configuration of a dummy file. The dummy file is, for example, the dummy file in the state after step S66 in the flowchart illustrated in FIG. 31. Further, FIG. 41C illustrates the configuration of the transfer destination file and transfer source file after the editing. The size of data in each file in the figures is represented by a numerical value.

In this example, the cluster size in the file system is 4096 bytes (A), and the size of the data editing table is 20 bytes (B). In FIG. 41A, the transfer destination file (file 1) before the editing is constituted by 5 clusters, and the size thereof is 18000 bytes (C). Further, the transfer source file (file 2) before the editing is constituted by 6 clusters and the size thereof is 22000 bytes (H). The size of the transfer object data is 6000 bytes (J). In FIG. 41B, the dummy file is constituted by 5 clusters and the size thereof is 18020 bytes (M). In FIG. 41C, the transfer destination file after the editing is constituted by 8 clusters and the size thereof is 30288 bytes (G). Further, the transfer source file after the editing is constituted by 5 clusters and the size thereof is 17904 bytes (L).

FIG. 42 illustrates an example of the data editing table corresponding to the specific example illustrated in FIG. 41A to FIG. 41C. The figure illustrates an example of information on the entire file system and information on the transfer destination file, transfer source file, and dummy file. In the same figure, the portions surrounded by bold line frames are specific examples of the data editing table. The sizes A to J in the figure are the sizes A to J in FIG. 41A to FIG. 41C.

In this example, the editing processing type of the editing instruction information in the data editing table generated with respect to the transfer destination file is INSERTION, the editing start position is at the 10200-th byte in the third cluster (D), and the editing data size indicating the transfer data is 6000 bytes (E). Further, the editing data offset in the editing result information is at the 14496-th byte (F) in the fourth cluster, and the file size after the editing is 30288 bytes (G).

Further, the editing processing type of the editing instruction information in the data editing table generated with respect to the transfer source file is INSERTION, the editing start position is at the 10400-th byte in the third cluster (I), and the editing data size indicating the transfer data is 6000 bytes (J). Further, the editing data offset in the editing result information is at the 12304-th byte (K) in the fourth cluster, and the file size after the editing is 17904 bytes (L).

FIG. 43 illustrates specific examples of file states and restoration guidelines for the transfer destination file (file 1), transfer source file (file 2), and dummy file. The table in FIG. 43 corresponds to the steps in the flowchart of the data transfer processing illustrated in FIG. 31. In this example, the file state is, for example, the file data state, the number of clusters used, and the file size.

In the example illustrated in FIG. 43, the number of clusters constituting the transfer destination file is increased from 5 to 8 by the data transfer processing. Further, the file size of the transfer destination file is increased from 18000 bytes to 30288 bytes. The data editing table is 20 bytes. Therefore, the file size including the size of the data editing table after steps S67 to S70 is 30308 bytes (=30288+20). Meanwhile, the number of clusters constituting the transfer source file is reduced from 6 to 5 by the data transfer processing. The file size for the transfer source file is reduced from 22000 bytes to 17904 bytes.

In the present embodiment, an example is explained in which the data editing table is used in addition to the access to the directory entries and the processing step of reducing the fragmentation number of the files. However, the data editing table in the present embodiment may be used, for example, in combination with the comparative example.

For example, in the data insertion processing of the comparative example in FIG. 10, the data editing program PR adds the data editing table to the tail of data 1 before writing the insertion data into the file 2 (S11). Further, the data editing program PR enlarges the size for the file 1 to the size at which the data editing table can be read before the file 2 is linked to the file 1 in step S12. Where the data insertion processing ends, the data editing table added to the tail of the file 1 is deleted.

As a result, even when the editing processing is interrupted after step S12 illustrated in FIG. 10, the data editing program PR can restore the file 1 to the state before the editing or the state after the editing on the basis of the data of the files 2 and 3 and the data editing table. This approach can be similarly used also in the data removal processing and data transfer processing in the comparative example.

Thus, with the data editing program PR of the present embodiment, the data editing processing stores, in the data tail of the object file of the data editing processing, the editing instruction information, which is inputted and includes an editing type indicating either of insertion processing and removal processing, an editing object position indicating either of an insertion position in the insertion processing and a removal start point in the removal processing, and an editing object size indicating either of the size of insertion data in the insertion processing or the deletion size in the removal processing. Further, with the data editing program PR, the data editing processing performs data editing of any of data insertion, data removal, and data transfer with respect to the object file of the data editing processing on the basis of the inputted editing instruction information, and changes the cluster configuration of the object file of the data editing processing so as to correspond to the data editing with respect to the management data. Furthermore, with the data editing program PR, the data editing processing restores the object file of the data editing processing to a state before or after the data editing processing on the basis of the editing instruction information, when reading of the object file of the data editing processing is not able to be performed.

As a result, the data editing program PR of the present embodiment can restore the file that is the object of editing processing to the state before the data editing processing or after the data editing processing even when the processing of data transfer between the files is interrupted along the way. Safety of the file that is the object of editing processing is thus ensured.

In the data editing program PR of the present embodiment, the data editing processing updates, before editing of the management data linking a cluster before the new cluster, the size of the file which is managed in the data region to the sum total size obtained by adding the size of the editing instruction information to the size of the file after the editing of the management data, when the size of a file which is managed in the data region is less than the sum total size.

As a result, the data editing program PR can update in advance, that is, before the cluster chain of the editing object file is changed, the file size to a size at which the data editing table can be read. Therefore, even when the editing processing is interrupted and a file mismatch occurs after the cluster chain of the editing object file has changed, the data editing program PR can restore the editing object file to the state before or after the transfer on the basis of the data editing table.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable medium storing a data editing program that causes a computer to execute a process, the process being a data editing processing of a recording medium including a data region which is provided with a plurality of clusters and in which a data file is stored in a cluster chain that links the plurality of clusters serially, and a management region where management data including links between the plurality of clusters are stored, the data edit processing comprising:
  transferring insert data between a transfer start position and a transfer end position in a transfer source file stored in the recording medium to a transfer insertion position in a transfer destination file stored in the recording medium,
  the transferring the insert data including:
  transferring transfer-start-back-data stored at and after the transfer start position in a transfer start cluster having the transfer start position in a transfer source cluster chain that stores the transfer source file to a first new cluster in which a valid data has not been stored among the plurality of clusters;

transferring transfer-end-forward-data stored at and before the transfer end position in a transfer end cluster having the transfer end position in the transfer source cluster chain that stores the transfer source file to a second new cluster in which a valid data has not been stored among the plurality of clusters;

transferring transfer-insertion-forward-data stored at and before the transfer insertion position in a transfer insertion cluster having the transfer insertion position in the transfer destination cluster chain that stores the transfer destination file to the first new cluster, or transfer-insertion-back-data stored at and after the transfer insertion position in the transfer insertion cluster to the second new cluster; and generating, in the management data with respect to the transfer destination file, a first link that links a cluster which is next to the transfer start cluster after the first new cluster, and a second link that links a cluster preceding the transfer end cluster before the second new cluster.

2. The non-transitory computer-readable medium storing the data editing program according to claim 1, wherein when a size of the transfer-insertion-back-data is less than a size of the transfer-start-back-data, the transferring the transfer-insertion-forward-data or the transfer-insertion-back-data, transfers the transfer-insertion-back-data to the second new cluster, and the generating generates, in the management data, a third link that links the transfer insertion cluster before the first new cluster, and a fourth link that links a cluster which is next to the transfer insertion cluster after the second new cluster.

3. The non-transitory computer-readable medium storing the data editing program-according to claim 1, wherein when a size of the transfer-insertion-back-data is equal to or greater than a size of the transfer-start-back-data, the transferring the transfer-insertion-forward-data or the transfer-insertion-back-data, transfers the transfer-insertion-forward-data to the first new cluster, and the generating generates, in the management data, a third link that links a cluster preceding the transfer insertion cluster before the first new cluster, and that links the transfer insertion cluster after the second new cluster.

4. The non-transitory computer-readable medium storing the data editing program according to claim 1, wherein the generating generates, in the management data, a link that links the transfer end cluster after the transfer start cluster with respect to the transfer source file.

5. The non-transitory computer-readable medium storing the data editing program according to claim 1, wherein when a sum total of a size of the transfer-start-back-data and a size of the transfer-end-forward-data is equal to or less than a size of a cluster.

6. A non-transitory computer-readable medium storing a data editing program that causes a computer to execute a process, the process being a data editing processing of a recording medium including a data region which is provided with a plurality of clusters and in which a data file is stored in a cluster chain that links the plurality of clusters serially, and a management region where management data including links between the plurality of clusters are stored, the data edit processing comprising:

transferring insert data between a transfer start position and a transfer end position in a transfer source file stored in the recording medium to a transfer insertion position in a transfer destination file stored in the recording medium, the transferring the insert data including:

when a sum total of a size of transfer-start-back-data at and after the transfer start position in a transfer start cluster having the transfer start position in a transfer source cluster chain that stores the transfer source file and a size of transfer-end-forward-data at and before the transfer end position in a transfer end cluster having the transfer end position in a transfer source cluster chain that stores the transfer source file is greater than the size of a cluster, transferring the transfer-start-back-data to a first new cluster in which a valid data has not been stored among the plurality of clusters;

transferring transfer-insertion-back-data at and after the transfer insertion position in a transfer insertion cluster having the transfer insertion position in a transfer destination cluster chain that stores the transfer destination file to a second new cluster in which a valid data has not been stored among the plurality of clusters and;

generating, in the management data with respect to the transfer destination file, a first link that links the transfer insertion cluster before the first new cluster, a second link that links the cluster which is next to the transfer start cluster after the first new cluster, a third link that links the transfer end cluster before the second new cluster, and a fourth link that links a cluster which is next to the transfer insertion cluster is linked after the second new cluster.

7. The non-transitory computer-readable medium storing the data editing program-according to claim 6, wherein generating, in the management data with respect to the transfer source file, a link that links the transfer start cluster for which data at and after the transfer end position in the transfer end cluster have been transferred before a cluster which is next to the transfer end cluster are linked.

8. A non-transitory computer-readable medium storing a data editing program that causes a computer to execute a process, the process being a data editing processing of a recording medium including a data region which is provided with a plurality of clusters and in which a data file is stored in a cluster chain that links the plurality of clusters serially, and a management region where management data including links between the plurality of clusters are stored, the data edit processing comprising:

inserting insertion data to an insertion position in an insertion destination file stored in the recording medium, the inserting the insertion data including:

storing, in a data tail of the insertion destination file, editing instruction information which includes an editing type indicating insertion processing, the insertion position, and a size of the insertion data;

after storing, transferring a first data stored at and after the insertion position in an insertion cluster having the insertion position in an insertion destination cluster chain that stores the insertion destination file, and transferring the insertion data to one or a plurality of third new clusters in which a valid data has not been stored among the plurality of clusters;

after the transferring, generating, in the management data, a first link that links a cluster preceding the insertion cluster before a head cluster of the third new clusters, and a second link that links a cluster which is next to the insertion cluster after a tail cluster of the third new clusters; and restoring the insertion destination file to a state before or after the inserting the insertion data on the basis of the editing instruction information, when reading of the insertion destination file is not able to be performed.

9. The non-transitory computer-readable medium storing the data editing program according to claim 1, wherein
generating, in the management data, from among a third link that links a first cluster after the new cluster and a fourth link that links a second cluster before the new cluster, the third link before the fourth link.

10. A non-transitory computer-readable medium storing a data editing program that causes a computer to execute a process, the process being a data editing processing of a recording medium including a data region which is provided with a plurality of clusters and in which a data file is stored in a cluster chain that links the plurality of clusters serially, and a management region where management data including links between the plurality of clusters are stored, the data edit processing comprising:
removing data between a removal start position and a removal end position in a removal source file stored in the recording medium,
the removing the data including:
storing, in a data tail of the removal source file, editing instruction information that includes a removing position;
after storing the editing instruction information, generating, in the management data, a first link that links a remove start cluster to a remove end cluster;
after generating the first link, deleting data at and after the removal start position in a removal start cluster having the removal start position of the removal source file and data at and before the removal end position in a removal end cluster having the removal end position; and
restoring the removal source file to a state before or after the removing data on the basis of the editing instruction information, when reading of the removal source file is not able to be performed.

11. The non-transitory computer-readable medium storing the data editing program according to claim 1, the data editing processing further comprising:
updating, before editing of the management data linking a cluster before the new cluster, a size of the file which is managed in the data region to the sum total size obtained by adding a size of the editing instruction information to a size of the file after editing of the management data, when the size of the file which is managed in the data region is less than the sum total size.

12. The non-transitory computer-readable medium storing the data editing program according to claim 1, the data editing processing further comprising:
outputting editing result information, which includes a position of data of which position has changed before the editing processing and a size of the data of which position has changed, after the data editing processing.

13. A non-transitory computer-readable medium storing a data editing program that causes a computer to execute a process, the process being a data editing processing of a recording medium including a data region which is provided with a plurality of clusters and in which a data file is stored in a cluster chain that links the plurality of clusters serially, and a management region where management data including links between the plurality of clusters are stored, the data edit processing comprising:
storing, in a data tail of an object file of the data editing processing, editing instruction information, which is inputted and includes an editing type indicating either of insertion processing and removal processing, an editing object position indicating either of an insertion position in the insertion processing and a removal start point in the removal processing, and an editing object size indicating either of a size of insertion data in the insertion processing or a deletion size in the removal processing;
performing data editing of any of data insertion, data removal, and data transfer with respect to the object file of the data editing processing on the basis of the inputted editing instruction information;
changing a cluster configuration of the object file of the data editing processing so as to correspond to the data editing with respect to the management data; and
restoring the object file of the data editing processing to a state before or after the data editing processing on the basis of the editing instruction information in the data tail of the object file of the data editing processing, when reading of the object file of the data editing processing is not able to be performed.

14. The non-transitory computer-readable medium storing the data editing program according to claim 13, the data editing processing further comprising:
updating, before editing of the management data, a size of the file which is managed in the data region to the sum total size obtained by adding a size of the editing instruction information to a size of the file after editing of the management data, when the size of the file which is managed in the data region is less than the sum total size.

* * * * *